US012645956B1

(12) United States Patent (10) Patent No.: US 12,645,956 B1
Cleveland et al. (45) Date of Patent: Jun. 2, 2026

(54) HETEROGENOUS CONTENT COLLECTION PACKAGE COMPLIANCE TESTING PROCESSES

(71) Applicant: ComplyAuto IP LLC, Salt Lake City, UT (US)

(72) Inventors: Christopher James Cleveland, Sundance, UT (US); Casey Andrew Graff, Sandy, UT (US); David Wesley Podolsky, San Diego, CA (US)

(73) Assignee: ComplyAuto IP LLC, Salt Lake City, UT (US)

( * ) Notice: Subject to any disclaimer, the term of this patent is extended or adjusted under 35 U.S.C. 154(b) by 0 days.

(21) Appl. No.: 19/279,984

(22) Filed: Jul. 24, 2025

Related U.S. Application Data

(60) Provisional application No. 63/676,120, filed on Jul. 26, 2024.

(51) Int. Cl.
G06N 5/025 (2023.01)

(52) U.S. Cl.
CPC .................................... G06N 5/025 (2013.01)

(58) Field of Classification Search
CPC .......... G06N 20/00; G06N 20/20; G06N 3/08; G06N 5/022; G06N 3/0455; G06N 3/094;
(Continued)

(56) References Cited

U.S. PATENT DOCUMENTS 9,210,186 B1 12/2015 Mousty et al.
10,891,393 B2 1/2021 Currier et al.
(Continued)

FOREIGN PATENT DOCUMENTS

CN 102541882 A 7/2012
CN 116738959 A 9/2023
(Continued)

OTHER PUBLICATIONS

Hamdani et al., "A Combined Rule-Based and Machine Learning Approach for Automated GDPR Compliance Checking", Proceedings of the 18th International Conference on Artificial Intelligence and Law, Jun. 21-25, 2021, pp. 40-49.
(Continued)

*Primary Examiner* — Luis A Sitiriche
(74) *Attorney, Agent, or Firm* — Porter Wright Morris & Arthur LLP

(57) ABSTRACT

Methods are disclosed for performing compliance testing using machine learning models, such as language models or computer vision models. A computer-implemented method may include, for example, accessing a first portion of a content collection package, accessing a classification ruleset specifying a set of criteria that describes identifying features associated with specific content items in the content collection package and types of data extractable from the specific content items, executing a content item classification and data extraction process on the first portion implemented using a first set of machine learning models by classifying the specific content items in the content collection package, determining a first content item comprises first target information and extracting the first target information, generating a prompt, processing the prompt with a compliance checker, receiving a compliance determination dataset from the compliance checker, and generating an output for display based on the compliance determination dataset.

19 Claims, 14 Drawing Sheets

(58) Field of Classification Search
CPC G06N 3/10; G06N 5/04; G06N 3/042; G06N 3/045; G06N 7/01; G06N 20/10; G06N 3/04; G06N 3/09; G06N 5/02; G06N 3/047; G06N 3/0475; G06N 3/098; G06N 5/01; G06N 5/025; G06N 5/046; G06N 7/06
See application file for complete search history.

(56) References Cited

U.S. PATENT DOCUMENTS

| | | | |
|---|---|---|---|
| 10,963,626 | B2 | 3/2021 | Chiba et al. |
| 11,461,429 | B1 | 10/2022 | Kristoffersen et al. |
| 11,611,590 | B1 | 3/2023 | Amar |
| 12,217,271 | B1* | 2/2025 | Sardanopoli .......... G06Q 30/018 |
| 12,242,433 | B2* | 3/2025 | Gottlob ................. G06F 16/211 |
| 12,430,657 | B2 | 9/2025 | Cleveland et al. |
| 2011/0258188 | A1 | 10/2011 | AbdAlmageed et al. |
| 2020/0320289 | A1 | 10/2020 | Su |
| 2021/0166245 | A1 | 6/2021 | Novotny et al. |
| 2022/0129913 | A1 | 4/2022 | Yang et al. |
| 2023/0259720 | A1 | 8/2023 | Gupta et al. |
| 2023/0291743 | A1 | 9/2023 | Shua et al. |
| 2023/0315981 | A1 | 10/2023 | Belhe et al. |
| 2024/0185261 | A1 | 6/2024 | Suryanarayana et al. |
| 2024/0193546 | A1 | 6/2024 | Hooker et al. |
| 2024/0330579 | A1 | 10/2024 | Saxena |
| 2024/0354379 | A1* | 10/2024 | Sun ...................... G06N 3/0475 |
| 2024/0428783 | A1 | 12/2024 | Gupta et al. |
| 2025/0029434 | A1 | 1/2025 | Birgiolas |
| 2025/0029488 | A1 | 1/2025 | Zahid |
| 2025/0086309 | A1 | 3/2025 | Harinath et al. |
| 2025/0232314 | A1* | 7/2025 | Pandya ................... G06F 9/451 |
| 2025/0238723 | A1 | 7/2025 | Cleveland et al. |
| 2025/0238811 | A1 | 7/2025 | Cleveland et al. |
| 2025/0238812 | A1 | 7/2025 | Cleveland et al. |
| 2025/0252139 | A1 | 8/2025 | Singh et al. |
| 2025/0259075 | A1 | 8/2025 | Crabtree et al. |

FOREIGN PATENT DOCUMENTS

| | | |
|---|---|---|
| CN | 117095422 A | 11/2023 |
| WO | WO 2016/178068 A1 | 11/2016 |
| WO | WO 2024/254361 A1 | 12/2024 |

OTHER PUBLICATIONS

AI for Homework? Some Dos and Don't's, Oct. 3, 2023, grammarly (2023).

Amaral et al., "NLP-based Automated Compliance Checking of Data Processing Agreements against GDPR" Jun. 18, 2023, arXiv:2209. 09722v2, pp. 1-26. (Year: 2023).

Ioannidis et al., "Gracenote.ai: Legal Generative AI for Regulatory Compliance" Jun. 19, 2023, pp. 1-12. (Year: 2023).

Khandelwal et al., "CookieEnforcer: Automated Cookie Notice Analysis and Enforcement" Apr. 14, 2022, arXiv: 2204.04221v2, pp. 1-33. (Year: 2022).

Otterstrom et Palonkorpi, "Cookie Monsters: Using Large Language Models to Measure GDPR Compliance in Cookie Banners Automatically" 2023, pp. 1-38. (Year: 2023).

Rebedea et al., "NeMo Guardrails: A Toolkit for Controllable and Safe LLM Applications with Programmable Rails" Oct. 16, 2023, arXiv: 2310.10501v1, pp. 1-15. (Year: 2023).

Sardanopoli, Donna "Systems and Methods for AI Integrated Compliance and Data Management" Oct. 25, 2023, U.S. Appl. No. 63/593,163. (Year: 2023).

Sun et al., "Conscendi: A Contrastive and Scenario-Guided Distillation Approach to Guardrail Models for Virtual Assistants" Apr. 27, 2023. (Year: 2023).

Sun et al., "Guardrail Machine Learning Model for Automated Software" Apr. 18, 2023, U.S. Appl. No. 63/460,280. (Year: 2023).

Theo Vasilis, Web scraping for AI: how to collect data for LLMs, Aug. 10, 2023, APIFY (2023).

Vekaria et al., "Before Blue Birds Became X-tinct: Understanding the Effect of Regime Change on Twitter's Advertising and Compliance of Advertising Policies" Sep. 22, 2023, arXiv: 2309. 12591v1, pp. 1-21. (Year: 2023).

Hassani et al., "Rethinking Legal Compliance Automation: Opportunities with Large Language Models", 2024 IEEE 32nd International Requirements Engineering Conference (RCE), pp. 432-440.

\* cited by examiner

100

COMPLIANCE
RULESET
DATA STORE
112

CONTENT ITEM
DATA STORE
110

NETWORK
104

NETWORK COMPUTING SYSTEM 114

CONTENT COMPLIANCE CHECK SYSTEM 106

NETWORK
104

END USER DEVICES 102

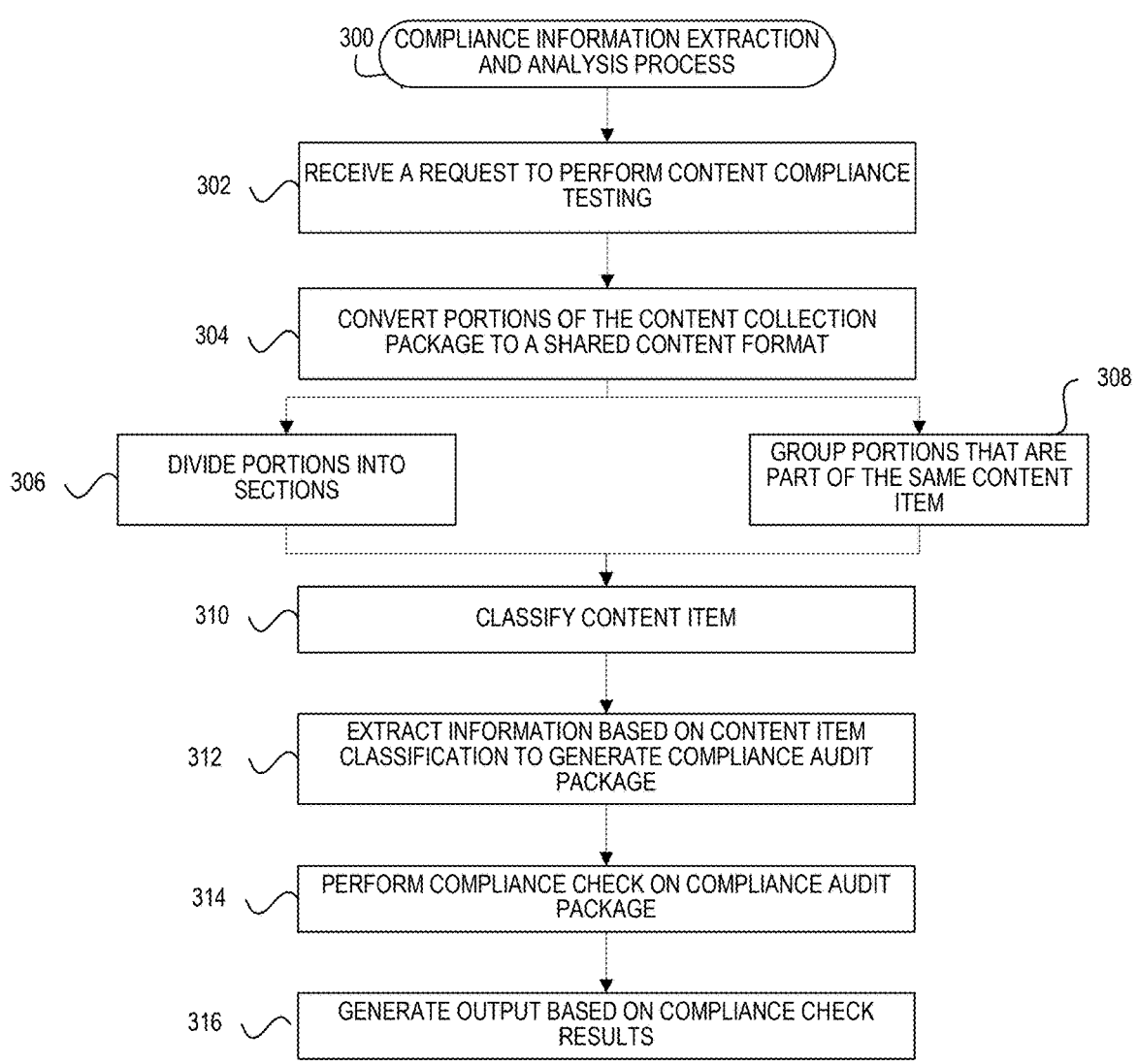

300   COMPLIANCE INFORMATION EXTRACTION AND ANALYSIS PROCESS

302   RECEIVE A REQUEST TO PERFORM CONTENT COMPLIANCE TESTING

304   CONVERT PORTIONS OF THE CONTENT COLLECTION PACKAGE TO A SHARED CONTENT FORMAT

306   DIVIDE PORTIONS INTO SECTIONS

308   GROUP PORTIONS THAT ARE PART OF THE SAME CONTENT ITEM

310   CLASSIFY CONTENT ITEM

312   EXTRACT INFORMATION BASED ON CONTENT ITEM CLASSIFICATION TO GENERATE COMPLIANCE AUDIT PACKAGE

314   PERFORM COMPLIANCE CHECK ON COMPLIANCE AUDIT PACKAGE

316   GENERATE OUTPUT BASED ON COMPLIANCE CHECK RESULTS

*FIG. 3A*

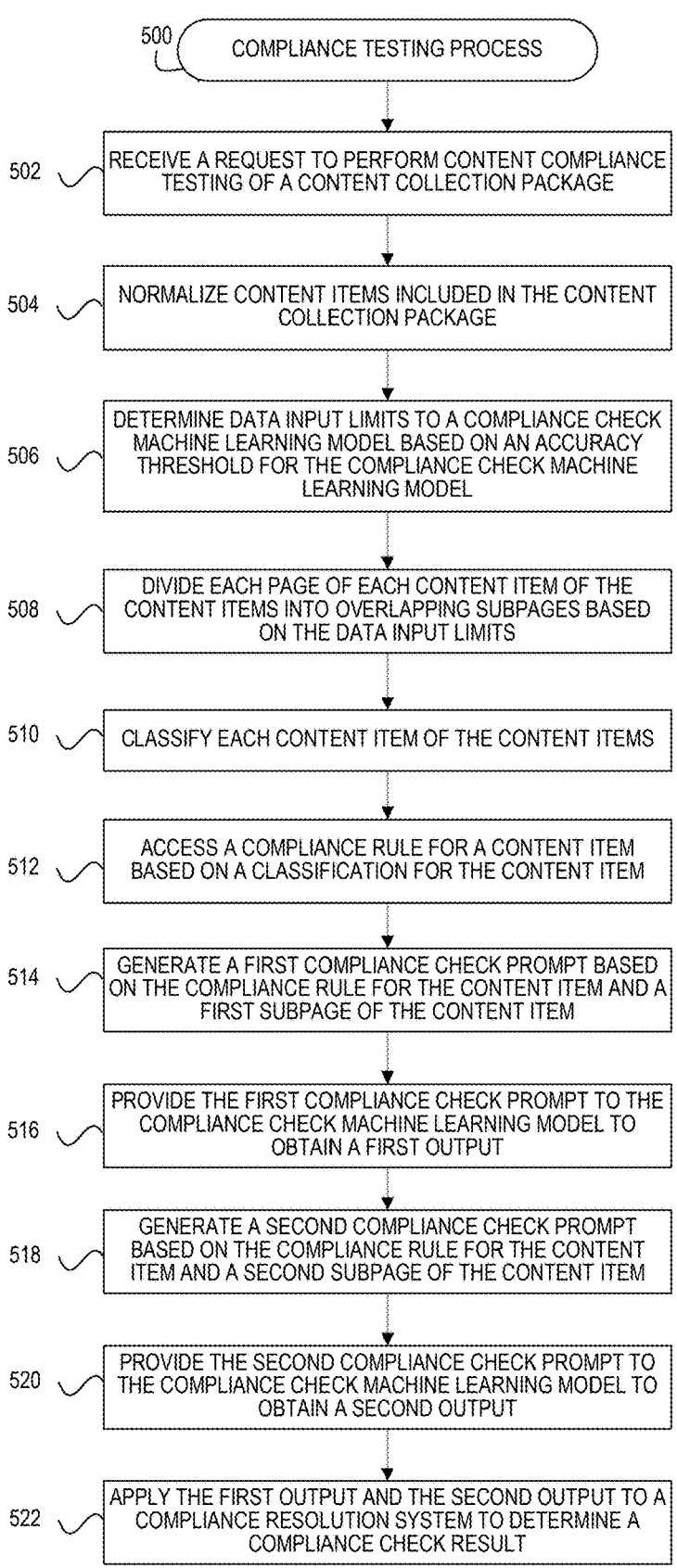

500 — COMPLIANCE TESTING PROCESS

502 — RECEIVE A REQUEST TO PERFORM CONTENT COMPLIANCE TESTING OF A CONTENT COLLECTION PACKAGE

504 — NORMALIZE CONTENT ITEMS INCLUDED IN THE CONTENT COLLECTION PACKAGE

506 — DETERMINE DATA INPUT LIMITS TO A COMPLIANCE CHECK MACHINE LEARNING MODEL BASED ON AN ACCURACY THRESHOLD FOR THE COMPLIANCE CHECK MACHINE LEARNING MODEL

508 — DIVIDE EACH PAGE OF EACH CONTENT ITEM OF THE CONTENT ITEMS INTO OVERLAPPING SUBPAGES BASED ON THE DATA INPUT LIMITS

510 — CLASSIFY EACH CONTENT ITEM OF THE CONTENT ITEMS

512 — ACCESS A COMPLIANCE RULE FOR A CONTENT ITEM BASED ON A CLASSIFICATION FOR THE CONTENT ITEM

514 — GENERATE A FIRST COMPLIANCE CHECK PROMPT BASED ON THE COMPLIANCE RULE FOR THE CONTENT ITEM AND A FIRST SUBPAGE OF THE CONTENT ITEM

516 — PROVIDE THE FIRST COMPLIANCE CHECK PROMPT TO THE COMPLIANCE CHECK MACHINE LEARNING MODEL TO OBTAIN A FIRST OUTPUT

518 — GENERATE A SECOND COMPLIANCE CHECK PROMPT BASED ON THE COMPLIANCE RULE FOR THE CONTENT ITEM AND A SECOND SUBPAGE OF THE CONTENT ITEM

520 — PROVIDE THE SECOND COMPLIANCE CHECK PROMPT TO THE COMPLIANCE CHECK MACHINE LEARNING MODEL TO OBTAIN A SECOND OUTPUT

522 — APPLY THE FIRST OUTPUT AND THE SECOND OUTPUT TO A COMPLIANCE RESOLUTION SYSTEM TO DETERMINE A COMPLIANCE CHECK RESULT

HETEROGENOUS CONTENT COLLECTION PACKAGE COMPLIANCE TESTING PROCESSES

INCORPORATION BY REFERENCE

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for using computer-based models and to computerized systems and techniques for using machine learning models such as language models to check compliance of content items with one or more rulesets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers can be programmed to perform calculations and operations using one or more computer-based models. For example, language models can be utilized to provide and/or predict a probability distribution over sequences of words for implementing various applications.

Language models include large language models, which are advanced AI systems trained on vast datasets to understand and generate human-like text. These models, based on neural networks, learn patterns in language from diverse sources, enabling them to respond to queries, write content, and engage in conversations. Their capabilities range from answering questions to creative writing, making them powerful tools for information retrieval, content creation, and language translation. However, they require careful handling to avoid biases and inaccuracies, as their responses are only as good as the data they were trained on.

SUMMARY

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

For ease of discussion, some implementations described herein relate to using one or more Artificial Intelligence (AI) models or machine learning models, such as language models (including, for example, Large Language Models ("LLMs")), to evaluates whether a content item (e.g., texts, images, audio, video, or any combination thereof) complies with a set of rules. Because LLMs may be prone to hallucinate (e.g., generate factually incorrect or nonsensical information) in their outputs, some implementations described herein generate prompts including instructions and details that guide or instruct LLMs to generate compliance results of content items according to structured formats. As discussed further herein, the instructions and details included in the prompts to the LLMs may utilize various prompt engineering related techniques to improve efficiency and accuracy of compliance checks performed by the LLMs on content items.

The present disclosure describes examples of systems (generally collectively referred to herein as "a content compliance check system" or simply a "system") and methods that can advantageously employ one or more LLMs for efficiently checking compliance of a large number (e.g., over hundreds or thousands) of content items with rule(s) through automating compliance checks that may be too onerous to be done manually or by individuals without specialized skills. The system can also advantageously accomplish accurate compliance checking by avoiding LLM hallucinations through various techniques described herein. Content items checked by the system may correspond to various forms of media content (e.g., texts, images, video, audio, mixture of text and images, or any combination thereof) that can include documents, files, manuals, emails, booklets, technical standards, advertisements, and so forth. The rules with which compliance checking is performed may correspond to rules promulgated by an agency (e.g., a government and/or regulatory agency), an entity, an organization, an institution, or the like.

The present disclosure further includes various processes, functionality, and interactive graphical user interfaces related to the system. According to various implementations, the system (and related processes, functionality, and interactive graphical user interfaces) can check compliance of content items with a ruleset responsive to receiving requests from users through user interfaces by utilizing one or more LLMs efficiently, with less turnaround time (e.g., within seconds or minutes) compared with compliance check performed manually that may result in turnaround time of days or months.

Additionally or alternatively, the system may perform compliance checking of content items with a ruleset on a particular schedule (e.g., weekly) or on an event-driven basis (e.g., when a regulatory agency promulgates changes to rules) through proactively locating and/or identifying content items (e.g., searching through webpages on the internet), and conduct compliance check on identified content items. Additionally, accuracy of compliance checks with the ruleset can be maintained compared with compliance check performed by professionals (e.g., compliance experts, attorneys, or the like) manually through providing instructions and/or details in prompts to the one or more LLMs or through utilizing various automatic validation and testing methodologies to verify or correct outputs from the one or more LLMs. By employing various implementations of the systems and methods described herein, the system or user can enable LLMs to efficiently perform compliance checks on content items with large corpus of rules while simultaneously generate compliance check results that are accurate and less prone to hallucinations, thus advantageously facilitating effective compliance checks on large corpus of rules and/or content items and helping preserve accuracy of compliance check results.

Thus, various embodiments of the present disclosure provide improvements to various technologies and technological fields. For example, as described above, the use of machine learning models (e.g., LLMs) with prompts that include tailored prompts may not only shorten turnaround time for performing compliance check of content items with large corpus of rules but improve accuracy of compliance check results. Other technical benefits provided by various embodiments of the present disclosure include, for example, avoiding LLMs hallucinations or errors through incorporating detailed instructions (e.g., instructing LLMs to return output in structured formats specified) in prompts provided to LLM(s) for performing compliance checks.

Additionally, various implementations of the present disclosure are inextricably tied to computer technology. In particular, various implementations rely on operation of technical computer systems and electronic data stores, automatic processing of electronic data that includes content items, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management and use of various types of electronic data (including computer-based models) for performing compliance checks on various forms of content items (e.g., texts, images, audio, video, or any combination thereof) with one or more rules (e.g., regulatory rules promulgated by agencies, internal guidelines, third-party requirements, or any combination thereof).

According to various implementations, large amounts of data (e.g., content items and/or a set of rules) may be automatically and dynamically analyzed interactively in response to one or more user inputs (e.g., a request to check compliance of a particular content item with rules relevant to a user), and the analyzed data is efficiently and compactly presented to a user by the system. Thus, in some implementations, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program or an application program), to render the interactive user interfaces. The interactive user interfaces may be displayed on, for example, electronic displays (including, for example, touch-enabled displays).

Additionally, designing computer user interfaces that are useable and easily learned by humans is a non-trivial problem for software developers. The present disclosure describes various implementations of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, models and model-related data, and may enable a user to more quickly and accurately check compliance of content items with ruleset(s) that are concerned by the user.

Further, the interactive and dynamic user interfaces described herein are enabled by innovations in efficient interactions between the user interfaces and underlying systems and components. For example, disclosed herein are improved methods for utilizing various computer engineering techniques to craft or tailor prompts to computer-based models for automatically and accurately perform compliance check on content items with a large corpus of rules included in a content collection package. A content collection package, as used herein, may refer to two or more associated content items. The content items may be associated, for example, based on a common source (e.g., a user or system that generated the content items), or a common use of the content items (e.g., each content item may be related to the same sales agreement, the same contract, the same transaction, etc.). Content items of the content collection package may be heterogenous and may have different content formats. As used herein, a content format may refer to a modality of a content item (e.g., image, text, multimodal, etc.), or a structure of content of the content item (e.g., an object definition, a schema, etc.). Throughout the present description, reference may be made to a deal jacket as a type of content collection package in order to simplify description. A deal jacket may include a collection of documents relating to the transfer of an interest (e.g., sale, lease, financing, etc.) in property (e.g., a vehicle, a house, etc.).

According to various implementations, the system (and related processes, functionality, and interactive graphical user interfaces), can advantageously automatically identify content items (e.g., documents) within a corpus of related content items (e.g., a deal jacket) and parse such content item to identify information relevant to evaluating compliance with a ruleset. The system may also evaluate if a content item complies with a ruleset, and present compliance check results to users within a short amount of time. By providing tailored prompts that may include detailed instructions to guide LLMs in performing compliance checks, the system may avoid LLM hallucinations and prevent erroneous or inferior outputs of LLMs from being presented to user through user interfaces.

Thus, various implementations of the present disclosure can provide improvements to various technologies and technological fields, and practical applications of various technological features and advancements. For example, as described above, existing computer-based model management and integration technology is limited in various ways, and various implementations of the disclosure provide significant technical improvements over such technology. Additionally, various implementations of the present disclosure are inextricably tied to computer technology. In particular, various implementations rely on operation of technical computer systems and electronic data stores, automatic processing of electronic data, and the like. Such features and others (e.g., processing and analysis of large amounts of electronic data, management of data migrations and integrations, and/or the like) are intimately tied to, and enabled by, computer technology, and would not exist except for computer technology. For example, the interactions with, and management of, computer-based models described below in reference to various implementations cannot reasonably be performed by humans alone, without the computer technology upon which they are implemented. Further, the implementation of the various implementations of the present disclosure via computer technology enables many of the advantages described herein, including more efficient management of various types of electronic data (including computer-based models) for performing compliance checks on content items (e.g., texts, images, audio, video, or any combination thereof) with one or more rules (e.g., regulatory rules promulgated by agencies) accurately.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

In various implementations, systems and/or computer systems are disclosed that comprise a computer-readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer-readable storage medium are disclosed, wherein the computer-readable storage medium has program instructions embodied therewith, the program instructions executable by one or more processors to cause the one or more processors to perform operations comprising one or more aspects of the above- and/or below-described implementations (including one or more aspects of the appended claims).

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure. In addition, various features of different disclosed embodiments can be combined to form additional embodiments, which are part of this disclosure. Further, one or more features or structures can be removed or omitted.

FIG. 3A shows a flowchart illustrating example operations of the compliance check system for performing compliance information extraction and analysis on content items responsive to receiving requests from end user devices in accordance with certain embodiments.

FIG. 5 presents a flowchart illustrating an example compliance testing process in accordance with certain embodiments.

DETAILED DESCRIPTION OF CERTAIN EMBODIMENTS

Figure 1:
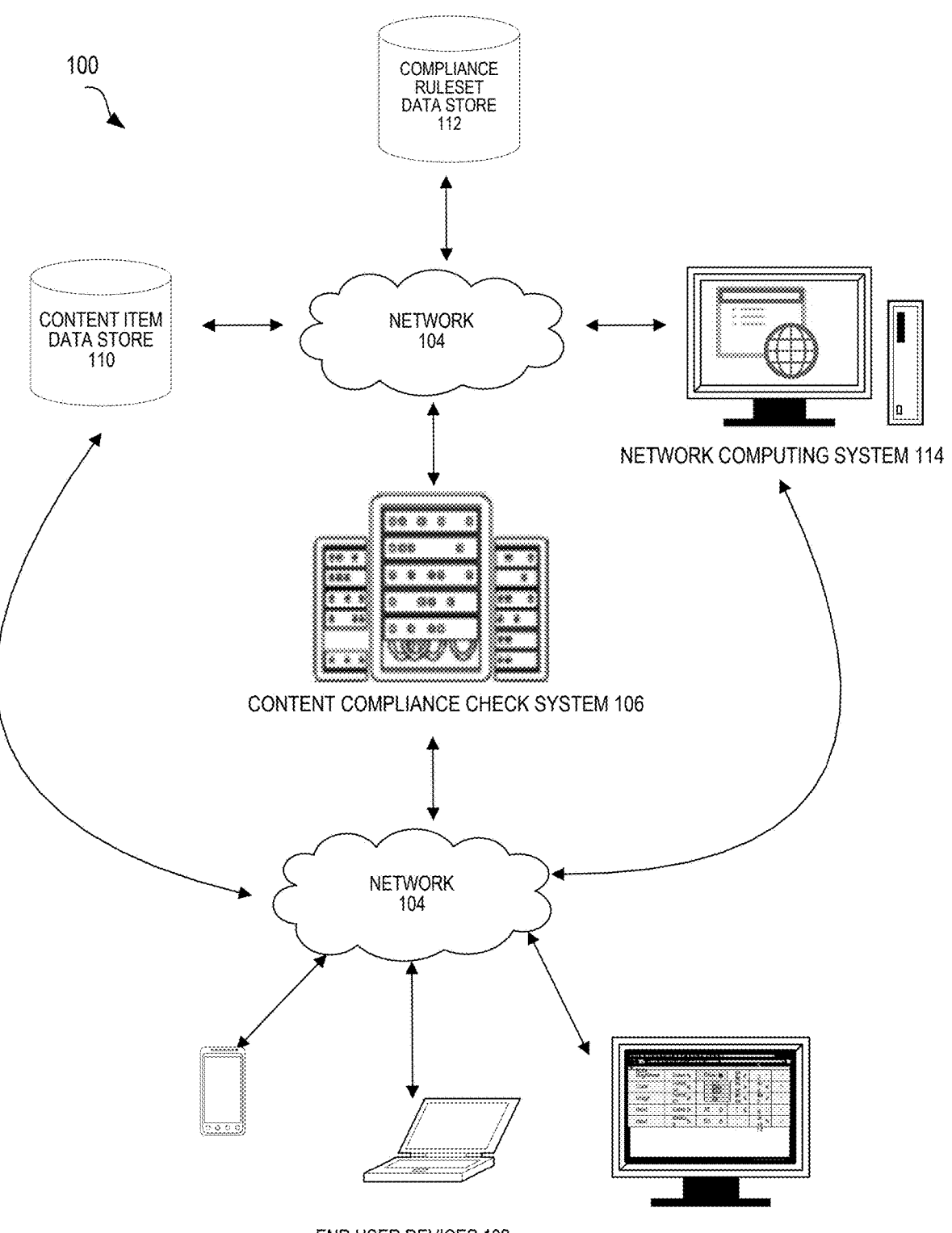
FIG. 1 depicts an example computing environment in which embodiments of the present disclosure can be implemented by a content compliance check system to perform compliance testing.

The headings provided herein, if any, are for convenience only and do not necessarily affect the scope or meaning of the claimed invention. Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Overview

Generally described, aspects of the present disclosure relate to systems and methods that utilize one or more machine learning models (e.g., computer vision machine learning models, Large Language Models ("LLMs"), etc.) to check if a content item (e.g., texts, images, audio, video, or any combination thereof) complies with a set of rules. More specifically, some implementations described herein generate prompts including instructions and details that guide or instruct LLMs to generate compliance results of content items according to structured formats. As discussed further herein, the instructions and details included in the prompts to the LLMs may utilize various techniques to improve efficiency and accuracy of compliance checks performed by the LLMs on content items.

Currently, processes for checking compliance of content collection packages (e.g., a set of associated heterogenous content items) including content items (e.g., texts, images, audio, video, or any combination thereof) with associated rulesets usually include performing various unintegrated, fragmented, or manual steps. For example, content items (e.g., technical manuals, movies, booklets, or the like) may need to be retrieved and then presented to a compliance professional (e.g., a compliance attorney, expert, or specialist) for review. Some of the steps involved may be time-consuming (e.g., taking from days to months), costly, and labor intensive, making these processes unscalable and unsuitable for performing compliance check on a large number of content items.

To increase accuracy and to reduce human labor and time consumed on performing compliance checks on content collection packages, or content items of a content collection package, various computer data analysis and processing techniques can be employed. For example, computer programs that implement deterministic logic may be utilized to analyze content items for generating compliance check results more automatically. More specifically, by searching for some keywords present in a content item of a content collection package, a computer program may determine deterministically whether the content item complies with a ruleset. Yet, computer programs that implement or are programmed based on deterministic logic may not be well-equipped to handle more complex content items and/or rulesets to perform compliance checks accurately. For example, computer programs based on deterministic logic may not be able to associate variants of keywords or phrases that are identical or similar semantically because of more rigid or inflexible nature of deterministic logic, and may generate incomplete or inaccurate compliance check results.

To better distinguish or differentiate subtlety and nuances in meaning associated with content items and/or rulesets, artificial intelligence or machine learning models can be incorporated into a content compliance check system. For example, LLMs that can understand intricate patterns in natural language and generate text that is more coherent and contextually relevant due to its extensive training may be employed to improve accuracy of compliance check with a large set of rules. AI models or LLMs may also be helpful to identify textual contents within images (e.g., pictures) of content items that may be hard for computers to distinguish from other texts of content items. For example, pictures of content items may include images of various objects (e.g., people, trees, cars, buildings, or the like) with text overlaid on the various object images. The text overlaid on the various objects can be difficult for a computing system to identify without leveraging vision processing capabilities of AI models or LLMs.

To address at least a portion of the technical problems described above, some embodiments of the present disclosure implement systems (generally collectively referred to herein as "a content compliance check system" or simply a "system") and methods that can advantageously employ one or more machine learning models, such as LLMs, for efficiently checking compliance of content items with a set of compliance rules. In some cases, the content items may comprise a large number (e.g., over hundreds or thousands) of content items. According to various implementations, the system can check compliance of content items with a ruleset (e.g., a compliance ruleset with one or more regulatory rules) responsive to receiving requests from users through user interfaces by utilizing one or more LLMs efficiently, with less processing or turnaround time (e.g., within seconds or minutes) compared with compliance checks performed manually that may result in turnaround time of days or months.

Through providing instructions and/or details in prompts to the one or more LLMs, accuracy of compliance checks with the ruleset can be maintained or improved compared with compliance check performed by professionals (e.g., compliance experts, attorneys, or the like) manually. By employing various implementations of the systems and methods described herein, the system or users of the system can enable LLMs to more automatically and efficiently perform compliance checks on content items with large corpus of rules while simultaneously generate compliance check results that are accurate, thus advantageously facilitating effective compliance checks on large corpus of rules and/or content items.

Example Preprocessing and Prompt Generation Features

As noted above, the system may advantageously apply various techniques to content items and/or rules to generate tailored or detailed prompts that enable LLMs to perform compliance checks on the content items with the rules for generating accurate compliance check results. Content items checked by the system for various compliance purposes may be any type of electronic data that corresponds to various media contents (e.g., texts, images, audio, video, mixture of text and images, mixture of text and audio, or any combination thereof), and can include documents, files, web pages, user manuals, emails, booklets, movies, technical standards, scripts, brochures, data files, video clips, advertisements, and/or any combination of the foregoing and/or the like. Content items analyzed by the system may be provided (e.g., identified, uploaded, or generated) by users of the system, for example, through users' operations on user interface(s) of the system. Content items that may be processed and/or analyzed by the system may be stored in a data store (e.g., a third-party data store or a data source external to the system), and may be obtained by the system to store in a database or a data store of the system.

The rules with which compliance checking is performed may correspond to rules promulgated by an agency (e.g., a regulatory agency), a private entity, a public entity, an organization, an institution, a government (e.g., a local government, a state government, or the federal government), or the like. The rules may be stored as electronic data, such as text, documents, slides, manuals, brochures, booklets, and/or any combination of the foregoing and/or the like. The rules that may be used by the system to perform compliance checks of content items may be stored in a data store (e.g., a data store managed by an organization, an entity, a government, or a data source external to the system) that may be accessible to the public or the system, and may be obtained by the system to store in a database or a data store of the system for analyzing if content items comply with the rules. For example, some rules used by the system may be compliance rules promulgated by a state or federal government that forbids and/or requires the presentation or acknowledgement of certain information during the process of transferring ownership of property. In this example, a content item that is to be processed and analyzed by the system may be a user manual for operating the particular machinery or instrument. In some implementations, users of the system may identify, select (e.g., through a user interface of the system), or provide the rules to the system. Alternatively, or additionally, the system may identify the rules without direct selection or identification by a user. For example, based on a location or residence information of a user provided by the user or identified based on information provided by the user, the system may determine the rules (e.g., rules enacted by a local agency or a state government associated with a location or residence of the user) that a content item should comply with.

In some implementations, after obtaining a set of heterogenous content items (e.g., as a content collection package) and/or a ruleset for performing compliance checks, the system may perform some input processing or preprocessing on the content item before performing compliance checks on the content item with the ruleset. The preprocessing may include removing portion(s) of a content item that are irrelevant to compliance check(s) to be performed, converting a content item to format(s) that the system may handle, segmenting a content item into segments for ease of further processing, or the like. In various examples, the system may employ one or more LLMs to perform at least a portion of the preprocessing, such as converting portion(s) of content items that include non-textual elements into text. For example, the system may employ one or more LLMs that support optical character recognition (OCR) technology to convert image portion(s) of a content item into text (e.g., natural language words, phrases, sentences, paragraphs, or the like) that may be further analyzed by the system. Additionally and/or optionally, the system may employ one or more LLMs to filter or remove portion(s) of a content item that is unrelated to compliance with some or all of the ruleset. For example, some compliance rule(s) may be directed toward particular portion(s) of a content item, and the system may employe the one or more LLMs to extract the particular portion(s) (e.g., text notes inside the content items) of the content item while removing remaining portion (s) (e.g., images inside the content contents) of the content item for further processing and analysis. It should be noted that, in some cases (e.g., when content items are purely text and all text are related to compliance checks with associated rules), the system may optionally bypass or omit performing preprocessing on content items.

Based on content items extracted or removed through preprocessing, the system may employ various techniques for generating prompts to one or more LLMs employed by the system to conduct compliance checks of content items with a ruleset. The various techniques may include dividing a larger prompt to multiple smaller prompts, specifying in a prompt requested structures for outputs from an LLM, using close-ended terms rather than open-ended terms in the prompts, or the like, and will be discussed in detail with reference to FIG. 2A.

Example Output Processing Features

To maintain performance and accuracy, the system may employ various validation, correction, and testing methodologies to verify or perform post-processing of outputs from an LLM. Various validation, correction and testing techniques may include comparing results generated by the system with predetermined results, fine-tuning or adjusting configuration utilized by an LLM employed by the system, automatically correcting compliance check results, or the like, and will be discussed in greater detail with reference to FIG. 2A.

Example User Interface Features

The system may further allow a user to interact with the system through a user interface (e.g., a graphical user interface ("GUI") or other types of user interfaces) to perform various functions related to conducting compliance checks on content items with regulatory rules. In some examples, the system may provide a user the option to identify (e.g., provide a network address or location where a content item can be accessed) and/or upload a content item the user wishes to perform compliance check on. Additionally and/or optionally, the system may allow a user to select one or more compliance rules or rulesets for performing compliance checks. For example, the system may allow the user to select a compliance ruleset enacted by the federal government directed toward regulating a certain type of commercial speech, or allow the user to select a corresponding compliance ruleset enacted by a state government. In some examples, a user interface of the system may enable a user to provide a user feedback regarding the accuracy of compliance check performed by the system. In some examples, a user interface of the system may allow a user to provide instructions (e.g., request a particular format of output from the system) or preferences on how a compliance check should be performed.

Example Large Language Model Functionality

According to various implementations, the system can incorporate and/or communicate with one or more machine learning models (e.g., LLMs) to perform compliance checks on content items and/or various functions. Such communications may include, for example, a context associated with an aspect or analysis being performed by the system, a user-generated prompt, an engineered prompt, prompt and response examples, example or actual data, and/or the like. For example, the system may employ an LLM, via providing an input to, and receiving an output from, the LLM. The output from the LLM may be parsed and/or a format of the output may be updated to be usable for various aspects of the system or for presenting to users of the system.

In addition to employing LLMs to perform compliance checks on content items, the system may employ LLMs to, for example, perform preprocessing (e.g., converting an image within a content item into text using OCR technology) on content item received by the system, perform compliance checks in parallel (e.g., on multiple LLMs concurrently), determine natural language words, sentences, paragraphs that are similar or identical semantically, determine a modeling objective (e.g., based on one or more models and/or other information), identify additional models that may be related to the modeling objective, determine or generate a model location, and/or the like.

Example Computing Environment

FIG. 1 depicts an example computing environment 100 in which embodiments of the present disclosure directed to a compliance testing system for content items can be implemented by a content compliance check system 106 to efficiently and accurately check compliance of content items with one or more compliance rulesets. The content items may be heterogenous content items (e.g., separate documents). Groups of content items may be associated with each other, for example content items associated with the same document or the same transaction, and the group of associated content items may be analyzed in whole or in part for compliance with the one or more compliance rulesets. The computing environment 100 may include the content compliance check system 106, a network 104, a content item data store 110, a compliance ruleset data store 112, a network computing system 114, and end user devices 102. The content compliance check system 106 can be accessed by the end user devices 102 through the network 104. The network computing system 114 may host one or more websites that can be accessed by the end user devices 102 through the network 104. The content compliance check system 106 can access the content item data store 110, compliance ruleset data store 112, and the network computing system 114 through the network 104.

Generally described, the content compliance check system 106 can check compliance of a large number (e.g., over hundreds or thousands) of content items through automating compliance checks. The content compliance check system 106 can also determine whether content items are associated with each other, for example as part of the same group or same transaction. For example, the content compliance check system 106 may check whether certain content items stored in the content item data store 110 are associated with each other. When content items associated with a transaction are identified, the content compliance check system 106 can determine whether the associated content items comply with a compliance ruleset stored in the compliance ruleset data store 112. The compliance ruleset may include a set of criteria indicating compliance with the compliance ruleset. The content compliance check system 106 may perform compliance checks responsive to receiving request(s) to perform compliance checks from the end user devices 102. Alternatively, or in addition, the content compliance check system 106 may perform compliance checks based on a triggering event, such as a content item being uploaded to the content item data store 110.

The content compliance check system 106 may be implemented in one or more computing devices for automatically processing and checking compliance of content items with one or more compliance rulesets. The content compliance check system 106 (or individual components thereof not shown in FIG. 1) may be implemented on one or more physical server computing devices. In some implementations, the content compliance check system 106 (or individual components thereof) may be implemented on one or more host devices, such as blade servers, midrange computing devices, mainframe computers, desktop computers, or any other computing device configured to provide computing services and resources, such as obtaining, storing, processing and testing compliance of content items.

In some implementations, the features and services provided by the content compliance check system 106 may be implemented as web services consumable via one or more communication networks (e.g., the network 104). In further implementations, the content compliance check system 106 (or individual components thereof) is provided by one or more virtual machines implemented in a hosted computing environment. The hosted computing environment may include one or more rapidly provisioned and released computing resources, such as computing devices, networking devices, and/or storage devices.

In some implementations, the content compliance check system 106 may be a part of a networked computing environment, such as a cloud provider network (e.g., a "cloud"), which may correspond to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to provide various services, such as automatically checking compliance of a large number of content items with regulatory rule(s) using machine learning model(s) and content item processing techniques as disclosed in the present disclosure. The computing services provided by the cloud that may include the content compliance check system 106 can thus be considered as both the applications delivered as services over a publicly accessible network (e.g., the Internet, a cellular communication network) and the hardware and software in cloud provider data centers that provide those services.

End user devices 102 may communicate with the content compliance check system 106 via various interfaces such as application programming interfaces (API) as a part of cloud-based services. In some implementations, the content compliance check system 106 may interact with the end user devices 102 through one or more user interfaces, command-line interfaces (CLI), application programing interfaces (API), and/or other programmatic interfaces for requesting actions or services, such as receiving a request to perform a compliance testing of a regulated content collection package with a compliance ruleset from the end user devices 102, or presenting results of the compliance testing to the end user devices 102.

Various example end user devices 102 are shown in FIG. 1, including a desktop computer, laptop, and a mobile phone, each provided by way of illustration. In general, the end user devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

In some implementations, the network 104 may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some implementations, at least some parts of the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some implementations, the content compliance check system 106 may access content items stored in the content item data store 110 via the network 104. In some cases, the content item data store 110 may include a plurality of data stores. Each data store may be distributed across one or more additional storage systems. Further, each data store may be configured to store a different type of information, or information from a different source. The content item data store 110 may store content items that will be checked or tested by the content compliance check system 106 for compliance with one or more compliance rulesets. The content item data store 110 may also store metadata or other information for the stored content items indicating an associated between content items, for example as part of the same document or transaction. As illustrated in FIG. 1, end user devices 102 and/or the network computing system 114 may also access the content item data store 110 via various interfaces such as application programming interfaces (API) as a part of cloud-based services.

In some implementations, the content item data store 110 that store regulated sets of content items may be any computer-readable storage medium and/or device (or collection of data storage mediums and/or devices). Regulated sets of content items may be generated by the network computing system 114, the end user devices 102, the content compliance check system 106, and/or other computing systems or devices not illustrated in FIG. 1. Examples of the content item data store 110 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. In some examples, the content item data store 110 and the content compliance check system 106 may be parts of a hosted storage environment that includes a collection of physical data storage devices that may be remotely accessible and may be rapidly provisioned as needed (commonly referred to as "cloud" storage). Individual content items of a content collection package can be stored in the same content item data store 110, or individual content items of the content collection package can be stored in different content item data store 110.

Additionally, the content compliance check system 106 may access one or more compliance rulesets stored in the compliance ruleset data store 112 via the network 104. The compliance ruleset data store 112 may, in some cases, include a plurality of data stores. Each data store of the compliance ruleset data store 112 may be distributed across one or more storage systems. Further, each data store may be configured to store a different type of compliance ruleset information (e.g., federal compliance rules, dealership specific compliance rules, etc.). The compliance ruleset data store 112 may store one or more compliance rulesets promulgated by a regulatory entity (e.g., a regulatory agency), state government, federal government, local government, and/or a user of the content compliance check system 106. The compliance ruleset data store 112 may be any computer-readable storage medium and/or device (or collection of data storage mediums and/or devices). Examples of the compliance ruleset data store 112 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. The compliance ruleset data store 112 may be managed by a private entity, a public entity, an organization, an institution, a state government, a federal government, a foreign government, an international regulatory organization, or the like. In some examples, the compliance ruleset data store 112 and the content compliance check system 106 may be parts of a hosted storage environment that includes a collection of physical data storage devices that may be remotely accessible and may be rapidly provisioned as needed (commonly referred to as "cloud" storage).

In some implementations, the content compliance check system 106 and the compliance ruleset data store 112 may be a part of a cloud provider network mentioned above and may implement various computing resources or services, which may include performing compliance testing on content items as described in the present disclosure, a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated).

The network computing system 114 may include one or more computing devices that host one or more websites, webpages, or content pages to provide various online services or products. The one or more websites may present regulated content items that may be accessible by the end user devices through the network 104. In some implementations, the network computing system 114 may include one or more data stores (not shown in FIG. 1) that store regulated content items for presenting to the end user devices 102.

In some implementations, the content compliance check system 106 may perform compliance testing or checks on content item(s) accessed by the end user devices 102 and/or stored in the content item data store 110 responsive to receiving request(s) from the end user devices 102 to perform content compliance testing on the content item(s). The content compliance check system 106 may, on a particular schedule or on an event-driven basis without receiving request(s) from the end user devices, perform compliance testing or checks on content item(s) presented by the network computing system 114 and accessible to end user devices 102 through one or more network addresses in a network (e.g., the Internet). In some implementations, the content compliance check system 106 may perform compliance testing of a regulated content item stored in the content item data store 110 and/or the network computing system 114 when the content compliance check system 106 is notified of or detects that an end user device 102 is attempting to access the regulated content item.

Example Content Compliance Check System

Figure 2A:
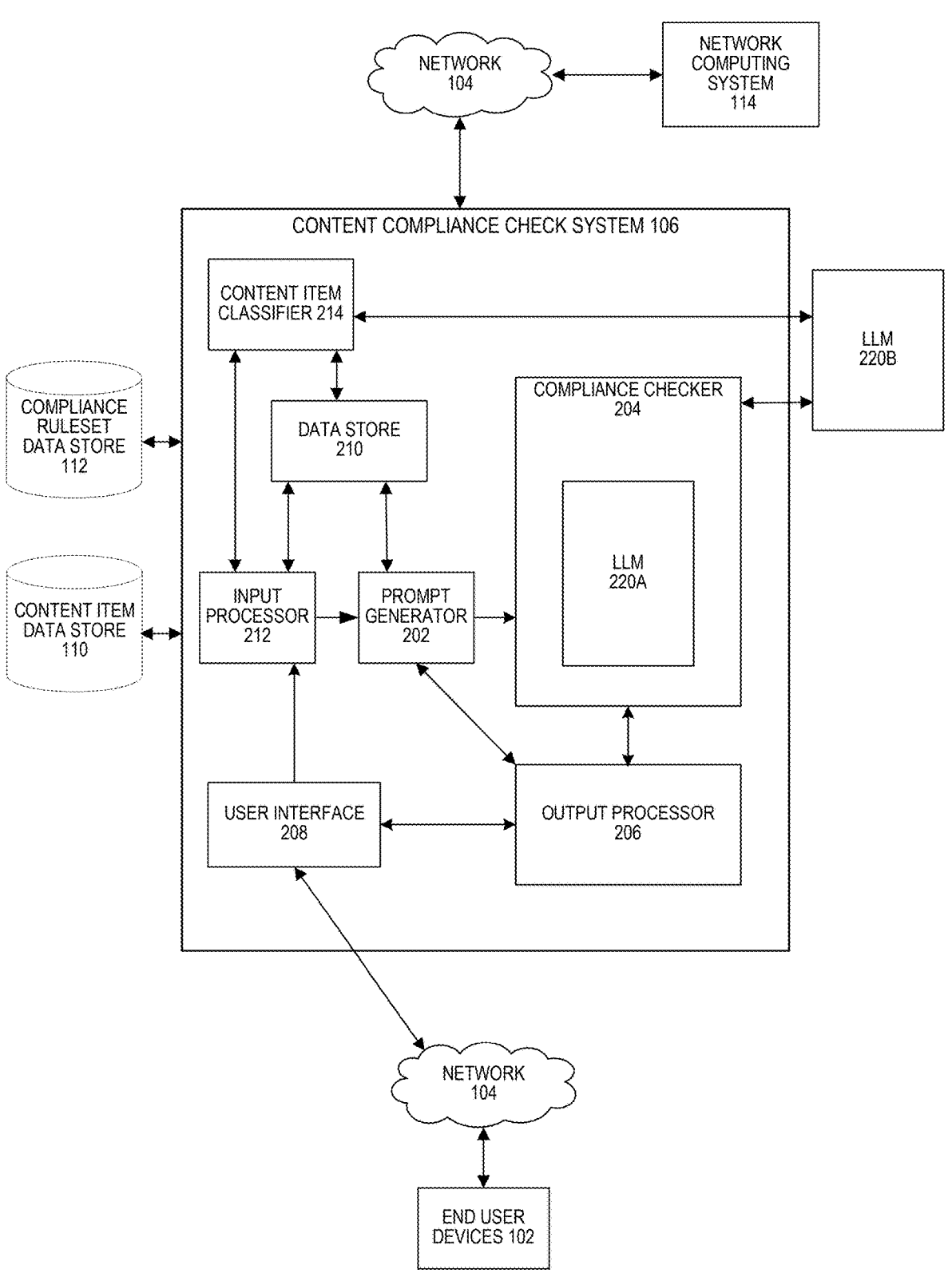
FIG. 2A depicts an example block diagram of the content compliance check system of FIG. 1, where the content compliance check system can be utilized to perform compliance testing on content items using a compliance ruleset in accordance with certain embodiments.

FIG. 2A depicts an example block diagram of the content compliance check system 106 of FIG. 1. Components of the content compliance check system 106 can implement various data processing and analysis techniques to check compliance of regulated content collection packages with one or more compliance rulesets. The content compliance check system 106 includes a data store 210, a prompt generator 202, a user interface 208, an input processor 212, a content item classifier 214, a compliance checker 204 that may include LLM 220A and/or communicate with LLM 220B, and an output processor 206. In various implementations, the prompt generator 202, the user interface 208, the input processor 212, the compliance checker 204, and the output processor 206 can be implemented as software components that program hardware (e.g., processors) to perform respective functions.

In some implementations, the user interface 208 is configured to generate user interface data that may be rendered on the end user devices 102, such as to receive a request to perform compliance check on content items with a compliance ruleset, an initial user input, as well as later user input that may be used to initiate further data processing. In some implementations, the functionality discussed with reference to the user interface 208, and/or any other user interface functionality discussed herein, may be performed by a device or service outside of the content compliance check system 106 and/or the user interface 208 may be outside the content compliance check system 106. Example features related to user interfaces are described in greater detail below with references to FIG. 6.

In some implementations, the input processor 212 is configured to access content items that form a content collection package stored in the content item data store 110 and access one or more compliance rulesets stored in the compliance ruleset data store 112. The input processor 212 may provide the accessed content items and compliance ruleset to the prompt generator 202 for generating prompts to machine learning model(s) (e.g., the LLM 220A and/or the LLM 220B) for performing compliance checks. Further, the input processor 212 may perform initial processing on the content items of the content collection package. The input processor 212 may chunk a portion of the content collection package into a plurality of portions (e.g., a document page, a portion of a page, multiple pages, etc.). The size of the portions of the plurality of portions may be based on a size threshold determined based on a maximum input size of a machine learning model (e.g., the LLM 220A, or the LLM 220B). These portions may undergo further processing or be provided to the prompt generator 202 in place of or in addition to the content item. For example, the input processor 212 may provide at least a portion of a content item to a machine learning model (e.g., the LLM 220A, or the LLM 220B) to identify text in the content item. The input processor 212 may extract the text from the at least a portion of the content item and provide the extracted text in place of or in addition to the content item from which the text was extracted. Additionally, the input processor 212 may classify content items, or group portions of the content collection package based on a content item the portions are associated with. For example, if it is determined that two or more portions of the content collection package are associated with the same document, they may be grouped together. The input processor 212 may provide information indicating this association between the two or more content items to the prompt generator 202.

In some cases, the content item classifier 214 may divide the content collection package into portions (e.g., pages, a subset of a page, a group of pages, documents, etc.). The content item classifier 214 is configured to identify portions of the content collection package. Identifying portions of the content collection package can include determining whether two (or more) portions of the content collection package are associated with or are part of the same content item. Further, the content item classifier 214 can classify content items of the content collection package. Classifying the content items may include identifying the type of each content item (e.g., warranty document, government disclosure, title document, etc.), the status of the content item (e.g., complete or incomplete), or any other type of classification criteria or taxonomy.

In some embodiments, the content item classifier 214 may use a machine learning model (e.g., LLM 220B) to determine whether a first portion and a second portion of the content collection package are associated with or are part of the same document. For example, the content item classifier 214 may provide a first portion and a second portion of the content collection package as input to the LLM 220B as part of a prompt instructing the LLM 220B to determine whether the first portion and the second portion are associated with the same document. In some embodiments, the content item classifier 214 may provide a request to the prompt generator 202 to generate the prompt for the machine learning model. The prompt generator 202 may generate the prompt, for example based on a prompt template for determining whether two portions are associated with the same document, and transmit the completed prompt to the content item classifier 214 so that the content item classifier 214 may transmit the prompt to the LLM 220B.

Additionally, the content item classifier 214 may convert portions of the content collection package into a shared content format. Advantageously, converting the portions of the content collection package into a shared content format may allow for the use of the same machine learning model for associating or classifying each portion, even where different portions may include information in various formats (e.g., image, text, video, a JSON object, multimodal information, etc.). In some example use cases, the content item classifier 214 may access a first page and a second page included in the content collection package. The content item classifier 214 may convert the first page into an image of the first page, and convert the second page into an image of the second page. The content item classifier 214 may provide the image of the first page and the image of the second page as input to a machine learning model to determine whether the pages are part of the same document. This determination may be based on the content of the first page and the second page. For example, the content may be a document identifier, a document header, a watermark, or a portion of text.

As a further advantage, the machine learning model may be trained to analyze information in the shared content format. This may simplify the training process, and increase the efficiency of analysis, for the machine learning model. Additionally, where supervised learning is used, the use of a shared content format may reduce the work required to prepare a training dataset for training the machine learning model. To simplify discussion, and not to limit the present disclosure, the shared content format referred to throughout this description may be an image format. However, it should be understood that other formats are possible. Any shared content format acceptable as input by the machine learning model may be used to achieve a similar benefit, for example a text format or an audio format.

To allow the machine learning model to determine whether a first portion of the content collection package and a second portion of the content collection package are associated with each other (e.g., part of the same document), one or both of the portions may be included as part of the prompt to the machine learning model. The portions may be included in their original format or in the shared content format. In some use cases, the second portion may be stored in a memory of the machine learning model from a prior operation of the machine learning model (e.g., a prompt history). In some embodiments, the second portion is consecutive to (e.g., preceding or subsequent to) the first portion. For example, beginning at the first portion, the content item classifier 214 may provide a current portion and a subsequent portion as input to the machine learning model to determine whether the current portion and the subsequent portion are associated with each other (e.g., pages of the same document). Alternatively, each portion of the content collection package may be stored as part of a memory (e.g., a prompt history) and compared to a portion of the content collection package provided as part of a new prompt.

Additionally, the content item classifier 214 may classify associated portions of the content collection package, for example by the document type of the associated portions. Prior to classifying a set of associated portions, the content item classifier 214 may divide the portions of the content collection package into a set of parts. The content item classifier 214 may divide a portion in its converted shared content format version, generated previously by the content item classifier 214. For example, each portion of the content collection package may be converted by the content item classifier 214 into an image. The content item classifier 214 may divide the image representing the portion into a set of parts (e.g., halves, thirds, etc.). Advantageously, dividing the portion into a set of parts may improve the ability of a machine learning model to classify the portion by reducing the total amount of information to be analyzed in each operation of the machine learning model. Further, some machine learning models may have an input size limit (e.g., an input token limit) and the content item classifier 214 may divide the portion into a set of parts each having a size that is equal to or less than the input size limit of the machine learning model. Alternatively, the size of each part may be determined based on an optimal input size for the machine learning model based on a likelihood the machine learning model will provide a correct or useful response. For example, a machine learning model may be found to have a limited ability to extract pricing information from an image of a full page of a purchase agreement document containing many different numbers, but may be found to have an improved ability to extract pricing information from a half of an image of the page of the purchase agreement document. The content item classifier 214 may divide images of portions of the content collection package based on this determined improved ability of the machine learning model to extract relevant information from input of that size.

The content item classifier 214 may further classify sets of portions of the content collection package determined to be associated with the same content item (e.g., a document) and extract relevant information from the sets of portions of the content collection package to generate a compliance determination dataset for use by the compliance checker 204 when conducting compliance checking. Classifying the sets of portions may be performed by use of a machine learning model (e.g., LLM 220B). For example, the content item classifier 214 may access a set of rules (e.g., from the compliance ruleset data store 112) that indicate types of documents, and the types of identifying features that may identify the document. Identifying features that may be used to identify the document may include, for example, a document header, a document identifier (e.g., a form number), a type of information contained in the document (e.g., pricing information, privacy information, banking information, financing information, etc.). The content item classifier 214 may provide the document identifying features and one or more portions of the content collection package as input to the machine learning model to cause the machine learning model to generate a response indicating a classification of a set of portions of the content collection package. In some embodiments, the content item classifier 214 may use the generated image parts of a portion of the content collection package to classify a set of portions as a type of document. As previously noted, using parts of a portion may allow for an improved ability of a machine learning model to identify relevant information accurately.

The content item classifier 214 may perform a data extraction process to extract target information from the classified documents. Target information may be determined based in part on the classification of the document from which information is being extracted. In some cases, target information may be determined based at least in part on a type of compliance check the compliance checker 204 is performing on the content collection package. For example, the compliance check may determine whether the content collection package complies with a state regulation on the sale of a used vehicle. Compliance with the state regulation may require that a purchaser be provided a price, have signed a contract, and that the purchaser was provided with a list of purchaser rights under state law. The content item classifier 214 may determine whether documents which may be associated with these requirements have been classified from the content collection package. If potentially relevant documents are present, the content item classifier 214 may extract the target information from such relevant documents. As discussed, target information may differ based on the classification of the documents. For example, for a document identified as the purchase contract, the content item classifier 214 may attempt to extract a price of the vehicle, a customer signature, and a method of payment. In some cases, the rules used to identify target information may be contingent on other target information being present. For example, if a first document indicates a co-signer on a loan, the content item classifier 214 may determine that additional target information related to the co-signer (e.g., a credit history check) is required to be present to comply with relevant regulations. Based on identifying the co-signer, the content item classifier 214 may determine whether a potentially relevant document associated with a co-signer has been classified. If a document relevant to the co-signer is classified, the content item classifier 214 may attempt to extract target information indicating the credit history check was performed on the co-signer.

The prompt generator 202 is configured to generate a prompt to a machine learning model, such as LLM 220A and/or LLM 220B. The prompt generator 202 may generate prompts based on data and/or information received from the input processor 212. The data and/or information received from the input processor 212 may include one or more content items obtained from the content item data store 110, one or more compliance rulesets obtained from the compliance ruleset data store 112, data provided by the user interface 208 (e.g., a user input), and/or data provided by other components (e.g., the output processor 206, the data store 210) of the content compliance check system 106. In the example of FIG. 2A, the end user device 102 may include any type of computing device that may be operated by a user or an automated system. The end user device 102 may provide a user input to the content compliance check system 106 indicating a natural language request to perform data analysis with respect to a content item or a set of content items included as part of a content collection package. The user input, the content items of the content collection package, and a compliance ruleset along with other supplemental information or instructions, if any, may be provided to the prompt generator 202 through the input processor 212. The prompt generator 202 may generate a prompt that will be transmitted to the compliance checker 204, the LLM 220A and/or the LLM 220B. Further, the prompt generator 202 may generate a plurality of prompts, where each prompt of the plurality of prompts is a request to determine compliance with a compliance rule. The compliance rule of the request may be determined based on a classification of the content item (e.g., a content item type or particular document of the content item collection package to which the content item belongs), for example the classification of the content item performed by the input processor 212. The prompt requesting a determination of compliance with the compliance rule may also include at least a portion of the content item and/or text information extracted from the content item (e.g., by the input processor 212 as discussed above).

In some implementations, the prompt generator 202 may employ various techniques for generating prompts to the compliance checker 204 to improve efficiency and accuracy of compliance checks on content items performed by the system. In some examples, rather than aggregating a content item along with instructions for performing compliance checks in their entirety into a single prompt, the prompt generator 202 may divide the single prompt to generate multiple prompts (e.g., sub-prompts of the single prompt) for transmitting to the LLM 220A and/or the LLM 220B. For example, instead of transmitting a single prompt that instructs the LLM 220A to perform compliance checks that include five steps (e.g., analyze a first portion of a content item using rule number one, analyze a second portion of the content item using rule number two, analyze a third portion of the content item using rule number three if the first portion of the content item complies with rule number one, but analyze the third portion of the content item using rule number four if the first portion of the content item does not comply with rule number one, or the like), the prompt generator 202 may generate five prompts for transmitting to the LLM 220A. Each of the five prompts may include each of the five steps that the LLM 220A is instructed to perform. Advantageously, dividing a single large prompt to multiple smaller prompts may avoid prompt(s) exceeding prompt size limits associated with the LLM 220A. Additionally, the LLM 220A may be less likely to hallucinate because a single large prompt with multiple instructions embedded may be more challenging for the LLM 220A to accurately interpret and follow.

In some examples, the prompt generator 202 may generate prompt(s) that define or specify structures or formats of outputs from the LLM 220A and/or the LLM 220B employed by the system. In some examples, the prompt generator 202 may instruct the LLM 220A and/or the LLM 220B through prompt(s) to return structured outputs that conform to data formats desired by the system. For example, the prompt generator 202 may specify particular entries that should be included in outputs from the LLM 220A and/or the LLM 220B. The particular entries may be used by the LLM 220A and/or the LLM 220B to state whether a content item passes or fails a compliance check with a particular rule, explain reason(s) why or why not the content item passes or fails the compliance check with the particular rule, or provide other information (e.g., how confident the LLM 220A and/or the LLM 220B are regarding accuracy of a compliance check result) related to the compliance check that may be useful to the system. As another example, the prompt generator 202 may specify that outputs from the LLM 220A and/or the LLM 220B should be in particular tabular format(s) and provide the particular tabular format(s) (e.g., a table with certain number of rows and columns along with contents associated with each entry of the table) to the LLM 220A and/or the LLM 220B through prompts. Advantageously, specifying, defining, or mandating particular output format(s) from the LLM 220A and/or the LLM 220B may enable the system to receive coherent, expected, and/or desired formats from the LLM 220A and/or the LLM 220B, reducing chances of LLM hallucinations or the LLM 220A and/or the LLM 220B "going off the rails" to generate inferior or inaccurate compliance check results.

In some examples, prompt(s) generated by the prompt generator 202 may segregate particular portion(s) of instructions to stress or emphasize to the LLM 220A and/or the LLM 220B to focus analysis or perform enhanced analysis on the particular portion(s). For example, the prompt generator 202 may utilize text delimitation techniques or delimiters that specify boundary between segments of text, such as encapsulating some of the text of a content item using character(s) not normally found (e.g., asterisk or triple asterisks) in natural language words, sentences, or paragraphs. Advantageously, segregating or highlighting particular segments of text may help channel the LLM 220A and/or the LLM 220B to focus analysis on the particular segments without neglecting information in the text that is of great importance or pertinence. As such, the LLM 220A and/or the LLM 220B are more likely to generate compliance check results that meet user expectations.

Additionally and/or optionally, the prompt generator 202 may generate prompt(s) that include particular text (e.g., natural language words, phrases, sentences, or paragraphs), and mandate the LLM 220A and/or the LLM 220B employed by the system to perform compliance checks based exactly on the particular text. For example, the prompt generator 202 may generate a prompt to mandate the LLM 220A to generate a compliance pass result if and only if a content item being checked includes exactly the particular text. As such, the system may advantageously curb occurrences of hallucinations on the part of the LLM 220A to increase accuracy of the compliance check.

Additionally and/or optionally, the prompt generator 202 may generate prompt(s) including instructions that are described using or based on more close-ended terms and/or formats. For example, instead of using the word "may" to instruct the LLM 220A and/or the LLM 220B, the prompt may use the word "should" in instructing the LLM 220A and/or the LLM 220B to reduce ambiguity or increase clarity of the prompt(s) to the LLM 220A and/or the LLM 220B. As another example, instead of allowing the LLM 220A to return outputs without any constraints on formalities, the prompt generator 202 may generate prompt(s) to instruct the LLM 220A to return outputs in multiple-choice question formats. More specifically, outputs returned by LLM 220A may just provide answer(s) to one or more multiple-choice questions rather than present information in any formats (e.g., natural language paragraphs, natural language sentences, bullet points, charts, or the like) the LLM 220A deems appropriate. Advantageously, improved accuracy of compliance check results may be achieved through generating prompt(s) that are close-ended. Additionally, the LLM 220A and/or the LLM 220B employed by the system may be more efficient (e.g., expend less time or computational resources in generating results) in performing compliance checks based on close-ended prompt(s) provided by the system.

In some examples, the prompt generator 202 may generate prompt(s) that set a tone for the LLM 220A and/or the LLM 220B to perform a compliance check. For example, prompt(s) generated by the prompt generator 202 may instruct the LLM 220A and/or the LLM 220B to perform compliance check on a content item with regulatory rules promulgated by a specific agency as if the LLM 220A and/or the LLM 220B is operating under the capacity of a professional (e.g., a regulatory rule compliance attorney or expert) in a related field of endeavor. As such, results generated by the LLM 220A and/or the LLM 220B may more resemble what would be delivered by the professional in the field as a user of the system might hope for. Additionally and/or optionally, the prompt generator 202 may mandate the LLM 220A and/or the LLM 220B in prompt(s) to engage in thorough reading and digestions of some or all of the prompt(s) for generating compliance check results. For example, the prompt generator 202 may generate a prompt to the LLM 220A and/or the LLM 220B that includes several multiple-choice questions, and instructs the LLM 220A and/or the LLM 220B to read text in the prompt completely before attempting to answer any of the multiple-choice questions. Advantageously, these techniques allow the system to provide check results that are more likely to meet expectations from users or are more accurate.

In some examples, the prompt generator 202 may generate multiple prompts and transmit the multiple prompts to multiple LLMs for performing a compliance check of a content item, or plurality of content items of the content collection package, with a ruleset. In some examples, the prompt generator 202 may generate multiple prompts and transmit some prompt(s) to one of the LLMs 220A while transmitting other prompt(s) to another of the LLMs 220A or one of the LLMs 220B based on strength and/or weakness associated with respective LLMs. For example, when a first portion of a content item includes large blocks of text (e.g., text with a size over tens or hundreds of pages) and a second portion of the content item includes some statements that entail complex logical reasoning (e.g., text with multiple conditional statements) for interpretation, the prompt generator 202 may generate one prompt that corresponds to the first portion of the content item for transmitting to an LLM 220B that specializes in identifying or analyzing details in large corpus of text while generating another prompt that corresponds to the second portion of the content item for transmitting to an LLM 220A that specializes in performing complex logical reasonings on natural languages, Additionally or alternatively, the prompt generator 202 may generate multiple prompts and transmit each of the prompts to various LLM 220A and LLM 220B to expedite compliance check processes through parallel compliance checks performed by multiple LLMs simultaneously or concurrently. Advantageously, the accuracy and or efficiency of compliance checks performed by the system may be improved through employing multiple LLMs to process multiple prompts.

In some examples, the prompt generator 202 may generate prompt(s) that provide context to the LLM 220A and/or the LLM 220B employed by the system to promote broader or more accurate understanding on the part of the LLM 220A and/or the LLM 220B about the context of compliance checks. For example, the prompt generator 202 may generate prompts that consistently include a particular identifier that is unique across the prompts, thereby enabling the LLM 220A and/or the LLM 220B to process a later-received prompt that includes the particular identifier based on or by learning from how the LLM 220A and/or the LLM 220B processed an earlier-received prompt that also includes the particular identifier. Advantageously, providing context allows the LLM 220A and/or the LLM 220B to correlate or group questions that are related with each other, thereby improving accuracy of compliance checks.

In some implementations, the compliance checker 204 may be implemented using a set of machine learning models (e.g., the LLM 220A) and be configured based on configuration parameters. The compliance checker 204 may correspond to a software program, a software package, a software application, or some combination of software, firmware, and hardware, and may be utilized by the content compliance check system 106 to interface or communicate with LLM 220A and LLM 220B. In some examples, the compliance checker 204 may receive prompt(s) generated by the prompt generator 202 for transmitting to the LLM 220A and/or LLM 220B. In other examples, the compliance checker 204 may only include the LLM 220A and may be configured using the configuration parameters provided in prompts received from the prompt generator 202. As illustrated in FIG. 2A, an LLM utilized by the content compliance check system 106 may be integrated with the compliance checker 204 (e.g., the LLM 220A that may be a part of software stacks and models locally hosted by the compliance checker 204), or may be separate from the compliance checker 204 (e.g., the LLM 220B that may be cloud managed by the compliance checker 204). In some examples, some or all of the LLM 220A and the LLM 220B may receive a prompt that includes regulated content items, compliance ruleset(s), and instructions on how to perform compliance checks on the regulated content items with the compliance ruleset(s).

As shown in FIG. 2A, the content compliance check system 106 may be capable of interfacing with multiple LLMs (e.g., LLM 220A and LLM 220B) through the compliance checker 204. Advantageously, this allows for experimentation and adaptation to different models based on specific use cases or requirements, providing versatility and scalability to the system. In some implementations, the content compliance check system 106 may utilize various LLMs for simultaneously processing a request from the end user device 102 to perform compliance testing. In some examples, the content compliance check system 106 may receive output(s) from the LLM 220A and/or the LLM 220B. For example, the compliance checker 204 may receive a compliance determination dataset from the LLM 220A and/or the LLM 220B. The compliance determination dataset may indicate whether a regulated content item passes one or more criteria of a set of compliance criteria within a compliance ruleset. Further, different LLMs (e.g., LLM 220A and LLM 220B) may have a performance or other advantage when analyzing a particular modality (e.g., text, images, etc.). The compliance checker 204 or another component of the content compliance check system 106 may identify a particular LLM to complete a task for which the LLM is better suited, and provide the prompt generated by the prompt generator 202 to the identified LLM.

In some implementations, output(s) from the LLM 220A and/or the LLM 220B may be processed by the output processor 206. The output processor 206 may provide the entire output from the compliance checker 204 to the end user devices 102 through the user interface 208, automatically modify or correct output(s) from the compliance checker 204 before providing to the end user devices 102, or may trigger the prompt generator 202 to generate further prompts (e.g., providing more detailed instructions on certain aspects for performing a compliance check) for the compliance checker 204. Output(s) from the output processor 206 to the user interface 208 and/or the end user devices 102 may include a portion of a content item, text (e.g., stating that a regulated content item complies with a compliance ruleset), images, maps, interactive graphical user interfaces, datasets, database items, audio, actions, or other types or formats of information. In some implementations, actions may include requiring a user to provide a new content item with corrected file format(s), writing to datasets (e.g., adding or updating rows of a table, editing or updating an object type, updating parameter values for an object instance, generating a new object instance), implementing integrated applications (e.g., an email or SMS application), communicating with external application programming interfaces (APIs), and/or any other functions that communicate with other external or internal components. For example, output(s) provided to the end user device 102 (e.g., via the user interface 208) may include a message indicating that a file format of a content item of a content collection package provided or referred to by the end user device 102 is unsupported, or a message indicating that more information or clarification is needed to process the request of performing compliance check on content items of the content collection package. The output processor 206 may also provide the output according to a format for simplified display of indications of whether content items, and/or the content collection package as a whole, comply with a compliance rule and/or all relevant compliance rules. For example, the output processor 206 may generate an output indicating each compliance rule applied to the content collection package, content items associated with each compliance rule, and whether the content items associated with each content rule comply with the compliance rule. In this example, the output may also include a portion of a content item relevant to the determination of whether the content item complies with the compliance rules (e.g., where a compliance rule requires a signature, an image of the signature may be presented in association with a determination the content item complies with this compliance rule).

The data store 210 may be any computer-readable storage medium and/or device (or collection of data storage mediums and/or devices). The data store 210 may be used to store any data or information related to operations and/or services provided by the content compliance check system 106, such as performing compliance checks on regulated content items with compliance ruleset(s). Examples of the data store 210 include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like.

Example Compliance Check of Content Collection Package

Figure 2B:
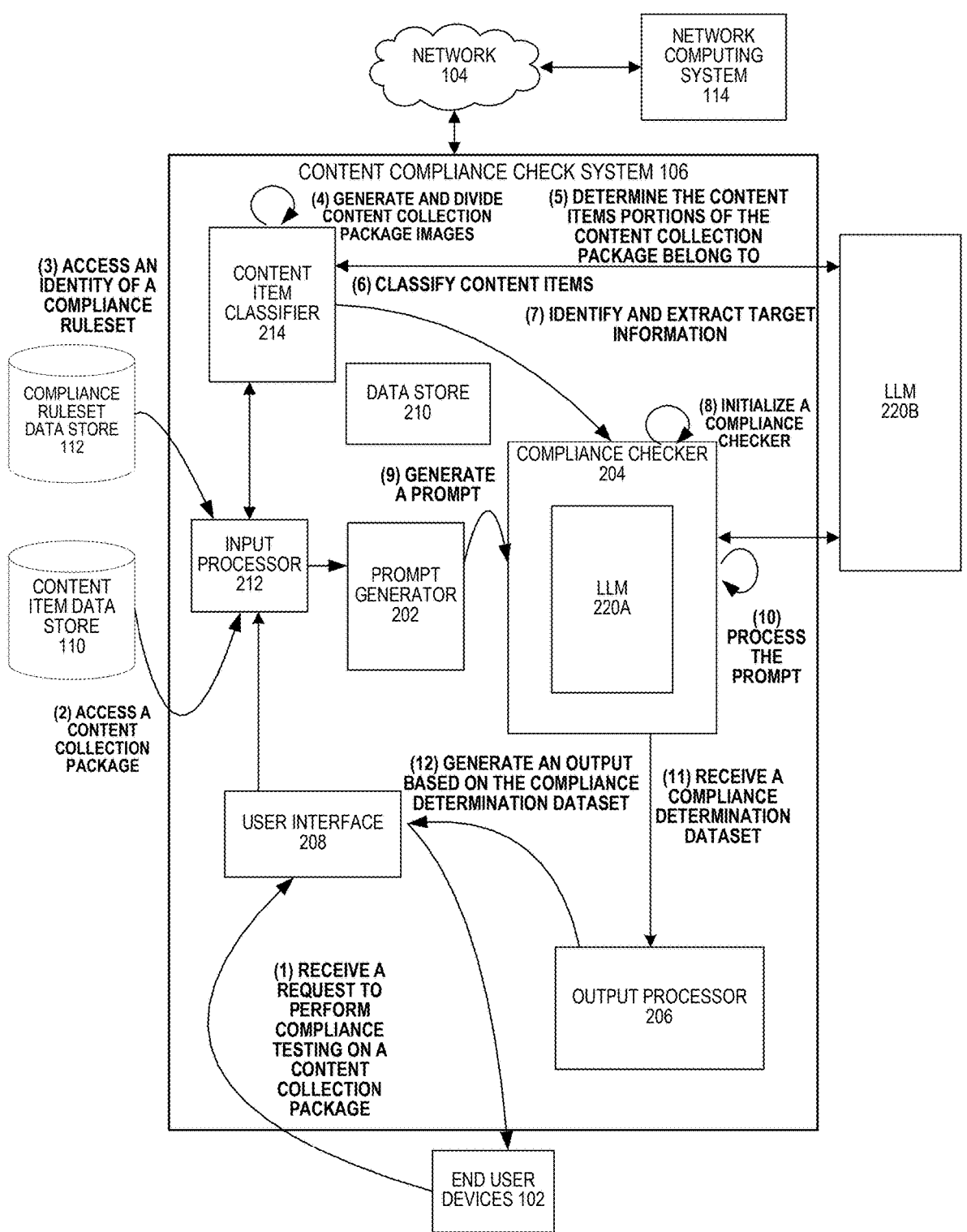
FIG. 2B depicts illustrative interactions among various elements of the content compliance check system to perform content compliance testing on content items responsive to receiving requests from end user devices in accordance with certain embodiments.

With reference to FIG. 2B, illustrative interactions will be described depicting how elements of the content compliance check system 106 of FIGS. 1 and 2A (e.g., the prompt generator 202, the compliance checker 204, and the output processor 206) can provide for performing compliance testing on regulated content items with compliance ruleset(s) accurately and efficiently.

FIG. 2B depicts illustrative interactions among various elements of the content compliance check system 106 to perform content compliance testing on a content collection package responsive to receiving request(s) from the end user devices 102. The interactions of FIG. 2B begin at (1), where the user interface 208 receives a request to perform content compliance testing on a content collection package with a compliance ruleset from the end user device(s) 102. The content collection package that is tested or checked for compliance with the compliance ruleset may include a plurality of content items. A content item of the plurality of content items may be a mixed format content item that includes any combination of text, image, audio, video, or other media content. For example, the content item may include both text and images, and may be stored in various electronic data file formats (e.g., Portable Document Format (PDF), WORD file, JPEG, GIF, or other data file formats). The content item may be an image that includes both representations of objects (e.g., picture of a car and trees, image of system components, representative thumbnail of media, etc.) and images of text. In some examples, a user of the end user device 102 may submit a request to the content compliance check system 106 through the user interface 208 that is in the form of an application program. In some cases, multiple content collection packages may be received or identified at (1) for performing content compliance testing.

At (2), the input processor 212 may obtain or access the content collection package. The content collection package may include a plurality of documents. In some non-limiting cases, the content collection package may include mixed format content items that include content items with multiple types of data or data formats. For example, a mixed format content item may include text and images. The content collection package may be provided (e.g., identified, uploaded, or generated) by the end user devices 102, for example, through a user's interaction with the user interface 208. In other examples, the input processor 212 may locate, identify, search, or retrieve the content collection package based on information in the request to perform content compliance testing, or retrieve individual content items from two or more different storage locations. A mixed format content item of the content collection package that is to be processed and/or analyzed by the content compliance check system 106 may be stored in the data store 210, or a third-party data store or a data source external to the content compliance check system 106. The content compliance check system 106 may obtain the mixed format content items and store the mixed format content items in the data store 210. The data store 210 may be any type of memory, such as a non-volatile memory or a volatile memory configured to at least temporarily store the content item. Additionally, or alternatively, the mixed format content items may be accessed from the data store 110. For example, a user may reference a content collection package and the data store 110, and the content compliance check system 106 may access one or more content items from the data store 110.

At (3), the input processor 212 may access an identity of a compliance ruleset from a plurality of compliance rulesets that are stored in the compliance ruleset data store 112. The identity of the compliance ruleset may correspond to regulatory rules promulgated by an agency (e.g., a regulatory agency), a private entity, a public entity, an organization (e.g., a domestic organization or an international organization), an institution, a government (e.g., a local government, a state government, the federal government, or a foreign government), or the like. Further, the compliance ruleset may be associated with a particular geographic area (e.g., a state, a country, a county, etc.). The compliance ruleset may relate to privacy regulations, consumer protection regulations, export control regulations, mass communication regulations, sensitive information regulations, environment regulations, movie censorship, commercial speech (e.g., advertisements) regulations, or other regulatory fields. The compliance ruleset and/or the plurality of compliance rulesets may be stored as any form of electronic data, and may be stored as text, documents, slides, manuals, brochures, booklets, data files, and/or any combination of the foregoing and/or the like. The compliance ruleset may be stored in a data store (e.g., a data store managed by an organization, an entity, a government, or a data source external to the system). The data store may be accessible by the content compliance check system 106. From the data store, the content compliance check system 106 may obtain the compliance ruleset and store the compliance ruleset in the data store 210. The content compliance check system 106 may analyze whether the content collection package as a whole, and/or one or more mixed format content items, complies with the compliance ruleset.

In some examples, the input processor 212 may access an identity of a compliance ruleset from a plurality of compliance rulesets selected based on interaction(s) between the end user devices 102 and a compliance ruleset selection interface. The compliance ruleset selection interface may be a part of the user interface 208 that allows users of the end user devices 102 to select the compliance ruleset to perform content compliance testing of the content collection package. Additionally, or optionally, the input processor 212 may identify a compliance ruleset from a plurality of compliance rulesets without direct selection or identification by the end user devices 102. For example, based on a location, a residence, or other information of a user of the end user devices 102, the input processor 212 may access an identity of a compliance ruleset (e.g., regulatory rules enacted by a local agency or a state government associated with a location or residence of the user) from a plurality of compliance rulesets.

In some examples, each of the plurality of compliance rulesets may include configuration parameter(s) for configuring one or more machine learning models employed by the content compliance check system 106 to perform content compliance testing. For example, the configuration parameter(s) may include instruction(s) that instruct the LLM 220A and/or the LLM 220B employed by the content compliance check system 106 how to perform content compliance testing. More specifically, the configuration parameter(s) may instruct the LLM 220A and/or the LLM 220B to completely read any instructions provided before analyzing whether a content item complies with a compliance ruleset, or instruct the LLM 220A and/or the LLM 220B to provide textual explanations on how a particular compliance determination result is derived. Additionally or optionally, some or all of the configuration parameter(s) may be provided to the input processor 212 separately from a compliance ruleset accessed by the input processor 212. For example, the configuration parameter(s) may be generated by the input processor 212 based on user input received from the user interface 208. As another example, the configuration parameter(s) may be obtained from the data store 210 that is different from the compliance ruleset data store 112.

At (4), the content item classifier 214 may convert portions of the content collection package to a shared content format. For example, the content item classifier 214 may convert the portions to images. It should be understood that generating images of portions of the content collection package may be optional or omitted. In some cases, a portion may be processed in its native format. In some embodiments, (4) may include dividing the generating images into parts or sub-images. For example, a page of a content item may be divided in two (e.g., a top half and a bottom half, or a left column and a right column), and each part of the content item may be converted from a native format to an image format. Thus, if for example the page of the content item is in a text-based format or in a portable document format (PDF), the page may be divided into two parts that may each be converted into an image format (e.g., a JPEG or a GIF). In some cases, the content collection package images may, for example, be generated based on a maximum supported input size of a machine learning model (e.g., LLM 220B) that may be used to perform additional analysis on parts of the content collection package, or based on a size of image from which the machine learning model is able to extract useful information.

At (5), the content item classifier 214 determines the content item the portions of the content collection package belong or are part of. The content item classifier 214 may determine the content item a portion belongs to using various types of information associated with the portion. For example, the content item classifier 214 may make the determination based on the original version of the portion in the content collection package (e.g., before generating a copy of the portion in the shared content format), the portion converted to the shared content format, at least one of the divided parts of the portion, or a combination of the preceding. In some embodiments, the content item classifier 214 may determine the content item portions of the content collection package are part of based on whether each portion of the content collection package is part of the same content item as the immediately subsequent portion. The content item classifier 214 may determine that portions of the content collection package are a part of the same content item based on information contained in, or associated with (e.g., metadata), the portions. Examples of information the content item classifier 214 may use to determine two portions of the content collection package are a part of the same content item can include a page number of each portion, a header of each portion, metadata identifying a source of each portion, a document identifier (e.g., a form name, a form code, a marking indicating a source institution from which the document originated, etc.), continuation of information from a first portion to a second portion (e.g., consecutive text at the end of the first portion continuing at the beginning of the second portion), continuation of a numbered list from a first portion to a second portion, and the like. For example, the content item classifier 214 may access a first portion and a second portion of the content collection package. The content item classifier 214 may then use text analysis to determine that the first portion has a document identifier and a page number indicating the portion is the second page of a document. The content item classifier 214 may then determine, that the second portion has the same document identifier and a page number indicating the portion is the third page of the document. Based on the shared document identifier and the consecutive page numbers, the content item classifier 214 may then determine that the first portion and the second portion are consecutive pages in the same document.

In some cases, the determination of whether two portions of the content collection package are part of the same item may be based on the use of deterministic rules. Alternatively, or in addition, the determination of whether two portions of the content collection package are part of the same item may be based on the use of a machine learning model. For example, the content item classifier 214 may communicate with a machine learning model (e.g., LLM 220B) to determine whether portions of the content collection package are part of the same content item. The content item classifier 214 or the prompt generator 202 may generate a prompt for the machine learning model to cause the machine learning model to determine whether portions are part of the same content item. For example, the prompt may include a portion of the content collection package, a portion converted to a shared content format, a part of an image of a portion, or a combination of the preceding. The prompt may also include an instruction to determine whether portions are associated with the same content item. While reference is made herein to determining whether two portions of the content collection package are part of the same content item, any number of portions of the content collection package may be analyzed. When portions are determined to be part of the same content item, the content item classifier 214 may generate metadata, a label, or other information to indicate the portion is part of the content item. Alternatively, the content item classifier 214 may generate content items from the portions, and store the content items for further processing during a compliance check.

At (6), the content item classifier 214 classifies the content items (e.g., groups of portions of the content collection package determined to be associated with each other at (5)) as a content item type. The classification of a content item may be used by the content item classifier 214 to extract target information from the content items to generate a compliance audit package for use by the compliance checker 204, or to determine whether an expected content item is included in the content collection package. An expected content item may include any content item that is included or generated when a transaction of a particular type is generated. In some cases, the expected content items may be identified by a user (e.g., an administrator). In other cases, the expected content items may be determined based on training data used to train the machine learning models. The content items may be classified based on a set of rules or other indicators accessible to the content item classifier 214 (e.g., stored in the compliance ruleset data store 112). The indicators may define types of information that are expected to be present in a first content item type, but not in a second content item type. Examples of indicators of a content item type include a document header, a document identifier, a document format, a length of a content item, a phrase included in a content item, an image included in a content item, the presence or absence of a signature, or other content of a content item.

For example, the content item classifier 214 may access a content item of the content collection package. The content item classifier 214, or the prompt generator 202, may then generate a prompt for a machine learning model (e.g., LLM 220B) instructing the machine leaning model to identify the content item type of the content item, and return the content item type as an output. The machine learning model may be able to identify the content item type based on previous training (e.g., training using a labelled data set identifying content item types of various content items). Alternatively, the prompt for the machine learning model may identify a data set for the machine learning model to access that includes information useful for identifying a content item type (e.g., a list of content item types and identifiers that indicate a content item is of each content item type). In some embodiments, the content item classifier 214 may use information included in the content item to identify the content item type without the use of a machine learning model. For example, the content item classifier 214 may perform text analysis of the content item to identify a document header that indicates the content item type. In another example, the content item classifier 214 may compare the text of a content item to example text of various content item types to identify a content item type having text that is the most similar to the text of the content item being classified.

At (7), the content item classifier 214 identifies and extracts target information from the classified content item. The content item classifier 214 may identify target information based at least in part on the classification of the content item, or the compliance check to be performed. For example, the content item classifier 214 may classify a content item as a contract. Based on the classification of the content item as a contract, the content item classifier 214 may determine that the target information to be extracted includes a signature and a date of signature. The extracted information may be stored as part of a compliance audit package. The content item classifier 214 may transmit portions of the content collection package associated with the contract and an instruction to extract a signature with a date to a machine learning model (e.g., LLM 220B). Alternatively, the content item classifier 214 may provide the content item to the machine learning model, and the machine learning model may identify the data to extract based on a determination of the type or classification of the content item. The portions may be in a shared content format or the original format of the portions. The machine learning model may return the signature with the date (e.g., as an image), or an indication that the signature with the date could not be located. Alternatively, computer vision, text processing, metadata of the content item, or a rules-based analysis of the document may be performed to identify the portion of the document to extract. For example, if the content item is determined to be a contract and the target information is a signature block, the signature block may be associated with metadata (e.g., a digital certificate verifying the signature), or may be recognized by a computer vision algorithm, and extracted without the use of a machine learning model. The content item classifier 214 may include an indication that target information could not be located in the compliance audit package. An indication that target information could not be located may be relevant to the compliance of the content collection package. In some embodiments, classification and target information extraction may at least partly in parallel. For example, when a first content item has been classified, the content item classifier 214 may extract target information from the first content item while the second content item is being classified.

At (8), the content compliance check system 106 may initialize the compliance checker 204. Initializing the compliance checker 204 may include loading or accessing a set of machine learning models. Further, initializing the compliance checker 204 may include configuring the compliance checker 204. The compliance checker 204 may be configured based at least in part on configuration parameters obtained by the content compliance check system 106. The compliance checker 204 may correspond to a software program, a software package, a software application, or some combination of software, firmware, and hardware. The compliance checker 204 may be utilized by the content compliance check system 106 to interface or communicate with the LLM 220A and/or the LLM 220B. For example, the compliance checker 204 may receive prompt(s) generated by the prompt generator 202 for transmitting to the LLM 220A and/or the LLM 220B. In other examples, the compliance checker 204 may include only the LLM 220A and/or the LLM 220B, and may be configured using the configuration parameters provided in prompts received from the prompt generator 202. In some examples, some of the LLM 220A and/or the LLM 220B may be larger or more complex than others. The configuration parameters may specify a set of instructions that instruct the LLM 220A and/or the LLM 220B on operations to perform with respect to a compliance ruleset and a content item accessed by the system. The set of instructions may help improve accuracy of the compliance checker 204 to satisfy an accuracy threshold (e.g., 95%, 98%, or 99%). For example, the set of instructions when received by the LLM 220A and/or the LLM 220B may prevent LLM hallucinations such that a compliance determination result generated by the system may be over 98% accurate (e.g., when the system determines that a content item passes the check of a compliance ruleset, there is less than 2% chance such determination is incorrect). In some cases, configuration of the compliance checker 204 using the configuration parameters may result in the accuracy of the compliance checker 204 exceeding 99%.

At (9), the prompt generator 202 may generate one or more prompts based on a content collection package and a compliance ruleset accessed by the content compliance check system 106 through the input processor 212. As noted above with reference to FIG. 2A, while generating the one or more prompts, the prompt generator 202 may employ various prompt generation techniques described above (e.g., dividing a large prompt into multiple smaller prompts, specifying particular structured formats for outputs generated by LLM(s), using close-ended rather than open-ended instructions, etc.) to improve accuracy of a set of machine learning models utilized to perform content compliance testing. Additionally, as part of generating the one or more prompts, the prompt generator 202 may interact with an LLM (e.g., LLM 220A, or LLM 220B) to perform additional processing on content items of the content collection package. For example, a content item may include an image with text information. The prompt generator 202 may transmit a portion of the content item to an LLM with a prompt to cause the LLM to identify the text information of the content item and generate a text version of the text information in the image. In another example, the prompt generator 202 may transmit a first content item and a second content item to an LLM with a prompt to cause the LLM to determine whether the first content item and the second content item are associated with the same document.

At (10), the content compliance check system 106 may process the prompt(s) using the compliance checker 204. For example, the compliance checker 204 may transmit or feed the prompt(s) generated by the prompt generator 202 to the LLM 220A and/or the LLM 220B for performing content compliance testing of a content item. The compliance checker 204 may utilize the LLM 220A and/or the LLM 220B to verify compliance of the content collection package, or content items of the content collection package, based at least in part on the compliance ruleset accessed by the prompt generator 202.

At (11), the output processor 206 may receive a compliance determination dataset from the compliance checker 204. The compliance determination dataset may correspond to outputs from the LLM 220A and/or the LLM 220B. The compliance determination dataset may indicate whether a content collection package, or one or more content items passes one or more criteria within the compliance ruleset. In some examples, the compliance determination dataset may include a number of entries that correspond to a number of criteria evaluated by the compliance checker 204, the LLM 220A, and/or the LLM 220B in applying the compliance ruleset to the content collection package accessed by the content compliance check system 106. For example, the compliance determination dataset may correspond to a dataset that can be presented as table(s), spreadsheet(s), and/or other data file structures. An entry associated with the compliance determination dataset may show that the content collection package complies with or does not comply with a particular rule in the compliance ruleset, and/or the compliance ruleset generally. Further entries may indicate whether portions of the content collection package (e.g., documents, related database entries, etc.) comply or do not comply with a particular rule.

Based at least in part on the compliance determination dataset received from the compliance checker 204, at (12), the output processor 206 may generate an output for display on the user interface 208 or user interfaces of the end user devices 102. In some examples, the output displayed may be the compliance determination dataset from the compliance checker. In some examples, the output processor 206 may verify, correct, and/or perform post-processing on the compliance determination dataset from the compliance checker. For example, the output processor 206 may add descriptions to explain the compliance determination dataset, such as what regulations were satisfied or what requirements relate to each regulation. As another example, in situations where the content item fails to comply with a part of the compliance ruleset, the output processor 206 may provide suggestions to users of the end user devices 102 on how to adjust the content item to pass the content compliance testing.

Although FIG. 2B has primarily been described with respect to a process for evaluating compliance of a single content collection package that includes multiple content items, it should be understood that one or more operations described with respect to FIG. 2B can be repeated to determine compliance of multiple content collection packages. Moreover, certain operations may be repeated as part of evaluating a portion of a content collection package. For example, the output of the compliance checker 204 may be used to determine additional compliance rules to apply to the portion of the content collection package. For instance, if the output of the compliance checker 204 determines that a portion of the content collection package complies with a set of regulations relating to the transfer of an interest in a vehicle generally and it is determined that the transfer of interest is a lease, the compliance checker 204 may perform additional compliance checking for a lease, which may include generating additional prompts that are fed to the compliance checker 204. In other words, in some cases, evaluating the compliance of a portion of a content collection package may be a recursive process where additional prompts may be generated based on an outcome of earlier prompts. In some cases, a second prompt may be generated if a first prompt applied to a portion of a content collection package generates a particular output. Additionally, or alternatively, different outputs for a first prompt may cause a second prompt to differ or be omitted. Thus, in some cases, the existence of subsequent prompts and/or the selection of subsequent prompts may be based on the outputs of earlier prompts.

Example Compliance Testing Processes

Figure 3B:
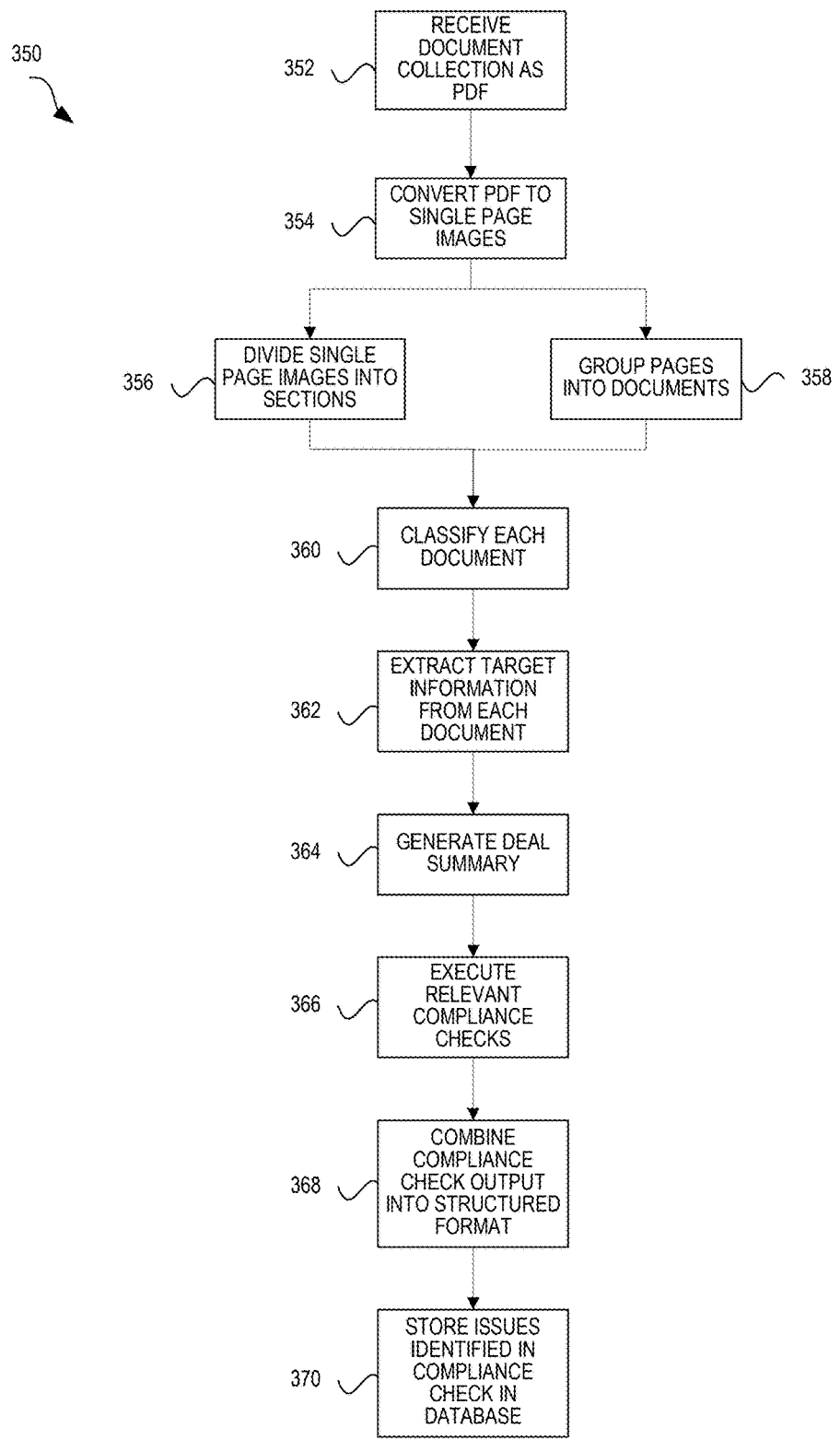
FIG. 3B shows an example operation of the process described in FIG. 3A.
Figure 3C:
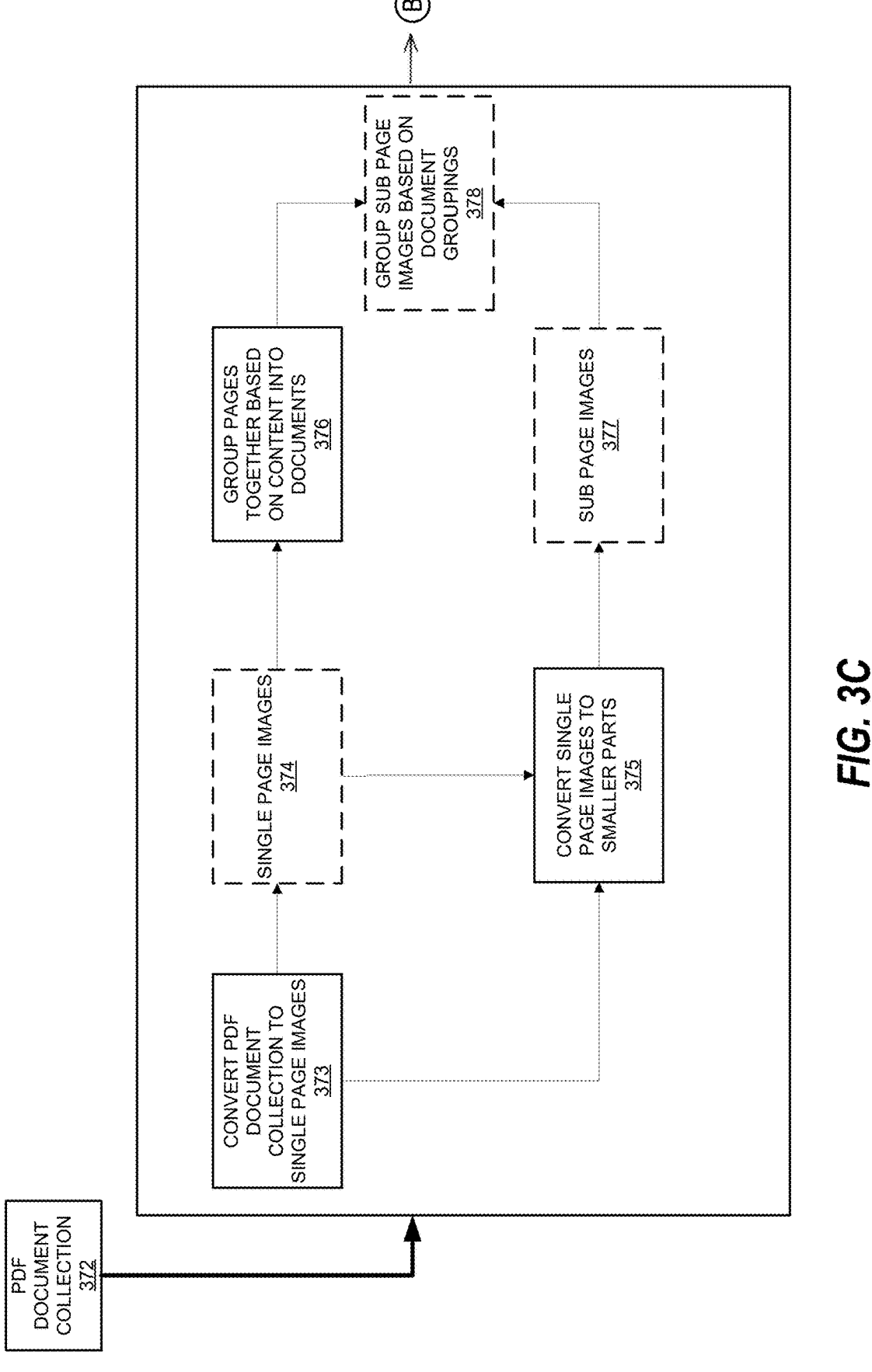
FIGS. 3C-3F show example operations and data flows implementing the process described in FIG. 3A.
Figure 4A:
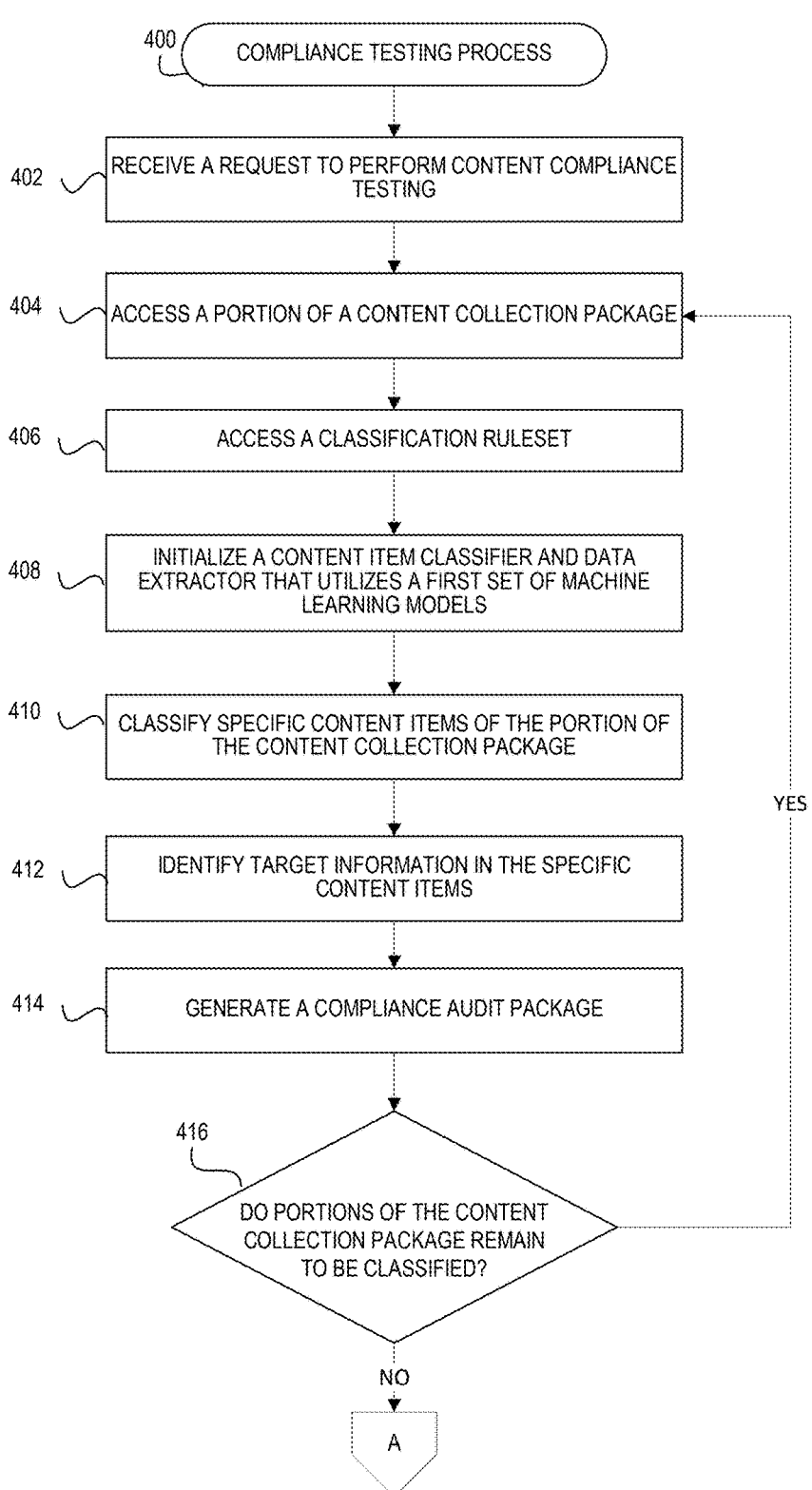
FIG. 4A-4B show flowcharts illustrating example operations of the content compliance check system for performing compliance testing on content collection packages using a compliance ruleset responsive to a user request in accordance with certain embodiments.
Figure 4B:
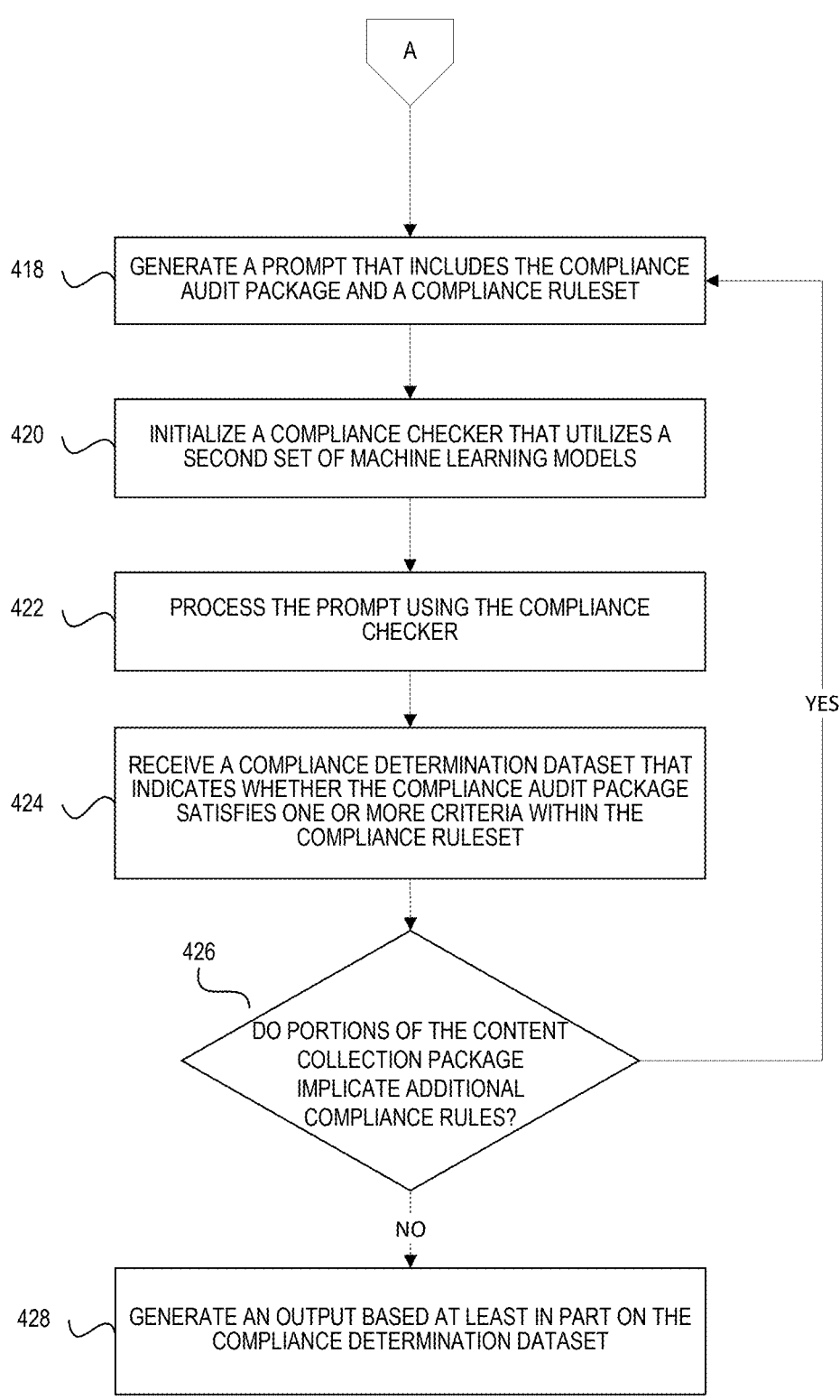

FIGS. 3A, and 4A-4B present flowcharts illustrating example operations of the content compliance check system 106 (and/or various other aspects of the example computing environment 100) associated with performing compliance check processes on a content collection package according to various implementations. The blocks of the flowchart illustrate example implementations, and in various other implementations various blocks may be rearranged, optional, and/or omitted, and/or additional block may be added. In various implementations, the example operations of the system illustrated in FIGS. 3A, and 4A-4B may be implemented, for example, by the one or more aspects of the content compliance check system 106 (e.g., the prompt generator 202, the compliance checker 204, and the output processor 206), various other aspects of the example computing environment 100, and/or the like.

With reference to FIG. 3A, an illustrative example of a process 300 for classifying content items in a content collection package, extracting target information from the classified content items, and performing a compliance check is shown. The compliance information extraction and analysis process 300 of FIG. 3A begins at block 302. Description of the process 300 will be made with reference to an example operation 350 of the process 300 as shown in FIG. 3B. The operation 350 is an illustrative example use case of the process 300 to perform a compliance check on a document collection the content compliance check system 106 receives in a PDF format.

At block 302, the content compliance check system 106 may receive a request to perform compliance testing on a content collection package including a plurality of content items. In some examples, a content item of the content collection package may be a mixed format content item that includes any combination of text, image, audio, video, or other media content. Additionally, the request to perform compliance testing on the content collection package may include at least one content item of the content collection package, or at least one indicator of a location where a portion of the content collection package may be accessed. The request may further include at least one compliance rule, or an indication of a location of at least one compliance rule, that a content item of the content collection package will be assessed against. For example, as shown at block 352, the request may include a document collection provided in the PDF format. In this example, the document collection may be a deal jacket for a vehicle purchase.

At block 304, the content item classifier 214 converts portions of the content collection package to a shared content format (e.g., an image). A portion may be a heterogenous portion (e.g., a document page containing text and image information). For example, the shared content format may be an image format, and as shown at block 354, each page of the PDF file storing the documents of the deal jacket may be converted to the image format. Advantageously, by converting portions of the content collection package to the shared content format, the content compliance check system 106 may consistently make use of a machine learning model configured to identify and extract information from the shared content format, instead of using a multimodal model. Using a single-modality machine learning model (e.g., an image-based machine learning model), may allow for improved or simplified training to improve the ability of the machine learning model to identify and extract relevant information. Where the portions are converted to images, the content item classifier 214 may use any image format (e.g., JPG, PNG, BMP, etc.). Additionally, the image format may be selected based on an input format for a machine learning model (e.g., LLM 220B) used to identify and extract information from the converted portion as described later in the process 300.

At block 306, the content item classifier 214 divides the converted portion into a plurality of sections. The content item classifier 214 may divide the converted portion into any number of sections. For example, the single page images of the PDF in the example operation 350 may be divided into sections at block 356. An image generated at block 304 may be divided in half across a horizontal dividing line to generate two image sections, where each image section is a half of the image. The number of image section generated by the content item classifier 214 may be based in part on, for example, an input size limit of a machine learning model (e.g., LLM 220B). The number of image sections generated by the content item classifier 214 may also be based in part on a processing efficiency of the machine learning model used to extract information from, or classify a document of, the content collection package. For example, it may be determined (e.g., through user testing) that the machine learning model has an improved accuracy when an input image size is equal to or less than a size in pixels (e.g., 400×800 pixels). The content item classifier 214 may divide the generated image into a plurality of image sections where no image section exceeds the size in pixels or bytes. Dividing the image into image sections may be done based on a set of rules (e.g., beginning at the top of the image, divide the image into a new image portion every 500 pixels). Alternatively, dividing the image into image sections may be done based on analysis of the image or other information associated with the portion of the content collection package from which the image was generated. For example, information (e.g., metadata) associated with the image, or with the portion of the content collection package from which the image was generated, may indicate that the image contains a signature block. The content item classifier 214 may, in this example, ensure that when dividing the image into image sections, the signature block is entirely contained with a single image portion. The operations associated with the block 306 may be optional or omitted. For example, in some cases, each image or page of a content item may be sufficiently small to enable processing without further subdividing the image or page.

At block 308, the content item classifier 214 groups portions of the content collection package that are part of the same content item. For example, at block 358 the pages of the PDF may be grouped together based on the document each page belongs to. In this example, where the PDF is a deal jacket for a vehicle purchase, example documents may include a contract for purchase of the vehicle, a privacy notification, dealership contact information, and an acknowledgement the purchaser has been provided required state law information. Determining that two portions of the content collection are part of the same content item may be based one or more information items of the two portions. For example, a portion may contain a document identifier (e.g., a header, a label, an image, etc.) indicating the document to which the portion belongs, a continuation of information included in the first portion in a second portion (e.g., a text description of regulations, a table, an image, a signature block, etc. spread across two or more pages of a document), metadata associated with the portion, and the like.

In some embodiments, a rules-based or deterministic approach may be used to identify whether two or more portions are part of the same content item. Additionally, the compliance check that will be performed may indicate that a document is to be included in the content compliance package. The content item classifier 214 may analyze each portion of the content compliance package for information indicating the presence of the document. The content item classifier 214 may, as part of determining portions are part of a content item, be configured to search the documents of the deal jacket for information that would be contained in a purchase agreement (e.g., a price, a signature, etc.). The content item classifier 214 may determine that portions containing purchase agreement information are likely to be part of the purchase agreement content item. Further, the content item a portion is part of may be identified based in part on output generated by a machine learning model (e.g., LLM 220B). The machine learning model may be configured to determine a likely document that a portion is a part of. In some embodiments, two or more portions may be analyzed at the same time to determine whether the two or more portions are associated with each other. For example, where the content collection package is a deal jacket as in the example operation 350, the content item classifier 214 may analyze each page along with a following page of the deal jacket to determine whether the two pages are part of the same document. The content item classifier 214 groups portions that are part of the same content item.

While block 308 and block 306 are shown in this example process 300 to be performed in parallel, each block may be performed serially in any order, and block 308 and block 306 may be started and/or completed at a different time. As such, in some embodiments the content item classifier 214 may use the image portions generated at block 306 as part of grouping portions based on their association with a content item.

At block 310, the content item classifier 214 classifies a content item of the content collection package. Classification of the content item may be based in part on the association of portions of the content collection package with a particular content item. The content item classifier 214 may classify the content item using the sections generated at block 306, the entire portion in the shared content format generated at block 304, the original version of the portion received in the content collection package, or any combination of the preceding. The content item classifier 214 may use a machine learning model (e.g., LLM 220B) to identify information in the content item that may be used to classify the content item. To classify the content item, the content item classifier 214 may transmit a prompt to a machine learning model including at least a portion of the content to be classified. The prompt may instruct the machine learning model to classify the document based on a set of rules that may be included in the prompt. The set of rules may, for example, define a set of expected or likely content items that could appear in the content collection package. The expected content items may be content items that include target information that will be used to generate a compliance audit package. For example, the content item classifier 214 may have determined at block 308 that four (4) portions of the content collection package are pages associated the same document (e.g., a privacy notice) in a deal jacket. The content item classifier 214 may group the generated images of the four pages and generate a prompt that includes a description of the types of documents that are expected to be in the deal jacket, or that are useful to generate a compliance audit package for the deal jacket. The prompt may be provided to a machine learning model (e.g., LLM 220B) that determines, based in part on the group of pages and the description of the types of documents, what document type the pages are most likely to be associated with. Classifying content items may be repeated until all content items in the content collection package have been classified. For example, at block 360 the sections of page images and the grouped pages of the documents may be used to classify the documents. As described above, the deal jacket of the example operation 350 may include a contract for purchase of a vehicle and a privacy notice. The content item classifier 214 may identify pages of the contract based on a machine learning model identifying the first page of the contract based on a header, the machine learning model identifying the following pages based on the text of each page continuing on the next, and the machine learning model identifying the final page based on the presence of a signature block. The content item classifier 214 may identify the privacy notice based on the machine learning model determining that the content required for a privacy notice is present on one or more pages of a second document of the document collection. In some embodiments, the content item classifier 214 may classify content items until a threshold number of content items have been classified, until a content item of each type expected to be included in the content collection has been classified, or until a sufficient number of content items have been classified to generate the compliance audit package.

At block 312, the content item classifier 214 extracts information from a content item based on the classification of the content item at block 310 to generate a portion of a compliance audit package. The content item classifier 214 may extract information based on a set of rules associated with the type of the content item and a set of requirements for the compliance audit package. For example, the requirements for the compliance audit package may indicate that a contract is to have a signature for each party on the final page. The content item classifier 214 may identify the pages of the contract by identifying portions of the content collection package classified as being part of the contract. The pages of the contract may not be in order (e.g., the pages may be in a random order), and the content item classifier 214 may analyze each page to identify handwriting. The content item classifier 214 may extract the handwriting (e.g., as an image) and include the handwriting in the compliance audit package for further analysis. For example, at block 362 the content item classifier 214 extracts target information from each document of the document collection based on the classification of each document. At block 364, the content item classifier 214 groups the extracted information generate a deal summary for the document collection. The content item classifier 214 may generate the deal summary as a structured data object (e.g., a JSON object).

Alternatively, the content item classifier 214 may use a machine learning model (e.g., LLM 220B) to extract information based on the content item classification. For example, the content item classifier 214 may generate a prompt for a machine learning model to cause the machine learning model to extract information from the content item. The prompt may include at least a portion of the content item, and may also include the classification of the content item. In some embodiments the prompt may include an indication of the information to be extracted based on the classification of the content item. Alternatively, the machine learning model may have been previously trained to determine what information is to be extracted from the content item based on the content item or the classification of the content item. The content item classifier 214 may provide the prompt to the machine learning model, and receive the extracted information as output. The extracted information may be extracted as text (e.g., based on optical character recognition applied to an image), an image, or in any form that may be included in the compliance audit package. The extracted information may be extracted from the original content item (e.g., as the content item is received), the generated image of the content item, or the generated portion of the image of the content item. While a single operation of the process 300 has been described so far, some or all of blocks 302-312 may be repeated for additional portions or content items of the content collection package, for example until all portions of the content collection package have been associated with a content item or until all available target information for the compliance audit package has been extracted.

At block 314, the content item classifier compliance checker 204 performs a compliance check on the compliance audit package. The compliance check may include determining whether information required by a rule, statute, regulation, or other requirement is included in the compliance audit package. Advantageously, extracting relevant information into the compliance audit package reduces the computation necessary to determine whether the content collection package is compliant with a requirement by removing information that may not be useful or necessary for determining compliance. The compliance check process is described in further detail with respect to FIGS. 4A and 4B below. In the example operation 350, the compliance checker 204 may execute a set of compliance checks associated with the purchase of a vehicle on the generated compliance audit package at the block 366.

At block 316, the output processor 206 generates a compliance indication result based on the result of the compliance check performed at block 314. The compliance indication result may be a structured text-based output indicating a set of requirements and whether each requirement has been determined to be satisfied, useful for further processing. The output processor 206 may further process the compliance indication result to generate a graphical output included as part of a graphical user interface provided by the content compliance check system 106 to an end user device (e.g., at least one of the end user devices 102) to indicate to the user whether the content collection package complies with a requirement. For example, at block 368 the output processor 206 combines the output of the compliance checks the compliance checker 204 performed on the deal jacket into a structured object format for further use. An example of this further use is storing the structured compliance check output in a database of the content compliance check system 106 at block 370. Additionally, the output processor 206 may provide an instruction for correcting a lack of compliance with a requirement. For example, if a content item of the content collection package is required to include a sales price, and the result of the compliance check indicates that the sales price is not included, the output processor 206 may include an indication in the output that the lack of a sales price may be corrected by adding a sales price to a content item of the content collection package. An example of a graphical output is described in further detail below with respect to FIG. 6.

With reference to FIGS. 3C-3F, a set of operations and data flows is described as an example implementation of the process 300 and described in further detail in relation to example operation 350. The example of FIG. 3C begins with the content item classifier 214 receiving or accessing a PDF document collection 372, as described in relation to block 302 and block 352. In this example, the PDF document collection 372 may be a set of documents associated with the purchase of a new vehicle (e.g., a deal jacket). When the content item classifier 214 has received the PDF document collection 372, the content item classifier 214 converts the PDF document collection 372 to single page images 374 at block 373. The content item classifier 214 divides the single page images 374 into the sub page images 377, as described in relation to block 356 above herein. The content item classifier 214 also groups pages of the single page images 374 into documents at block 376, as described in relation to block 358 and block 308 previously herein. In some embodiments, the content item classifier 214 may also use the sub page images 377 to group pages of the PDF document collection 372 into documents at block 376. The content item classifier 214 uses the documents groupings from block 376 and the sub page images 377 to generate grouped sub paged images based on document groupings 378.

Figure 3D:
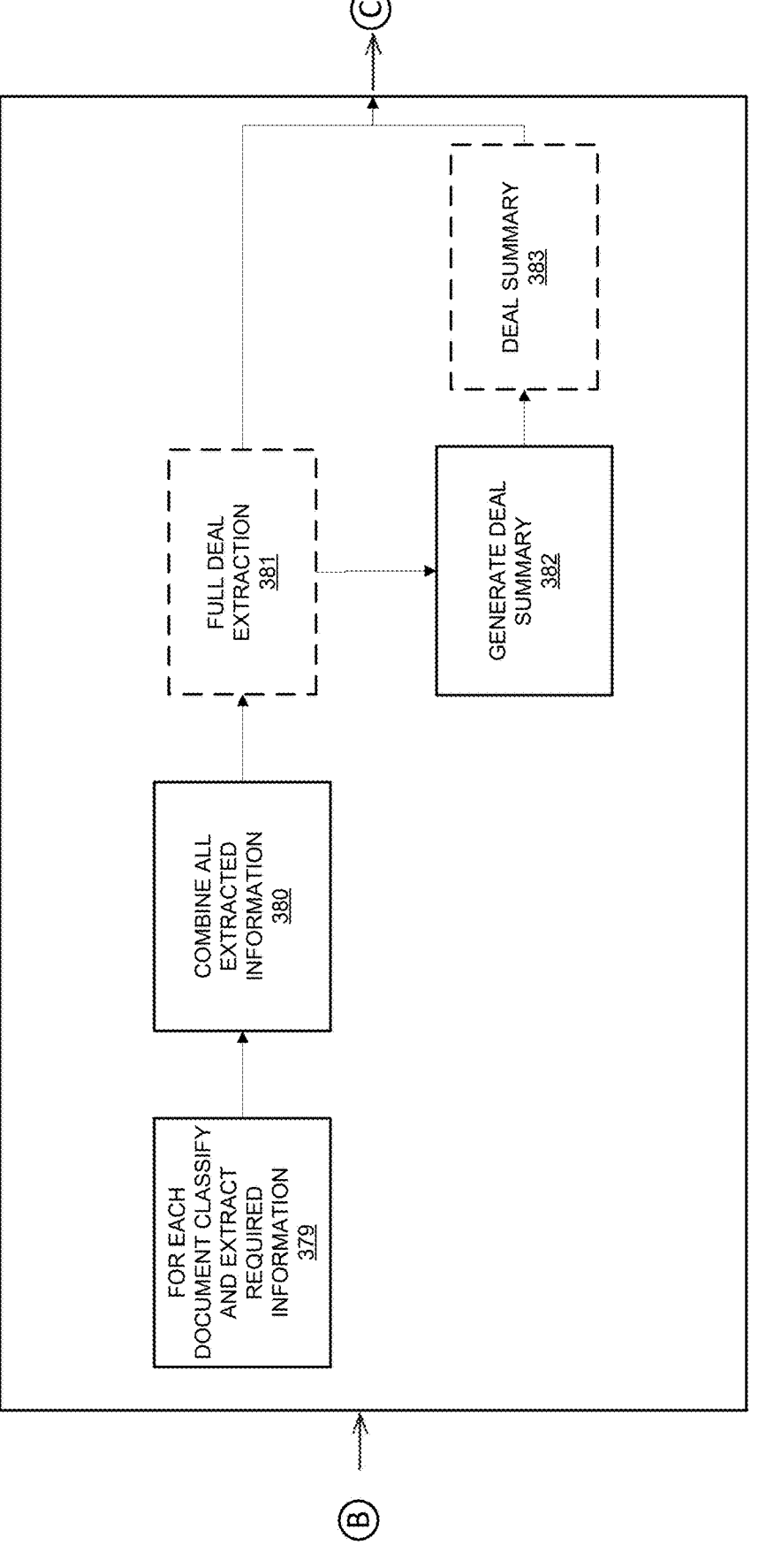

The example continues in FIG. 3D, where the content item classifier 214 classifies each document and then extracts the required information from each document at block 379. The classification of the documents is described in detail in relation to block 310 and block 360 above herein. The extraction of information from the classified documents is described in detail in relation to block 312 and block 362 above herein. As described previously, the content item classifier 214 may classify each document based on a set of rules using, for example, text or image analysis of the grouped pages of the document. The content item classifier 214 may also use a machine learning model (e.g., LLM 220B) to classify the documents. Based on the classification of the documents, the content item classifier 214 determines target information to be extracted from each document. For example, the content item classifier 214 may classify a first document of the PDF document collection 372 as a purchase agreement for the new vehicle based on text analysis of the document identifying a header that indicates the document is a purchase agreement. In a further example, the content item classifier 214 may transmit a second document to a machine learning model (e.g., LLM 220B) along with a prompt to cause the machine learning model to identify the second document. The second document, in this example, may be an image of an odometer of the new vehicle included in the PDF document collection 372 to show a mileage of the vehicle at purchase.

The content item classifier 214 also extracts target information from each document. Following the previous examples, the content item classifier 214 may extract a price of the new vehicle from the purchase agreement based in part on the classification of the purchase agreement indicating that a purchase price should be included in the document. The content item classifier 214 may also extract a mileage value from the image of the odometer based on the classification of the image as an odometer image. Using the extracted information, the content item classifier 214 combines the extracted information at block 380 to generate a full deal extraction 381. The content item classifier 214 uses the full deal extraction 381 to generate a deal summary 383 at block 382. To generate the deal summary 383 the content item classifier 214 may identify a minimum set of required information that will be used to perform a compliance check, and extract the minimum set of required information from the full deal extraction 381. For example, a price of a new vehicle may be required in the deal jacket associated with the purchase of a new vehicle. The purchase price may be located in the purchase agreement, and on an advertisement for the new vehicle that was also included in the deal jacket. The content item classifier 214 may determine that each of these two documents indicates the same purchase price, and therefore only a single instance of the purchase price needs to be included in the deal summary 383 in order to perform the compliance check. Avoiding unnecessary duplication of data in the deal summary 383 may improve the efficiency of the compliance checker 204 in performing a compliance check by reducing the amount of data to be processed.

Figure 3E:
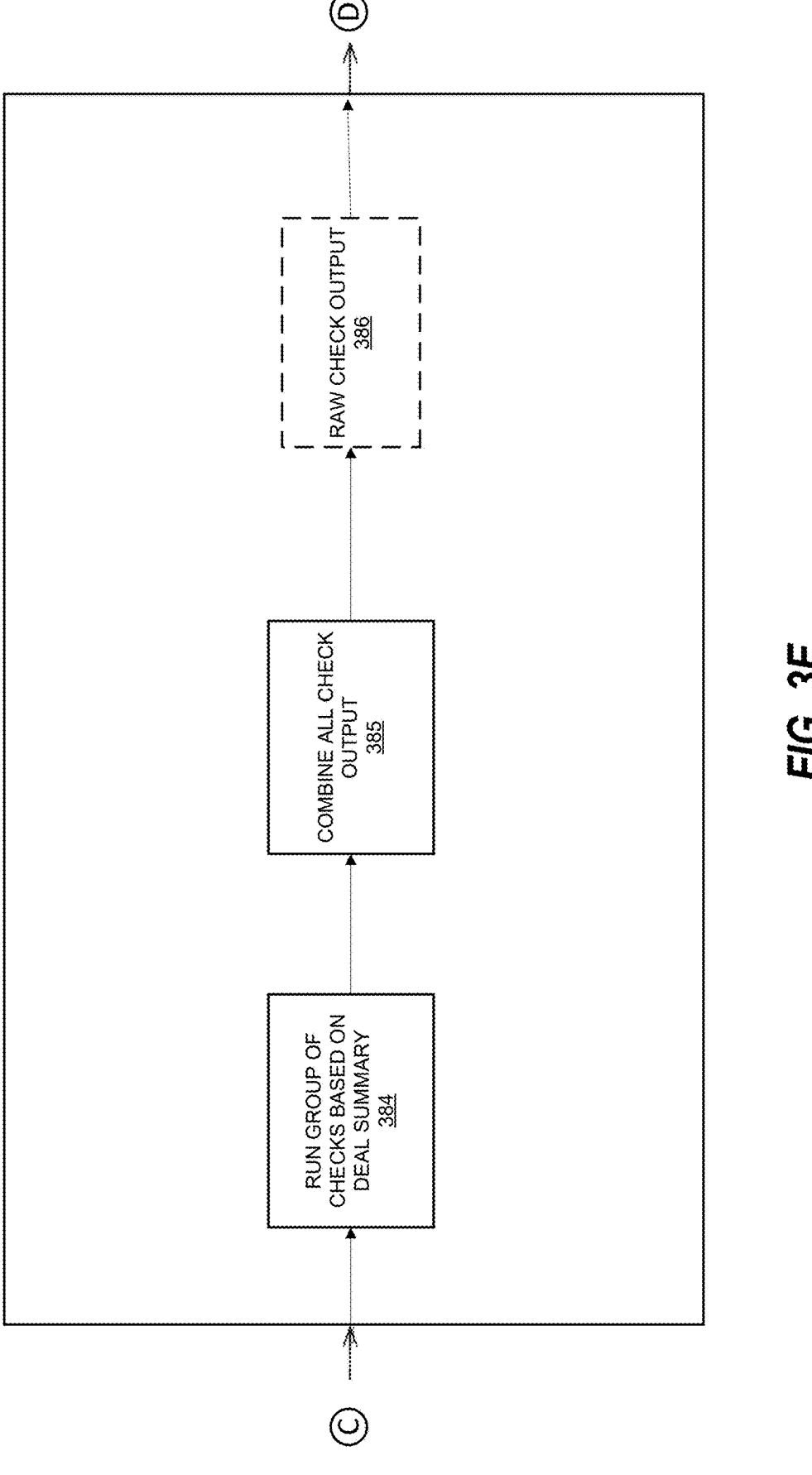

The example continues in FIG. 3E, where the compliance checker 204 performs a compliance check on the deal summary 383 as described above with respect to block 314 and block 366. In this example, where the PDF document collection 372 is a deal jacket for the purchase of a new vehicle, the compliance checker 204 may access compliance check information stored in the compliance ruleset data store 112 associated with the purchase of a new vehicle. The compliance checker 204 may use information in the deal summary 383 to determine which compliance rulesets are relevant to the new vehicle purchase, for example based on a location of the purchase included in the deal summary 383. For example, the compliance ruleset data store 112 may store compliance rulesets for a new vehicle purchase that are associated with specific dealerships, states, or a federal regulator. The compliance checker 204 may use the location information in the deal summary 383 to identify the state or federal regulations that the compliance checker 204 will determine compliance with. The compliance checker 204 may also use a dealership identifier in the deal summary 383 to identify a dealership compliance ruleset stored in the compliance ruleset data store 112 to use for determining compliance of the PDF document collection 372. The compliance checker 204 runs each set of compliance checks, based on the accessed compliance rulesets, on the deal summary 383, the full deal extraction 381, or a combination of information from both. The compliance checker 204 then combines all of the compliance check output at block 385 into a raw check output 386. The raw check output 386 may be, for example, a structured or unstructured data object containing an indication of each compliance check the compliance checker 204 performed and the outcome of each compliance check. The raw check output 386 may be a list of tuples including the compliance check and the result of the compliance check in each tuple. Continuing the present example of performing a compliance check on a deal jacket for a new vehicle purchase, the raw check output 386 may include an identifier of a purchase price check and an outcome of the purchase price check indicating the purchase price was included in the PDF document collection 372. The raw check output 386 may also include an identifier of a dealership contact information check, and an outcome of the dealership contact information check indicating the dealership contact information was not included in the PDF document collection 372.

Figure 3F:
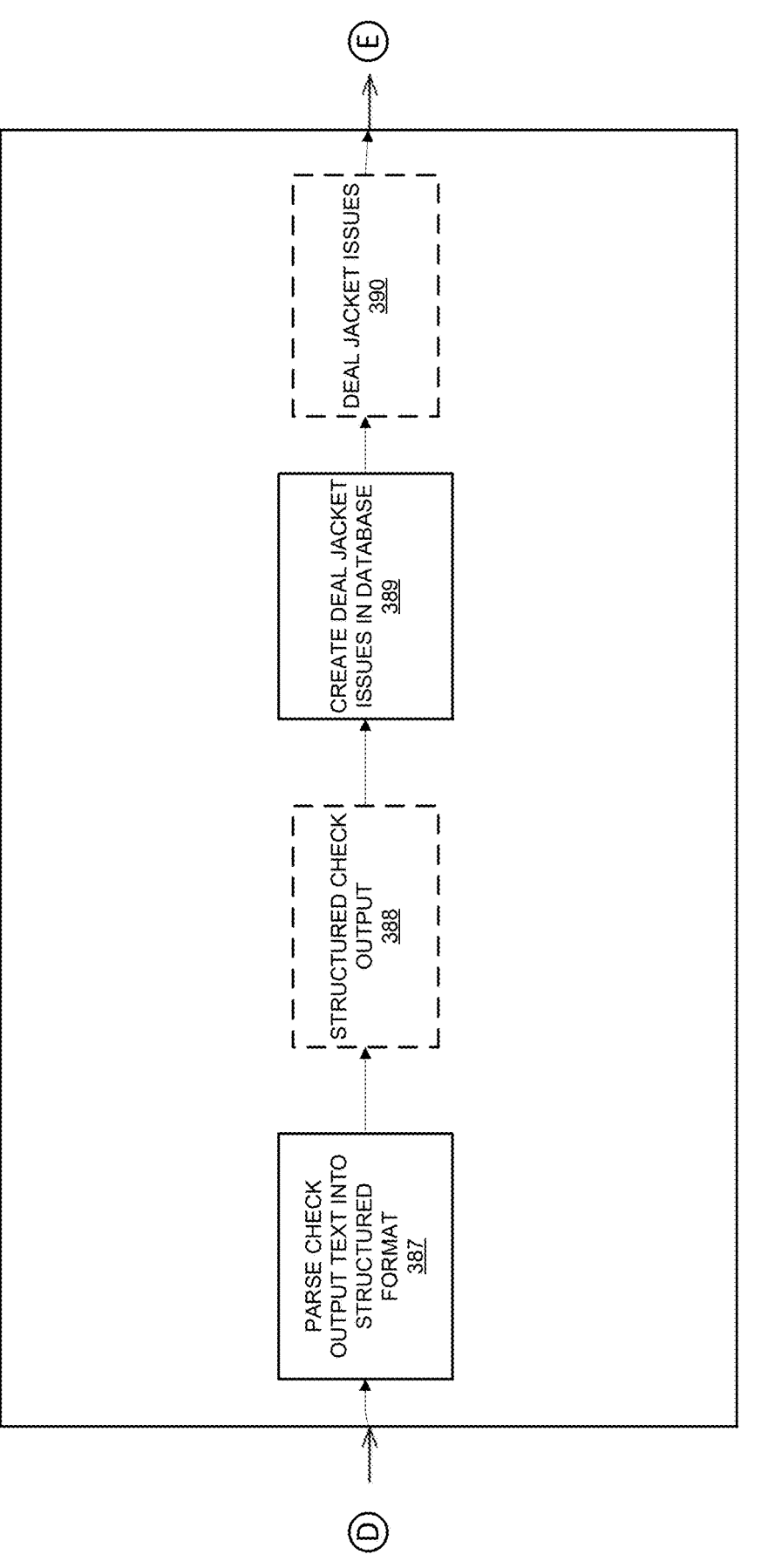

The example continues in FIG. 3F, where the compliance checker 204 parses the raw check output 386 into a structured check output 388 at block 387, as described above herein in relation to block 316 and block 368. The structure of the structured check output 388 may be determined based on the format of a database where the structured check output 388 will be stored, or a format used to display the structured check output 388 to a user via a graphical user interface (e.g., presented on the end user devices 102). In some embodiments, the compliance checker 204 stores identified deal jacket issues 390 (e.g., failure of a compliance check) in a deal jacket issues database. Continuing the present example, where the compliance checker 204 determines that the PDF document collection 372 has failed a dealership contact information compliance check, the failure of this compliance check may be stored in the deal jacket issues database as part of the deal jacket issues 390.

With reference to FIG. 4A, an illustrative compliance testing process 400 is shown. Portions of the process 300 and the process 400 may be interchangeable, or the process 300 and the process 400 may be alternatives. In this illustrative example compliance testing process, the content compliance check system 106 classifies and extracts target information from a content collection package and performs a compliance check. The process 400 begins at block 402. At block 402, the content compliance check system 106 may receive a request to perform content compliance testing on a content collection package containing content items. In some examples, a content item of the content collection package may be a mixed format content item that includes any combination of text, image, audio, video, or other media content. In some examples, the request to perform content compliance testing on the content collection package may include at least one content item of the content collection package. For example, when transmitting the request to the content compliance check system 106, the end user devices 102 may also provide (e.g., by uploading the content item through the user interface 208) at least one content item of the content collection package to the content compliance check system 106.

At block 404, the content compliance check system 106 may access a portion of the content collection package. In some examples, the portion of the content collection package is a content item of the content collection package. Alternatively or additionally, the portion of the content collection package may be two or more content items of the content collection package. The portion of the content collection package may be stored at the content item data store 110. The content compliance check system 106 may access the portion of the content collection package from the content item data store 110. In some examples, the content compliance check system 106 may divide the portion of the content collection package into a plurality of sections. For example, where the portion of the content collection package is an image of a document page, the content compliance check system 106 may divide the page into two or more sections. Dividing the page into two or more sections may increase the accuracy of a set of machine learning models used to perform classification of the page, or to assess compliance of the page with a compliance ruleset by reducing the information the set of machine learning models is required to process in making a determination.

At block 406, the content compliance check system 106 may access a classification ruleset. The classification ruleset may be stored in the compliance ruleset data store 112. The classification ruleset may be identified from a plurality of classification rulesets that are stored in the compliance ruleset data store 112. The classification ruleset may be identified based on a content compliance ruleset to be applied to the content collection package. The compliance ruleset may be stored in the compliance ruleset data store 112. The compliance ruleset may be identified from a plurality of compliance rulesets that are stored in the compliance ruleset data store 112. The compliance ruleset may be accessed or identified based on interactions between the end user devices 102 and a compliance ruleset selection interface of the content compliance check system 106. The compliance ruleset selection interface may be a part of the user interface 208. Through the compliance ruleset selection interface, a user may select the compliance ruleset from a set of different available rulesets. More specifically, the user may select whether to apply one or more of a federal government regulation, a dealer requirement, a user requirement, a brand requirement, a financer requirement, a state government regulation, or another regulation or requirement to the portion of the content collection package accessed at block 404. In some examples, the user may select to apply a compliance ruleset that is directed to privacy regulations, export control regulations, commercial speech regulations, or environment regulations promulgated by the federal government and/or one or more state governments to the content item. For example, if the content collection package is a set of documents associated with a regulated transaction (e.g., a car purchase, a home rental agreement, etc.), the user may select to apply a compliance ruleset promulgated by a state government that regulates transactions related to the type of regulated transaction. The content compliance check system 106 may identify a classification ruleset associated with the selected compliance ruleset. Each classification ruleset from the plurality of classification rulesets may specify a set of at least partially different criteria for classifying at least a portion of a content collection package with different sets of constraints. Each of the different sets of constraints may include static constraints (e.g., constraints that may remain unchanged for testing various content items) that are applied to a set of variable inputs that include at least the portion of the content collection package that is to be classified. The classification ruleset may additionally include identification of a target information to be extracted from the portion of the content collection package. The target information may be usable to assess compliance of the content collection package with the selected compliance ruleset. Each of the plurality of compliance rulesets may include configuration parameters for configuring a set of machine learning models, such as the LLM 220A and/or the LLM 220B.

In some embodiments, the compliance ruleset may be selected based at least in part on a set of one or more selection criteria. This selection criteria may include any type of criteria that may be used for determining or selecting a compliance ruleset to apply to a content collection package. For example, the selection criteria may include a content type (e.g., a contract, warranty, required disclosure, purchase information, loan document, credit history, etc.) of a content item of the content collection package (e.g., a deal jacket containing information related to the transfer of an interest in a vehicle), a presentation medium of the content item (e.g., print, radio, website, billboard, etc.), a user interaction with a compliance ruleset selection interface, or metadata associated with a content item of the content collection package (e.g., size of the content item, source of the content item, last time the content item was modified or accessed, etc.).

In some examples, for at least one compliance ruleset, the set of at least partially different criteria is presented as a set of interrelated criteria where at least one criterion is evaluated based at least in part on an evaluation of another criterion. For example, if a first criterion is evaluated to be true, the content compliance check system 106 (e.g., the compliance checker 204) may proceed to evaluate a second criterion. But if the first criterion is evaluated to be false, the content compliance check system 106 may proceed to evaluate a third criterion that is different from the second criterion. As such, an earlier evaluation of certain criteria may affect whether and/or how other criteria will be evaluated later.

In some examples, each constraint of a set of constraints of the compliance ruleset may include a unique label (e.g., a unique identifier) that includes letters, numbers, or symbols that do not form words within a language of the set of machine learning models. For example, the unique label may be consistently used to uniquely identify a constraint to the LLM 220A and/or the LLM 220B, thereby enabling the LLM 220A and/or the LLM 220B to consistently and accurately interprets or applies the constraint to portions of the content collection package that are tested.

In some examples, each compliance ruleset of the plurality of compliance rulesets may be associated with a different compliance standard. For example, one compliance ruleset may be associated with a compliance standard enacted by one state government, and another compliance ruleset may be associated with another compliance standard enacted by another state government. Each of the state governments may mandate different compliance standards. As another example, different compliance standards may be targeted toward certain groups of people. More specifically, a compliance standard may be imposed on content collection packages that are generated for a sale of a new vehicle, and another compliance standard may be imposed on content collection packages that are generated for a financing deal for a used vehicle.

At block 408, the content compliance check system 106 may initialize a content item classifier 214 that implements or executes a machine learning model. Further, the content item classifier 214 may be configured based on configuration parameters. The configuration parameters may specify a set of static instructions that instruct the machine learning model on operations to perform with respect to the classification ruleset and a variable input that includes a portion of a content collection package (e.g., a content item, an image of a portion of a content item, a portion of the image, etc.). Each of the set of static instructions may cause accuracy of the compliance checker 204 to satisfy an accuracy threshold (e.g., 95%, 98%, or 99% accurate). In some examples, the accuracy threshold may be between 95% and 100%. In other examples, the accuracy threshold may be at or above 99%.

For example, the content compliance check system 106 may initiate the compliance checker 204 that utilizes the LLM 220A and/or the LLM 220B to perform content item classification on the portion of the content collection package based on the classification ruleset. In some examples, the set of machine learning models may include one or more transformer machine learning models. In some examples, the set of machine learning models may include a set of LLMs. The set of LLMs may include language models of different sizes and/or complexities. Each of the set of LLMs may be utilized to evaluate different criteria from the classification ruleset. For example, some of the criteria may correspond to performing complex logical reasonings on natural languages, and some of the criteria may correspond to identifying or analyzing details in a large corpus of text. In some examples, the set of machine learning models utilized by the compliance checker 204 may include at least one of a large language model, a vision model, an optical character recognition tool, an image processing model, an audio model, or a combination thereof.

At block 410, the content compliance check system 106 may process the portion of the content collection package using the input processor 212. The input processor 212 may use a set of machine learning models (e.g., the LLM 220A and/or the LLM 220B) to classify specific content items of the content collection package based at least in part on the classification ruleset and the portion of the content collection package supplied to the input processor 212. In some examples, classifying the portion of the content collection package may include determining whether a first portion and a second portion are associated (e.g., pages of the same document). In further examples, classifying the portion of the content collection package may include determining a document type of a content item associated with the portion (e.g., a regulatory notice, a contract, an advertisement, etc.). Determining the document type may further include determining an entity associated with the document type, such as the entity that requires the document type to be included in the collection of content items. Additionally, to classify the portion of the content collection package, the input processor 212 may use the set of machine learning models to perform optical character recognition or otherwise identify text information in a content item of the portion of the content collection package.

Classifying a content item may include executing the input processor 212 on the content item using the classification ruleset. The input processor 212 may use a set of machine learning models (e.g., the LLM 220A and/or the LLM 220B) to verify a classification of the content item based at least in part on the classification ruleset, and the portion of the content collection package item supplied to the input processor 212. In some examples, verifying the classification of the portion of the content collection package may include determining whether information included in the portion of the content collection package satisfies one or more criteria within the classification ruleset.

Additionally, classifying content items of the portion of the content collection package may include determining an association between content items of the portion. For example, the input processor 212 may access a first content item of the portion, and a second content item of the portion. The input processor 212 may apply the first content item and the second content item as input to the set of machine learning models to determine whether the first content item and the second content item are part of the same larger content item (e.g., pages of the same document) within the content collection package. In some examples, the first content item and the second content item are consecutive content items within the content collection package.

At block 412, the input processor 212 may identify target information in the specific content items of the content collection package. Target information may be information useable for determining whether the content collection package satisfies or complies with a compliance ruleset. Target information may be text, image, or other information contained in a portion of the content collection package (e.g., a content item or part of a content item). Target information may be determined based in part on a classification of the content item, and different content items may be associated with different target information. For example, for documents that include a space for a signature, target information may include data (presumably a signature) inserted into the signature field. Further, as such documents often request a date of signature, the target information may further include data (presumably the date that the form was signed) inserted into the date field. As another example, if the content item is classified as a loan document, the target information may include data inserted into fields of the content item associated with, for instance: signature, date, loan amount, guarantor, length of loan, monthly payment data, monthly payment amount, interest, co-signor, etc. It should be understood that some of this data may be optional, omitted, or missing. In cases where some of the data is missing, the compliance checker 204 may determine using embodiments described herein whether the document is non-compliant based on the missing target information. For example, a missing interest rate may indicate non-compliance with particular regulations. On the other hand, a missing signature for a co-signor may be compliant if, for example, there is no co-signor on the loan. While a missing co-signor signature may indicate non-compliance when a co-signor has been identified.

Target information may further be determined based in part on the compliance check to be performed by the compliance checker 204. For example, the information used to determine compliance with a business requirement may differ from the information used to determine compliance with a federal regulation. The content item classifier 214 may access a set of rules or indicators indicating the type of target information to be extracted (e.g., from the compliance ruleset data store 112). Additionally, some target information may be conditional on the presence or absence of other target information. For example, target information of a first content item may indicate that a background check was requested. Based on the background check being requested, the content item classifier 214 may determine that an agreement signed by the subject of the background check should be present. In this case, the subject's signature on the agreement is target information. In an alternative example, where no background check has been requested, the subject's signature may not be target information. The content item classifier 214 may use a machine learning model (e.g., LLM 220B) to extract the target information by providing at least a portion of the content item and an indication of the type of target information to be extracted as part of a prompt. The prompt may cause the machine learning model to provide the target information as text, a structured object, an image, or in any other format which may be used by the compliance checker 204 to determine compliance.

At block 414, the input processor 212 generates a compliance audit package. The compliance audit package may include some or all of the relevant information from the content collection package useful for determining whether the content collection package satisfies a compliance ruleset. For example, a content item of the content collection package may include a mandatory notice along with additional information. In this example, the mandatory notice may have been identified as target information based on a requirement in the compliance ruleset that the mandatory notice be included in the content collection package. The input processor 212 may extract the mandatory notice and add it to the compliance audit package.

At decision block 416, the content compliance check system 106 determines whether additional portions of the content collection package remain to be classified. In some examples, additional portions may remain if the additional portions have not been previously classified by the content compliance check system 106. Alternatively, the content compliance check system 106 may determine that all information necessary to determine whether the compliance ruleset is satisfied has been extracted from the content collection package and proceed to block 418 even where a portion of the content collection package has not been classified. Where an additional portion of the content collection package remains to be classified, the process 400 returns to block 404. Otherwise, the process 400 proceeds to block 418 illustrated in FIG. 4B.

At block 418, the content compliance check system 106 may generate a prompt that includes the compliance audit package and the compliance ruleset. For example, the prompt generator 202 may generate the prompt that includes the portion of the content collection package accessed at block 404 and the compliance ruleset. The prompt generator 202 may further transmit the prompt to the compliance checker 204.

In some examples, generating the prompt may include converting the compliance audit package (e.g., extracted target information) to a format that is supported by the compliance checker 204, the LLM 220A, and/or the LLM 220B. A format of the compliance audit package may correspond to various electronic data file formats, such as the Portable Document Format (PDF), the WORD file format, an image file (e.g., JPEG or GIF) format, a text file format, or other data file formats. For example, the prompt generator 202 may determine that a format of the compliance audit package is a first format. The prompt generator 202 may determine whether the first format is supported by the compliance checker 204. Responsive to determining that the first format is not supported by the compliance checker, the prompt generator 202 may convert the compliance audit package to a second format that is supported by the compliance checker 204. More specifically, the prompt generator 202 may determine that a compliance audit package is in an image file format, and that the compliance checker 204 does not support the image file format. Responsive to determining that the image file format is not supported by the compliance checker 204, the prompt generator 202 may convert the compliance audit package to another format (e.g., a text format, a text data file format) that is supported by the compliance checker 204.

At block 420, the content compliance check system 106 may initialize a compliance checker 204 that implements or executes a second set of machine learning models. Further, the compliance checker 204 may be configured based on configuration parameters associated with the compliance ruleset. The configuration parameters may specify a set of static instructions that instruct the set of machine learning models on operations to perform with respect to the compliance ruleset and a variable input that includes a compliance audit package (e.g., a compliance audit package). Each of the set of static instructions may cause accuracy of the compliance checker 204 to satisfy an accuracy threshold (e.g., 95%, 98%, or 99% accurate). In some examples, the accuracy threshold may be between 95% and 100%. In other examples, the accuracy threshold may be at or above 99%.

For example, the content compliance check system 106 may initiate the compliance checker 204 that utilizes the LLM 220A and/or the LLM 220B to perform compliance testing on the compliance audit package with the compliance ruleset. In some examples, the set of machine learning models may include one or more transformer machine learning models. In some examples, the set of machine learning models may include a set of LLMs. The set of LLMs may include language models of different sizes and/or complexities. Each of the set of LLMs may be utilized to evaluate different criteria from the compliance ruleset. For example, some of the criteria may correspond to performing complex logical reasonings on natural languages, and some of the criteria may correspond to identifying or analyzing details in a large corpus of text. In some examples, the set of machine learning models utilized by the compliance checker 204 may include at least one of a large language model, a vision model, an optical character recognition tool, an image processing model, an audio model, or a combination thereof.

At block 422, the content compliance check system 106 may process the prompt generated at block 418 using the compliance checker 204. Processing the prompt may include executing the compliance checker 204 on the compliance audit package using the prompt and the compliance ruleset. The compliance checker 204 may use a set of machine learning models (e.g., the LLM 220A and/or the LLM 220B) to verify compliance of the content collection package, and/or specific content items of the compliance audit package, based at least in part on the compliance ruleset, the prompt, and the compliance audit package supplied to the compliance checker 204. In some examples, verifying compliance of the content collection package may include determining whether information included in the compliance audit package passes or satisfies one or more criteria within the compliance ruleset.

At block 424, the content compliance check system 106 may receive compliance determination data that indicates whether the content collection package, and/or individual content items of the content collection package, satisfies one or more criteria within the compliance ruleset. For example, the output processor 206 may receive the compliance determination data that indicates whether the content collection package satisfies one or more criteria within the compliance ruleset.

At decision block 426, the content compliance check system 106 may determine whether the compliance dataset implicates additional compliance rules. For example, the content compliance check system 106 may determine whether the output of the compliance checker 204 indicates that additional compliance checking is to be performed. The determination may be based on the compliance ruleset itself, or may be based on additional deterministic processes. If it is determined that additional compliance checking is to be performed, the process 400 may return to the block 418 where additional prompts may be generated based at least in part on the output of earlier prompts processed by the compliance checker 204. Thus, in certain embodiments, the process 400 may be a recursive process that may evaluate compliance of a content collection package with a compliance ruleset using a plurality of interrelated prompts. Moreover, at least some of the prompts may be determined or generated based at least in part on the results of earlier processed prompts.

If it is determined at the decision block 426 that no further compliance checking is to be performed, the process 400 may proceed to the block 428. In some embodiments, the decision block 426 may be optional or omitted and the process 400 may proceed to the block 428 after performance of the block 424.

At block 428, the content compliance check system 106 may generate an output based at least in part on the compliance determination dataset. For example, the output processor 206 may generate an output that may be displayed or presented to the end user devices 102 through the user interface 208. The output may notify the end user devices 102 whether the content collection package passes or fails scrutiny of the compliance ruleset. Additionally, or alternatively, the output may notify the end user devices 102 whether individual content items, or portions, of the content collection package pass or fail scrutiny of the compliance ruleset. Further, when the content compliance check system 106 has determined that the content collection package has failed to satisfy a compliance rule of the compliance ruleset, the content compliance check system 106 may generate a resolution action. The resolution action may indicate how the noncompliance of the content collection package with the compliance rule may be resolved. For example, a compliance rule may require that a purchaser of a vehicle sign an acknowledgement that they have received a set of mandatory privacy notices. The content compliance check system 106, during the compliance check of this process 400, may determine that the purchaser has not signed the acknowledgment and therefore the content collection package is noncompliant with this rule. The content compliance check system 106 may provide a suggestion as part of the generated output that directs a user of the content compliance check system 106 to obtain the purchaser's signature on the acknowledgement.

In some examples, parts or all of the process 400 may be utilized to check compliance of documents related to various transactions, such as vehicle-related transactions (e.g., automobile lease, motorbike purchase, van rental, or the like).

For example, the content compliance check system 106 may receive a request from a user to check whether a vehicle purchase deal jacket complies with a compliance ruleset. The content compliance check system 106 may access the vehicle purchase deal jacket and the compliance ruleset. The vehicle purchase deal jacket may be in any form of electronic data, may include any number of documents, and may be provided or identified by the user. For example, the user may upload the vehicle purchase deal jacket that is included in a data file (e.g., a PDF file, JPEG, GIF) to the content compliance check system 106 and/or provide a storage location for accessing the vehicle purchase deal jacket such that the content compliance check system 106 can access the vehicle purchase deal jacket. The user may further select or provide the compliance ruleset to the content compliance check system 106 through operating on the user interface 208 that includes a compliance ruleset selection interface. For example, the user may select a compliance ruleset that regulates vehicle purchase deal jackets enacted by a particular state government through the compliance ruleset selection interface.

Prior to generating prompt(s) for a set of machine learning models (e.g., the LLM 220A and/or the LLM 220B) to check compliance of the vehicle purchase deal jacket with the compliance ruleset, the content compliance check system 106 (e.g., the input processor 212) may preprocess the vehicle purchase deal jacket. For example, in situations where the vehicle advertisement includes an image, the content compliance check system 106 may utilize the set of machine learning models that support OCR technology to convert text within the image of the vehicle advertisement into a format accessible by the set of machine learning models.

The content compliance check system 106 (e.g., the input processor 212) may further process the vehicle purchase deal jacket by identifying target information related to determining whether the vehicle purchase deal jacket complies with the compliance ruleset. The content compliance check system 106 may extract the identified target information and include the target information in a compliance audit package.

Based on the compliance audit package and the compliance ruleset identified, the content compliance check system 106 may generate a prompt that includes the content collection package, a portion of the vehicle purchase deal jacket, and/or the compliance ruleset. The prompt may include natural language words, phrases, sentences, or paragraphs that correspond to the vehicle advertisement and the compliance ruleset. The prompt may further provide instructions to the set of machine learning models on how to use the compliance ruleset to check compliance of the vehicle purchase deal jacket.

For example, a prompt may include an instruction that instructs the set of machine learning models to check whether the vehicle purchase deal jacket includes certain mandatory notices required by a regulatory body to be provided to a vehicle purchaser. The instruction may indicate to the set of machine learning models that the presence of some natural language terms (e.g., a privacy notice, a description of a purchaser's rights guaranteed under a relevant law or regulation, and the like) implies that the vehicle purchase deal jacket provides required notifications to the purchase. Whereas the lack of other natural language terms (e.g., identification of the vehicle being purchased, trade in value of a prior vehicle, etc.) implies that the vehicle purchase deal jacket fails to include a required information item. The instruction may further indicate to the set of machine learning models to generate results to show whether the vehicle purchase deal jacket includes the mandatory notices. The set of machine learning models may process the prompt to determine whether vehicle purchase deal jacket includes the mandatory notices.

Figure 6:
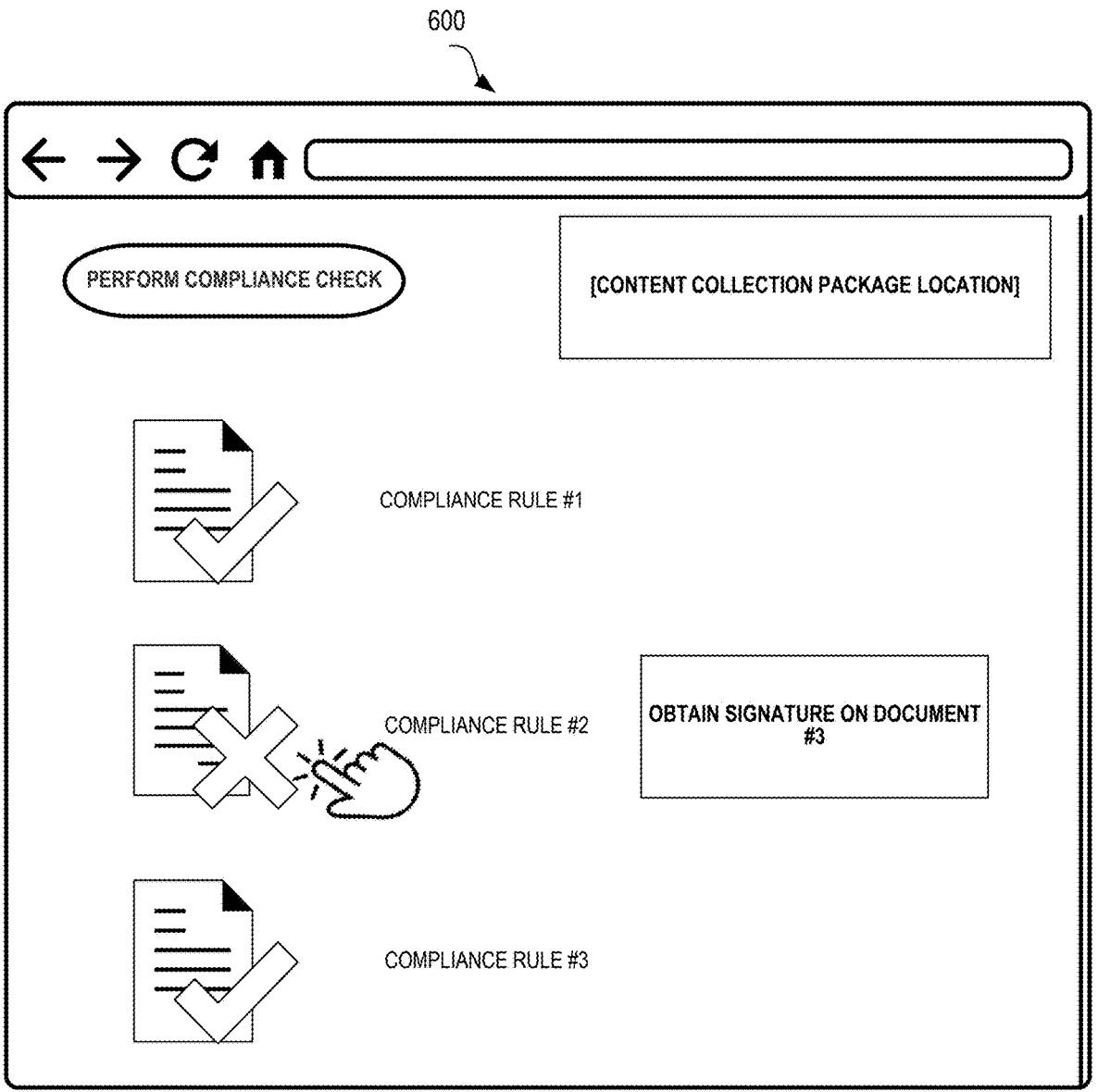
FIG. 6 illustrates an example user interface that allows a user to request the content compliance check system to perform content compliance testing on a regulated content item in accordance with certain embodiments.

By processing the prompts generated by the content compliance check system 106, the set of machine learning models may return a compliance determination dataset that indicates whether vehicle purchase deal jacket, or content items of the vehicle purchase deal jacket, satisfies one or more criteria within the compliance ruleset. The content compliance check system 106 may present (e.g., through the user interface 208) to the user an output based on the compliance determination dataset to show whether the vehicle purchase deal jacket complies with the compliance ruleset (e.g., as shown in FIG. 6).

As described herein, in some cases, multiple compliance rulesets may be applied to a content collection package to determine compliance with multiple regulations or compliance rules. Further, a compliance ruleset may be divided into multiple subsets of rules that may each be processed to determine compliance of a content collection package, or content item of the content collection package, with each of the subsets of compliance rules as well as the compliance ruleset as a whole. In some cases, the compliance rulesets or subsets of compliance rulesets may be included as part of a singular prompt generated at the block 418 and executed by the compliance checker 204 at the block 422. In other cases, the compliance rulesets or subsets of compliance rulesets may be associated with different prompts generated at the block 418 and may be executed separately by the compliance checker 204. In some cases, the subset of compliance rulesets may be associated with one overall or total compliance ruleset. In other cases, various subsets of compliance rulesets may be associated with different compliance rulesets. In other words, certain compliance rulesets may have overlapping rules that may be processed as part of determining whether a content item complies with various different compliance rulesets.

Further, in some cases, the results of processing a prompt associated with one ruleset or subset of a ruleset may be used to determine subsequent rulesets or subsets of a ruleset to apply to the content item. Thus, in some embodiments, the content compliance check system 106 may obtain an output from the compliance checker 204 based on the processing of a first prompt at the block 422 and may use the output to determine a second compliance ruleset or a subset of rules of the compliance ruleset for further processing of the content item. In some such embodiments, the content compliance check system 106 may generate a second prompt based on or including the content collection package, a portion of a content item of the content collection package, a compliance audit package, and/or the second compliance ruleset of subset of rules of the compliance ruleset. The compliance checker 204 may process the second prompt to determine whether the content collection package satisfies the compliance ruleset. In some cases, this process may repeat one or more times until a final determination of the compliance of the content collection package with the compliance ruleset is determined.

In some embodiments, the content compliance check system 106 may apply a set of deterministic rules to a content item to determine whether the content collection package complies with a compliance ruleset. In some cases, the deterministic rules are applied in conjunction with the compliance ruleset that is processed using the machine learning algorithms applied by the compliance checker 204.

For example, in some cases, deterministic rules may be used to determine a subsequent subset of compliance rules to apply based on an output a previous subset of compliance rules applied to a content collection package, portion of a content item of the content collection package, and/or compliance audit package using a set of machine learning algorithms (e.g., a large language model) applied by the compliance checker 204. In some embodiments, the compliance checker 204 uses deterministic rules to process the compliance ruleset with respect to the content collection package.

Example Compliance Testing Process

FIG. 5 presents a flowchart illustrating an example compliance testing process 500 in accordance with certain embodiments. Like the process 400, the process 500 can be performed by any system that can obtain a content collection package, process it as described herein, and apply it as part of a prompt including a compliance ruleset to a compliance checker that implements one or more machine learning models to determine a likelihood that the content collection package complies with the compliance ruleset. Further, as previously described, the compliance ruleset may include one or more rules for determining whether one or more content items of the content collection package comply with one or more government regulations. Alternatively, or in addition, the compliance ruleset may include one or more rules for determining whether the one or more content items comply with or satisfy one or more criteria that may or may not be associated with a government regulation. For example, the compliance ruleset may include rules set by any type of entity that desires to determine compliance of content with a set of criteria, such as a color scheme, a composition of content, an agreement between parties, a user preference, or any other type of criteria that can be used to evaluate content. As another example, the compliance ruleset may include rules for determining that the content collection package satisfies a set of rules or conditions set by a finance and insurance organization (e.g., a bank or insurance agency). In certain embodiments, the process 500 can be implemented by a content compliance check system 106, or one or more of its constituent systems.

The process 500 begins at block 502 where the content compliance check system 106, for example, receives a request to perform content compliance testing of a content collection package. The content collection package generally includes a plurality of content items. These content items may be homogenous or heterogenous. Further, the content items may be grouped together based on some relationship. For example, each of the content items may be associated with a particular product or with a particular transaction. In some cases, the content collection package may include a single content item. At least some of the content items may include documents that are part of a particular transaction or that describe a particular product. Alternatively, or in addition, the content items may include image content, audio content, video content, or any other type of content that can be collected as part of a content collection package.

In some embodiments, the request received at the block 502 includes the content collection package. Alternatively, or in addition, the request may include a link or an address to where the content collection package may be stored (e.g., a link to the content item data store 110 or a particular storage location therein).

In some cases, the request received at the block 502 may be in response to a user interaction with a user interface (e.g., the user interface 208). For example, the user may trigger the request either directly or by providing the content collection package (e.g., storing the content collection package at the content item data store 110). In other cases, the request received at the block 502 may be generated automatically by the content compliance check system 106 or a computing system in communication with the content compliance check system 106. For example, the creation or storage of the content collection package at the content item data store 110 may trigger an automatic request for compliance testing of the content collection package. As another example, the process 500 may be triggered on a scheduled basis to process content collection packages stored in the content item data store 110 or content collection packages that have not yet been evaluated for compliance or that have been modified since a prior compliance check.

At block 504, the content compliance check system 106 normalizes one or more content items included in the content collection package. The block 504 may include any type of normalizing process that converts the one or more content items included in the content collection package to a particular specification or to a particular specification range. In some cases, the normalizing process converts content items included in the content collection package to be within a particular specification range of each other. These specifications may relate to content size (e.g., dimensions of the content), data size (e.g., file storage size or data resolution), resolution of documents or images, clarity, file name conventions, content borders, image contrast, encoding, formatting, file type, and the like. Further, the file type may refer to the type of data (e.g., an image, a text document, a PDF document, and the like) and/or the specific file format (e.g., in the case of an image, JPEG, GIF, or PNG, and the like). Normalization may be applied to the one or more content items to enable consistently sized content to be applied to a machine learning model. In certain embodiments, applying consistently sized content improves the efficacy and/or the accuracy of the machine learning model. Normalization may also include converting content items to be in the same file type, file format, or any other of the aforementioned specifications.

At block 506, the content compliance check system 106 determines data input limits to a compliance check machine learning model based on an accuracy threshold for the compliance check machine learning model. The compliance check machine learning model may be or may include a machine learning model implemented by the compliance checker 204 (e.g., the LLM 220A), a machine learning model hosted by an external system (e.g., the LLM 220B), or any other machine learning model accessible or executed by the content compliance check system 106. The data input limits determined based on the accuracy threshold may differ from a token limit for the machine learning model. Content supplied to a machine learning model may be provided in the form of a prompt. In some cases, the prompt is divided into a set of tokens that are processed by the machine learning model. The machine learning model may be limited in the number of tokens that it can process based on the design of the model and/or based on the available computing resources. The data input limits determined based on the accuracy threshold may be less than a token limit for the machine learning model.

In some embodiments, the data input limits may be determined during a training or refinement process for the machine learning model. The training process may include supplying a set of historical and/or known inputs to the machine learning model of different sizes (e.g., different number of tokens) and evaluating the accuracy of a set of prompts supplied to the machine learning model based on the historical and/or known inputs. In some embodiments, the data input limits may be determined based on accuracy of the output, repeatability or consistency of the output, and/or a combination of accuracy and repeatability. The threshold accuracy, and/or repeatability, may be set by a user (e.g., an administrator, a customer, etc.) or may be set by the designer or manufacturer of the content compliance check system 106. The threshold setting may vary based on the particular use case. For example, in some cases, an accuracy of 99% may be sufficient. In other cases, an accuracy of 99.99% may be sufficient. In yet other cases, an accuracy of 95% may be sufficient. Thus, in some cases, the data input limits determined at the block 506 may be determined based on a target accuracy threshold for the compliance check machine learning model. The target accuracy threshold may vary based on a particular use case. The present disclosure is not limited by the particular threshold setting, and other threshold settings may be selected based on the desired use case.

In some embodiments, the block 506 is performed as part of a training process. In some embodiments, the operations associated with the block 506 may be performed during each performance of the process 500. In other embodiments, the operations associated with the block 506 may be performed during a subset of performances of the process 500. In some embodiments, the block 506 may include accessing a setting that indicates the data input limits. In some such cases, the setting may be determined by the manufacturer, an administrator (or other user), or during a training process. In yet other cases, the block 506 may be optional or omitted. In some such cases, the number of subpages to be obtained at the block 508 below may be statically set and/or preconfigured.

At block 508, the content compliance check system 106 divides each page of each content item of the content items, or a subset of the content items, into a set of overlapping subpages based at least in part on the data input limits determines at the block 506. As explained above, the division of each page into a number of overlapping subpages may be performed to improve the accuracy of the compliance check machine learning model and may be unrelated or not exclusively related to a token limit or a processing limit by the compliance check machine learning model. During development, the system was tested using datasets without overlapping subpages and using dataset with overlapping pages. The use of overlapping pages improved the accuracy of the system by more than 50% and, in some cases, by as much as 100% when performing certain compliance checks using the content compliance check system 106.

As described, dividing a content item into subpages, or chunking the content item into chunks, can improve the accuracy of the content compliance check system 106. In some cases, the increased accuracy may be counterintuitive because dividing content may result in reduced content for analysis. However, in some cases, certain machine learning models have size limits and/or resolution limits that prevent the ingestion of larger content items. Moreover, even in cases when the entire content item can be ingested, with certain machine learning models, the amount of data may cause dilution. In some cases, some of the data may not be relevant, but may bias the output of the machine learning model. This irrelevant data may act as noise when analyzing the relevant data. In some cases, providing an above thresh-old amount of data to a machine learning model can cause the machine learning model to not provide sufficient emphasis or weighting to certain aspects of the data. This may occur because, for example, the noisy or irrelevant data is overweighted by the machine learning model. By ingesting an above threshold quantity of data, the predictions of the machine learning model may be based on too much data that skews the predictions and/or reduces the emphasis of key data in generating the prediction. The more data that is analyzed by the machine learning model, the less emphasis is provided on the relevant data that is relevant to the compliance determination. By chunking the data, the amount of data processed at a given time or in response to particular prompt is reduced enabling an improved prediction by the machine learning model.

Further, in some embodiments, machine learning models may have spatial bias. For example, some machine learning models may emphasize particular portions within the document. For example, the machine learning model may learn to emphasize the top portion of a document where a title is often located, or where the density of text may be higher because, for example, the text may not extend to the bottom of a page in a document. In some cases, a machine learning model may generate a different output for a content item with the same information as another content item where the data is distributed differently within the content item. By chunking a document into subpages, the bias applied to data location within a document may be reduced.

In addition to the above benefits, dividing the page into subpages can improve the speed of processing by the content compliance check system 106. By dividing each page into subpages, less data is supplied as part of each prompt. In some cases, processing subpages may speed up the entirety of the process compared to processing each content item as a whole because, for example, the processing of a prompt may begin sooner and each subpage can be processed in parallel. For example, suppose a content item is 2 megabytes and that it takes 2 ms to ingest the content item before the machine learning model can begin determining when the content item complies with a compliance ruleset. By dividing the content item into two subpages of 1 megabyte each, the content compliance check system 106 may be able to begin processing each subpage after 1 ms. Moreover, as the subpages can be processed in parallel, the entire content item may begin being processed after 1 ms rather than after 2 ms. In this particular example, the speed of improvement is 2× because the data is divided in two and the system is able to process both subpages in parallel. However, in some cases, the speed improvement may differ because, for example, the dividing of the content item into overlapping portions instead of in half, and/or differences in latency, bandwidth, available memory, or other factors relating to available computing resources.

In certain embodiments, the number of subpages may be set at two, and each page of each content item may be divided into two subpages. However, the present disclosure is not limited as such, and the number of subpages may be specified by a user (e.g., an administrator) or a manufacturer, or may be determined based on a division metric. The division metric may include any type of metric that can be used to determine a number of portions to divide a content item. For example, the division metric may be based on the quantity of data, the resolution of the content item, the number of tokens supported by the machine learning model, or any other metric or factor. In some cases, the determination of the number of subpages to divide each page may be dynamically determined based on the division metric.

Accordingly, some pages may be divided into a different number of subpages than other pages. Advantageously, by dynamically determining the number of subpages to divide a content item or a page of a content item based on the division metric, the content item can be chunked in a manner that optimizes its processing by the machine learning model to improve accuracy and/or optimize use of computing resources enable improved parallelism, computer resource sharing, and execution time.

Further, although described as subpages of a page, it should be understood that the concept can be applied to other types of content items. For example, images may be divided into portions, audio files may be divided into portions of the audio, video files may be divided into clips, and the like.

As stated above, the content compliance check system 106 divided each page of the content items into overlapping subpages. Thus, there is a portion of each page that is included in multiple subpages. For example, in the case of dividing a page of a content item into two subpages, each page may include 55% or 60% of the content providing for a 5% or 10% overlap in content. It should be understood that the overlap may be a different percentage. For example, there may be an overlap of between 1% to 15%, or more. Moreover, in some cases, the percentage of overlap may be determined by the amount of data or content included in each page. A page that has a greater content density may have a lower percentage of overlap than a page with a lower content density. Advantageously, although dividing a content page into subpages results in less context being available for each subpage compared to the overall content page, dividing the pages into overlapping subpages resulted in an increase in the accuracy of predictions by the machine learning model and consequently, and increase in the accuracy of the compliance check system. As previously described, dividing the pages into overlapping subpages improved the accuracy by up to 100% for certain test prompts. Further, dividing the content page into overlapping portions reduced the occurrence of hallucinations by the machine learning model, thereby increasing the accuracy of the machine learning model. Hallucinations, in addition to its standard meaning in the art, may include the presentation of incorrect outputs or fictional outputs that are incorrect or unsupported based on the training and/or inputs to the machine learning model. The percentage of overlap between the overlapping subpages may be selected to reduce hallucinations to a threshold minimum. During testing, the occurrence of hallucinations was reduced to as little as 5% or less when testing using overlapping subpages. Moreover, for certain datasets and compliance rules, the hallucinations were eliminated completely during testing.

At block 510, the content compliance check system 106 classifies each content item of the content items included in the content collection package. The content item may be classified based on the type of content within the content item (e.g., images, audio, text, video, etc.) and/or based on the content itself (e.g., the content or the meaning of the text, the content of the image, the content of the audio, the content of the video, etc.). In some cases, the content item may be classified based on a title, a document number, a date, an associated product, and the like. In some cases, a machine learning model may be used to classify the content item. For example, the content item classifier 214 may apply a machine learning model (e.g., the LLM 220B) to classify the content of the content item. In some embodiments, the block 510 may include one or more of the embodiments described with respect to the block 310 and/or the block 360.

At block 512, the content compliance check system 106 accesses a compliance rule for a content item based on a classification for the content item. The compliance rule may be one of a plurality of compliance rules applied to the content item to determine compliance of the content item. The compliance rule may be selected based at least in part on a result of applying another compliance rule to the content item, or to applying one or more compliance rules to another content item included in the content collection package. The compliance rule may be accessed from the compliance ruleset data store 112. As previously described, the compliance rule may be used to determine whether a content item complies with a government regulation. However, in other cases, the compliance rule may be used to determine whether the content item complies with any other type of parameter or specification set by any other organization or standard.

At block 514, the content compliance check system 106 generates a first compliance check prompt based at least in part on the compliance rule for the content item and a first subpage of the content item. The first compliance check prompt may include the compliance rule identified at the block 512 and the first subpage of the content item. In some cases, the first compliance check prompt may further include a set of instructions that instruct a machine learning model on how to process the compliance rule and/or the first subpage. The set of instructions may configure the operation of the machine learning model to improve the accuracy and/or repeatability of the machine learning model output. The set of instructions may include specifying that the machine learning model ingest the entire compliance rule and/or first subpage prior to processing or applying the rule, may include specifying that the machine learning model output a basis for the result it generates, may include specifying that the machine learning model rerun operations a particular number of times, may include specifying that the machine learning model output the applied rule as part of the output, may include specifying that the machine learning model generate an output table that indicates a result of each sub-portion of the compliance rule, or any other operation that may improve the accuracy or repeatability of the machine learning model.

At block 516, the content compliance check system 106 provides the first compliance check prompt to the compliance check machine learning model to obtain a first output. The first output may include a prediction of compliance with the compliance rule. The prediction of the compliance with the compliance rule may be a Boolean output (e.g., yes or no) and/or may provide a more nuanced output. For example, the prediction of the compliance with the compliance rule may include an indication of what aspects of the compliance rule are met, may include data from the content item that complies with the compliance rule, may include an explanation of compliance, or any other type of data or output. In some cases, the compliance rule may provide information instead of or in addition to an indication of compliance. For example, the compliance rule may indicate a summary of content, a description of content, or may provide an answer to a query regarding the content. Further, the first output may include any alternative or additional output specified by the set of instructions included in the first compliance check prompt. In some cases, the first output may be presented to a user. In other cases, the first output may be an intermediary output that is used by the compliance checker 204, but which may or may not be presented to a user.

In some embodiments, the content compliance check system 106 may select a particular machine learning model to receive the compliance check prompts based on one or more of the type of content item or the compliance rule. In some cases, certain machine learning models may be more accurate at performing certain tasks. For example, some machine learning models are more accurate at processing blurry documents, while other machine learning models are more accurate at detecting handwriting, other machine learning models are more accurate at processing structured data, and yet other machine learning models are more accurate at processing free form text. As another example, some machine learning models are better at identifying missing data or predicting what data may come next while other machine learning models are better at inferring a result from provided data. The content compliance check system 106 can be configured to select a machine learning model to perform a particular compliance check based on the compliance rule determined at the block 512 and/or the content item or type of content item to be processed. By selecting a machine learning model based on the content item or compliance rule, the accuracy of the process 500 can be increased compared to using a statically selected machine learning model.

At block 518, the content compliance check system 106 generates a second compliance check prompt based at least in part on the compliance rule for the content item and a second subpage of the content item. The block 518 may include one or more operations or embodiments described with respect to the block 514. In some embodiments, operations of the block 518 may be performed at least partially in parallel to operations of the block 514. Advantageously, by performing the operations of the block 518 at least partially in parallel to operations of the block 514, the efficiency of the content compliance check system 106 can be improved and the amount of computing resources (e.g., processor time, memory usage, etc.) may be reduced.

At block 520, the content compliance check system 106 provides the second compliance check prompt to the compliance check machine learning model to obtain a second output. The block 520 may include one or more operations or embodiments described with respect to the block 516. In some embodiments, operations of the block 520 may be performed at least partially in parallel to operations of the block 516. Advantageously, by performing the operations of the block 520 at least partially in parallel to operations of the block 516, the efficiency of the content compliance check system 106 can be improved and the amount of computing resources (e.g., processor time, memory usage, etc.) may be reduced.

As described above, two compliance check prompts may be generated to apply two subpages of a page of a content item to a machine learning model to obtain a pair of outputs. It should be understood that the process may be repeated for as many subpages as are generated for the page of the content item. Moreover, in case cases, the subpages may be obtained from a plurality of pages of a content item. In other words, in some cases, the subpages may be portions of a content item that may be one or more pages. Further, each subpage or portion of the content item may be an overlapping subpage or portion of the content item. Additionally, in some cases, the operations may be repeated for each page of a content item. Moreover, the portions of the content item may comprise content other than pages of a document. For example, as previously described, the content may be audio, video, or images, and the portions may be portions of such content items.

At block 522, the content compliance check system 106 applies the first output and the second output to a compliance resolution system to determine a compliance check result. The compliance check result may be output to a user via a user interface, stored in a repository of compliance check results, or used to initiate or trigger additional compliance checks, and the like. The compliance resolution system may be implemented by the compliance checker 204 and may apply a resolution algorithm to the first output and the second output to determine the compliance check result. The resolution algorithm may include any type of algorithm that can determine a compliance check result for a content item, or a page thereof, based on the outputs generated for each subpage (e.g., the first subpage and the second subpage). For example, the resolution algorithm may include determining whether the first output and the second output match and, if so, generating the compliance check result based on the determination of the match. A match may indicate either compliance or non-compliance depending on the values of the first output and the second output. In some cases, the resolution algorithm may include determining whether the first output and the second output match within a particular degree of consistency. In other words, in some cases, a less than threshold difference between the first output and the second output may be classified as a match. In other cases, the first output and the second output are determined to match when the first output and the second output are identical and to not match when the first output and the second output are not identical.

If it is determined that the first output and the second output do not match, the resolution algorithm may be configured to select the output associated with the first portion of the content item (e.g., the first subpage or the top of the page), the output associated with the portion of the content item that includes a greater amount of data, may select a different compliance rule to apply to the subpages, may divide the page into different subpages and repeat the operations associated with applying the subpages to the machine learning model, or may perform any other process for resolving whether the content item complies with the compliance rule. In some cases, a positive (e.g., content complies) or negative (e.g., content does not comply) output may be weighted higher. Thus, in cases where the first subpage and the second subpage do not match, the compliance check result may be selected based on whether the positive or negative output is weighted higher. In some embodiments, the resolution algorithm may include alerting a user of an inconsistency between the first output and the second output.

In some embodiments, the value of the first output may be used to determine whether the value of the second output indicates that the content item satisfies the compliance rule, or vice versa. For example, in some cases, the determination of whether the second output indicates compliance may be based on the value of the first output and the same value for the second output may indicate both compliance or non-compliance depending on the value of the first output. In some embodiments, the first output and the second output may be supplied to a machine learning model to determine the compliance check result.

Advantageously, dividing the content item into multiple overlapping sub-portions improves the accuracy and repeatability of the machine learning model (e.g., a large language model). This may occur regardless of whether a token limit for the machine learning model is reached. In other words, in some embodiments, the improvement in accuracy may be achieved even when the input is smaller than a token limit for the machine learning model. Further, the ability to divide the content item into overlapping sub-portions, or to chunk the content, causes the machine learning model to be executed more quickly and efficiently using less computing resources compared to a system that evaluates the entirety of the content item in a single prompt. In addition, the system can more quickly evaluate each content item at least because the chunking of content items enables the parallelization of the compliance testing process (e.g., the process 500). In some cases, the overlapping content included in the overlapping sub-portions or subpages can eliminate or reduce the occurrence of inaccuracy due to the chunking process. Moreover, the use of overlapping sub-portions can improve the accuracy of the machine learning model compared to systems that may evaluate non-overlapping portions of a content item.

Example User Interfaces

FIG. 6 shows a non-limiting example of a user interface 600 that allows the end user devices 102 to submit a request to the content compliance check system 106 for performing content compliance testing on regulated content collection package(s), and provides an output generated by the output processor 206 based on a compliance determination dataset following compliance testing. In some examples, elements of the content compliance check system 106 may follow the interactions depicted in FIGS. 4A-4B to perform compliance testing using the content collection package and compliance ruleset. As shown, the user may provide a content collection package location, and select an interactive button to perform a compliance check on the content collection package. Alternatively, the user may directly upload a content collection package to the content compliance check system 106 via the user interface 600. The content collection package may include a compliance ruleset. The output of the content compliance check system 106 in this example user interface 600 is presented below the option to perform the compliance check. Some or all of the compliance rules of the compliance ruleset may be listed in the user interface 600, along with a visual indication of whether the content collection package, or a content item of the content collection package, satisfies a compliance rule. In some examples, the user may select a compliance rule that is not satisfied, and the user interface 600 may provide additional information indicating how the compliance rule may be satisfied (e.g., by obtaining a signature on a particular document of the content collection package as shown).

Additional Example Implementation and Details

In an implementation of the system (e.g., one or more aspects of the content compliance check system 106, one or more aspects of the computing environment 100, and/or the like) may comprise, or be implemented in, a "virtual computing environment". As used herein, the term "virtual computing environment" should be construed broadly to include, for example, computer-readable program instructions executed by one or more processors (e.g., as described in the example of FIG. 7) to implement one or more aspects of the modules and/or functionality described herein. Further, in this implementation, one or more services/modules/engines and/or the like of the system may be understood as comprising one or more rules engines of the virtual computing environment that, in response to inputs received by the virtual computing environment, execute rules and/or other program instructions to modify operation of the virtual computing environment. For example, a request received from a user computing device may be understood as modifying operation of the virtual computing environment to cause the request access to a resource from the system. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system. Initial operation of the virtual computing environment may be understood as an establishment of the virtual computing environment. In various implementations the virtual computing environment may comprise one or more virtual machines, containers, and/or other types of emulations of computing systems or environments. In various implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system as a virtual computing environment may advantageously enable executing different aspects or modules of the system on different computing devices or processors, which may increase the scalability of the system. Implementing one or more aspects of the system as a virtual computing environment may further advantageously enable sandboxing various aspects, data, or services/modules of the system from one another, which may increase security of the system by preventing, e.g., malicious intrusion into the system from spreading. Implementing one or more aspects of the system as a virtual computing environment may further advantageously enable parallel execution of various aspects or modules of the system, which may increase the scalability of the system. Implementing one or more aspects of the system as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Various implementations of the present disclosure may be a system, a method, and/or a computer program product at any possible technical detail level of integration. The computer program product may include a computer-readable storage medium (or mediums) having computer-readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer-readable storage medium (or mediums). Computer-readable storage mediums may also be referred to herein as computer-readable storage or computer-readable storage devices.

The computer-readable storage medium can be a tangible device that can retain and store data and/or instructions for use by an instruction execution device. The computer-readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions (as also referred to herein as, for example, "code," "instructions," "module," "application," "software application," "service," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer-readable program instructions may be callable from other instructions or from itself, and/or may be invoked in response to detected events or interrupts. Computer-readable program instructions configured for execution on computing devices may be provided on a computer-readable storage medium, and/or as a digital download (and may be originally stored in a compressed or installable format that requires installation, decompression, or decryption prior to execution) that may be stored on a computer-readable storage medium. Such computer-readable program instructions may be stored, partially or fully, on a memory device (e.g., a computer-readable storage medium) of the executing computing device, for execution by the computing device. The computer-readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various implementations, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart(s) and/or block diagram(s) block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowcharts and block diagrams in the Figures illustrate the architecture, functionality, and operation of possible implementations of systems, methods, and computer program products according to various implementations of the present disclosure. In this regard, each block in the flowchart or block diagrams may represent a service, module, segment, or portion of instructions, which comprises one or more executable instructions for implementing the specified logical function(s). In various alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted or optional in various implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above implementations may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows 11, Windows Server, and/or the like), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
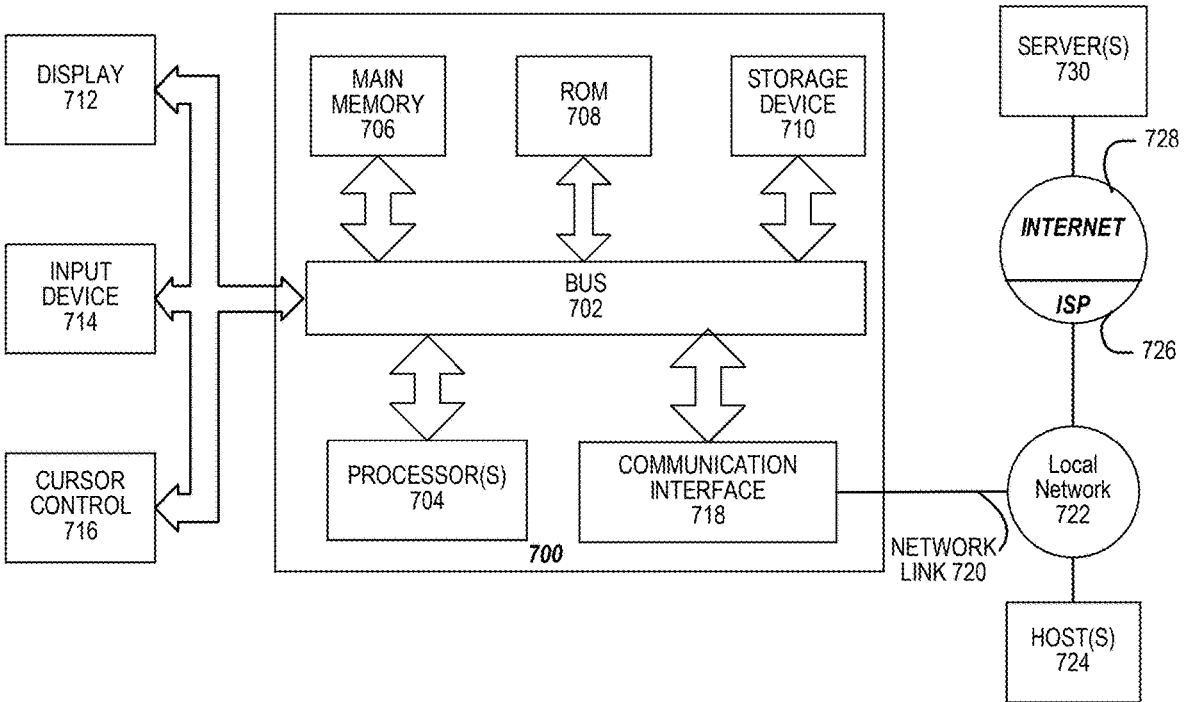
FIG. 7 is a block diagram of an example computer system that may be configured to execute computer-executable instructions to perform one or more embodiments of the present disclosure.

For example, FIG. 7 shows a block diagram that illustrates a computer system 700 upon which various implementations and/or aspects (e.g., one or more aspects of the computing environment 100, one or more aspects of the content compliance check system 106, one or more aspects of the end user devices 102, one or more aspects of the LLM 220A and/or the LLM 220B, and/or the like) may be implemented. Multiple such computer systems 700 may be used in various implementations of the present disclosure. Computer system 700 includes a bus 702 or other communication mechanism for communicating information, and a hardware processor, or multiple processors, 604 coupled with bus 702 for processing information. Hardware processor(s) 704 may be, for example, one or more general purpose microprocessors.

Computer system 700 also includes a main memory 706, such as a random-access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The main memory 706 may, for example, include instructions to implement server instances, queuing modules, memory queues, storage queues, user interfaces, and/or other aspects of functionality of the present disclosure, according to various implementations.

Computer system 700 further includes a read only memory (ROM) 608 or other static storage device coupled to bus 702 for storing static information and instructions for processor 704. A storage device 710, such as a magnetic disk, optical disk, or USB thumb drive (Flash drive), and/or the like, is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In various implementations, the same direction information and command selections as cursor control may be implemented via receiving touches on a touch screen without a cursor.

Computer system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one implementation, the techniques herein are performed by computer system 700 in response to processor(s) 704 executing one or more sequences of one or more computer-readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative implementations, hard-wired circuitry may be used in place of or in combination with software instructions.

Various forms of computer-readable storage media may be involved in carrying one or more sequences of one or more computer-readable program instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 626. ISP 726 in turn provides data communication services through the worldwide packet data communication network now commonly referred to as the "Internet" 628. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Terminology

To facilitate an understanding of the systems and methods discussed herein, several terms are described below and herein. These terms, as well as other terms used herein, should be construed to include the provided descriptions, the ordinary and customary meanings of the terms, and/or any other implied meaning for the respective terms, wherein such construction is consistent with context of the term. Thus, the descriptions below and herein do not limit the meaning of these terms, but only provide example descriptions.

A content item (or a "regulated content item") can be any media content or media work that may correspond to various forms of media (e.g., texts, images, video, audio, mixture of text and images, mixture of text and audio, or any combination thereof). A content item can be a document (e.g., a technical document), a book, a brochure, a webpage, a script, a video clip, an operation manual, a user manual, an email, a booklet, a technical standard, an advertisement, a flyer, a movie, a TV show, and so forth. A content item may be stored in a data store as any form of electronic data.

A compliance ruleset can be any regulatory laws and/or rules promulgated by an agency (e.g., a regulatory agency), a legislative body (e.g., the Congress, a state legislative body), a private entity, a public entity, an organization, an institution, a state government, a federal government, a foreign government, an international regulatory organization, or the like. A compliance ruleset may be directed toward any regulated fields, such as privacy regulations, export control regulations, mass communication regulations, sensitive information regulations, environment regulations, movie censorship, commercial speech (e.g., advertisements) regulations, or other kinds of regulations. In some cases, the compliance ruleset may include rules promulgated by non-governmental organizations. For example, a private entity may promulgate rules for content generated by employees.

A content presentation location, as used in the present disclosure, can be any webpage, a portion of a webpage, or any content page presented by a website. A content presentation location may include one or more content items. A content presentation profile, as used in the present disclosure, can be any information that indicates network locations managed by a website where content items can be accessed. More specifically, a content presentation profile may be utilized to identify content presentation locations of a website that include content items. A content presentation profile may be standardized among websites, meaning that multiple websites may follow the content presentation profile to place or store content items. A content presentation profile may alternatively be proprietary to a website, meaning that the content presentation profile may be utilized to identify or determine content presentation locations within the website. Configuration parameters, as used in the present disclosure, can be any information that configures, instructs, or guides one or more machine learning models (e.g., LLMs) to perform compliance testing.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like. A "nondeterministic model" as used in the present disclosure, is any model in which the output of the model is not determined solely based on an input to the model. Examples of nondeterministic models include language models such as LLMs, ML models, and the like.

A Language Model may include any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") may include any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodal LLM/model, and/or the like. An LLM (and/or other models of the present disclosure), may include, for example, attention-based and/or transformer architecture or functionality. LLMs can be useful for natural language processing, including receiving natural language prompts and providing natural language responses based on the text on which the model is trained. LLMs may not be data security- or data permissions-aware, however, because they generally do not retain permissions information associated with the text upon which they are trained. Thus, responses provided by LLMs are typically not limited to any particular permissions-based portion of the model.

While certain aspects and implementations are discussed herein with reference to use of a language model, LLM, and/or AI, those aspects and implementations may be performed by any other language model, LLM, AI model, generative AI model, generative model, ML model, NN, multimodal model, and/or other algorithmic processes. Similarly, while certain aspects and implementations are discussed herein with reference to use of a ML model, language model, or LLM, those aspects and implementations may be performed by any other AI model, generative AI model, generative model, NN, multimodal model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 3.5 (GPT-3.5), Generative Pre-trained Transformer 4 (GPT-4), Generative Pre-trained Transformer 4 (GPT-4), LLAMA (Large Language Model Meta AI), and BigScience Large Open-science Open-access Multilingual Language Model (BLOOM).

A Prompt (or "Natural Language Prompt" or "Model Input") can be, for example, a term, phrase, question, and/or statement written in a human language (e.g., English, Chinese, Spanish, and/or the like), and/or other text string, that may serve as a starting point for a language model and/or other language processing. A prompt may include only a user input or may be generated based on a user input, such as by a prompt generation module (e.g., of a document search system) that supplements a user input with instructions, examples, and/or information that may improve the effectiveness (e.g., accuracy and/or relevance) of an output from the language model. A prompt may be provided to an LLM which the LLM can use to generate a response (or "model output").

A context can be any information associated with user inputs, prompts, responses, etc. that are generated and/or communicated to/from the user, the artificial intelligence system, the LLM, the data processing services, and/or any other device or system. For example, context may include a conversation history of all of the user inputs, prompts, and responses of a user session. Context may be provided to an LLM to help an LLM understand the meaning of and/or to process a prompt, such as a specific piece of text within a prompt. Context can include information associated with a user, user session, or some other characteristic, which may be stored and/or managed by a context module. Context may include all or part of a conversation history from one or more sessions with the user (e.g., a sequence of user prompts and orchestrator selector responses or results, and/or user selections (e.g., via a point and click interface or other graphical user interface). Thus, context may include one or more of: previous analyses performed by the user, previous prompts provided by the user, previous conversation of the user with the language model, schema of data being analyzed, a role of the user, a context of the data processing system (e.g., the field), and/or other contextual information.

A User Operation (or "User Input") can be any operations performed by one or more users to user interface(s) and/or other user input devices associated with a system (e.g., the data extraction system). User operations can include, for example, select, drag, move, group, or the like, nodes or edges of one or more interactive graphical representations for updating an ontology based on unmatched classified triples represented by the nodes or the edges. User operations can also include, for example, selecting an unmatched triple displayed in a list and identify one or more issues associated with the unmatched triple. User operations (e.g., input a text data to the data extraction system) can also prompt a task to be performed, such as by an LLM, in whole or in part.

A Data Store may include any computer-readable storage medium and/or device (or collection of data storage mediums and/or devices). Examples of data stores include, but are not limited to, optical disks (e.g., CD-ROM, DVD-ROM, and the like), magnetic disks (e.g., hard disks, floppy disks, and the like), memory circuits (e.g., solid state drives, random-access memory (RAM), and the like), and/or the like. Another example of a data store is a hosted storage environment that includes a collection of physical data storage devices that may be remotely accessible and may be rapidly provisioned as needed (commonly referred to as "cloud" storage). According to various implementations, any data storage, data stores, databases, and/or the like described in the present disclosure may, in various implementations, be replaced by appropriate alternative data storage, data stores, databases, and/or the like.

A Database may include any data structure (and/or combinations of multiple data structures) for storing and/or organizing data, including, but not limited to, relational databases (e.g., Oracle databases, PostgreSQL databases, MySQL databases, and the like), non-relational databases (e.g., NoSQL databases, and the like), in-memory databases, spreadsheets, comma separated values (CSV) files, extensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) can be understood as being stored in one or more data stores. Additionally, although the present disclosure may show or describe data as being stored in combined or separate databases, in various implementations such data may be combined and/or separated in any appropriate way into one or more databases, one or more tables of one or more databases, and/or the like. According to various implementations, any database(s) described in the present disclosure may be replaced by appropriate data store(s). Further, data source(s) of the present disclosure may include one or more databases, one or more tables, one or more data sources, and/or the like, for example.

Further, as used herein, the term "set" may include its plain and ordinary meaning. Moreover, the term "set" may include one or more items. For example, a set of regulated content items may include one or more content items and a set of rules or instructions may include one or more rules or instructions. In some cases, a set may include a plurality.

EXAMPLE CLAUSES

Examples of implementations of the present disclosure can be described in view of the following example clauses or aspects. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example aspects below, or any features of the example aspects, can be combined with any one or more other example aspects, or features of the example clauses or other features of the present disclosure.

In some aspects, the techniques described herein relate to a compliance testing system configured to test compliance of a content collection package having a plurality of heterogenous content items, the compliance testing system including: a memory configured to store computer-executable instructions; and one or more hardware processors configured to execute the computer-executable instructions to at least: receive a request to perform content compliance testing of the content collection package; access a first portion of the content collection package, wherein the first portion corresponds to at least one of the plurality of heterogenous content items; access a classification ruleset specifying a set of at least partially different criteria that describe identifying features associated with specific content items in the content collection package and types of data extractable from the specific content items, and wherein the classification ruleset includes configuration parameters for configuring a first set of machine learning models; execute, on the first portion of the content collection package, a content item classification and data extraction process implemented using the first set of machine learning models that are configured based on the configuration parameters, wherein the configuration parameters specify a set of instructions that instruct the first set of machine learning models on operations to perform with respect to the classification ruleset and the content collection package, and wherein the set of instructions is configured to: classify the specific content items in the content collection package; determine that a first content item of the specific content items includes first target information, wherein the first target information is usable to assess compliance of the content collection package with a compliance ruleset, and wherein the compliance ruleset specifies rules for determining whether the content collection package satisfies a set of compliance criteria; and in response to determining that the first content item includes the first target information, extract the first target information into a compliance audit package; generate a prompt including the compliance audit package and the compliance ruleset; process the prompt using a compliance checker implemented using a second set of machine learning models that are configured based on second configuration parameters, wherein the second configuration parameters specify a second set of instructions that instruct the second set of machine learning models on operations to perform with respect to the compliance ruleset and the compliance audit package, wherein the second set of instructions is configured to maintain accuracy of the compliance checker at or above an accuracy threshold, and wherein the compliance checker uses the second set of machine learning models to verify compliance of the compliance audit package based at least in part on the compliance ruleset; receive a compliance determination dataset from the compliance checker that indicates whether the compliance audit package satisfies one or more criteria within the compliance ruleset; and generate an output for display on a user interface based at least in part on the compliance determination dataset.

In some aspects, the techniques described herein relate to a compliance testing system, wherein the compliance audit package includes a subset of the content collection package having the first target information and at least second target information indicative of whether the content collection package satisfies the compliance ruleset.

In some aspects, the techniques described herein relate to a compliance testing system, wherein processing the prompt includes assessing consistency between the first target information and the at least second target information.

In some aspects, the techniques described herein relate to a compliance testing system, wherein the compliance audit package omits a subset of the content collection package that is not indicative of whether the content collection package satisfies the compliance ruleset.

In some aspects, the techniques described herein relate to a compliance testing system, wherein the one or more hardware processors is further configured to execute the computer-executable instructions to at least: access a second portion of the content collection package; and execute the content item classification and data extraction process on the second portion of the content collection package.

In some aspects, the techniques described herein relate to a compliance testing system, wherein the second portion of the content collection package corresponds to a different heterogenous content item than the first portion of the content collection package.

In some aspects, the techniques described herein relate to a compliance testing system, wherein the second portion of the content collection package corresponds to the same heterogenous content item as the first portion of the content collection package.

In some aspects, the techniques described herein relate to a compliance testing system, wherein the compliance audit package includes second target information extracted from specific content items included in the second portion of the content collection package.

In some aspects, the techniques described herein relate to a compliance testing system, wherein, in response to determining that the compliance determination dataset indicates that the compliance audit package does not satisfy one or more criteria within the compliance ruleset, the one or more hardware processors is further configured to execute the computer-executable instructions to at least determine a resolution action to resolve noncompliance of the content collection package.

In some aspects, the techniques described herein relate to a compliance testing system, wherein the output includes an identity of the resolution action.

In some aspects, the techniques described herein relate to a compliance testing system, wherein the first set of machine learning models includes a computer vision machine learning model.

In some aspects, the techniques described herein relate to a compliance testing system, wherein the first set of machine learning models includes a large language model.

In some aspects, the techniques described herein relate to a compliance testing system, wherein the one or more hardware processors is further configured to execute the computer-executable instructions to at least chunk the content collection package into a plurality of portions that satisfy a size threshold, wherein the plurality of portions includes the first portion of the content collection package.

In some aspects, the techniques described herein relate to a compliance testing system, wherein executing the content item classification and data extraction process on the first portion of the content collection package further includes: accessing a second portion of the content collection package; and applying the first portion of the content collection package and the second portion of the content collection package to the first set of machine learning models to determine whether the first portion of the content collection package and the second portion of the content collection package are associated with the same content item within the content collection package.

In some aspects, the techniques described herein relate to a compliance testing system, wherein the first portion of the content collection package and the second portion of the content collection package are consecutive portions within the content collection package.

In some aspects, the techniques described herein relate to a compliance testing system, wherein the first portion of the content collection package and the second portion of the content collection package each include a document page within the content collection package.

In some aspects, the techniques described herein relate to a compliance testing system, wherein the first portion of the content collection package and the second portion of the content collection package each include a part of a document page within the content collection package.

In some aspects, the techniques described herein relate to a compliance testing system, wherein, in response to determining that the first portion of the content collection package and the second portion of the content collection package are not associated with the same content item, classifying the first portion of the content collection package as the first content item and classifying the second portion of the content collection package as a second content item.

In some aspects, the techniques described herein relate to a compliance testing system, wherein, in response to determining that the first portion of the content collection package and the second portion of the content collection package are associated with the same content item, grouping the first portion of the content collection package and the second portion of the content collection package as part of the first content item.

In some aspects, the techniques described herein relate to a compliance testing system, wherein executing the content item classification and data extraction process on the first portion of the content collection package further includes:

accessing a third portion of the content collection package; and applying the third portion of the content collection package and first content item to the first set of machine learning models to determine whether the third portion of the content collection package is part of the first content item.

In some aspects, the techniques described herein relate to a compliance testing system, wherein, in response to determining that the third portion of the content collection package is part of the first content item, grouping the third portion of the content collection package with the first portion of the content collection package and the second portion of the content collection package as part of the first content item.

In some aspects, the techniques described herein relate to a compliance testing system, wherein, in response to determining that the third portion of the content collection package is not part of the first content item, classifying the third portion of the content collection package as a second content item.

In some aspects, the techniques described herein relate to a compliance testing system, wherein processing the prompt includes assessing whether the first content item satisfies the compliance ruleset.

In some aspects, the techniques described herein relate to a compliance testing system, wherein assessing whether the first content item satisfies the compliance ruleset includes determining whether the first content item is consistent with a second content item.

In some aspects, the techniques described herein relate to a compliance testing system, wherein assessing whether the first content item satisfies the compliance ruleset is based at least in part on second target information extracted from a second content item.

In some aspects, the techniques described herein relate to a computer-implemented method of testing compliance of a content collection package having a plurality of heterogenous content items, the computer-implemented method including: by a computing system including one or more hardware processors, receiving a request to perform content compliance testing of the content collection package; accessing a first portion of the content collection package; accessing a classification ruleset specifying a set of at least partially different criteria that describe identifying features associated with specific content items in the content collection package and types of data extractable from the specific content items, and wherein the classification ruleset includes configuration parameters for configuring a first set of machine learning models; executing, on the first portion of the content collection package, a content item classification and data extraction process implemented using the first set of machine learning models that are configured based on the configuration parameters, wherein the configuration parameters specify a set of instructions that instruct the first set of machine learning models on operations to perform with respect to the classification ruleset and the content collection package, and wherein the content item classification and data extraction process includes: classifying the specific content items in the content collection package; determining that a first content item of the specific content items includes first target information, wherein the first target information is usable to assess compliance of the content collection package with a compliance ruleset, and wherein the compliance ruleset specifies rules for determining whether the content collection package satisfies a set of compliance criteria; and in response to determining that the first content item includes the first target information, extracting the first target information into a compliance audit package, wherein the compliance audit package includes a subset of the content collection package having the first target information and at least second target information indicative of whether the content collection package satisfies the compliance ruleset, and wherein the compliance audit package omits a subset of the content collection package that is not indicative of whether the content collection package satisfies the compliance ruleset; processing the compliance audit package using the compliance ruleset to obtain a compliance indication result; and generating an output for display on a user interface based on the compliance indication result.

In some aspects, the techniques described herein relate to a computer-implemented method, wherein processing the compliance audit package includes assessing consistency between the first target information and the at least second target information.

In some aspects, the techniques described herein relate to a computer-implemented method, wherein processing the compliance audit package includes: generating a prompt based at least in part on the compliance audit package and the compliance ruleset; and processing the prompt using a second set of machine learning models that are configured based on second configuration parameters.

In some aspects, the techniques described herein relate to a computer-implemented method, wherein the second configuration parameters specify a second set of instructions that instruct the second set of machine learning models on operations to perform with respect to the compliance ruleset and the compliance audit package.

In some aspects, the techniques described herein relate to a computer-implemented method, wherein the second set of instructions is configured to maintain accuracy of the second set of machine learning models at or above an accuracy threshold.

In some aspects, the techniques described herein relate to a computer-implemented method, further including: accessing a second portion of the content collection package; and executing the content item classification and data extraction process on the second portion of the content collection package.

In some aspects, the techniques described herein relate to a computer-implemented method, wherein the second portion of the content collection package corresponds to a different content item than the first portion of the content collection package.

In some aspects, the techniques described herein relate to a computer-implemented method, wherein the first portion of the content collection package and the second portion of the content collection package correspond to the same content item of the content collection package.

In some aspects, the techniques described herein relate to a computer-implemented method, wherein the at least second target information is extracted from the second portion of the content collection package.

In some aspects, the techniques described herein relate to a computer-implemented method, wherein, in response to determining that the compliance indication result indicates that the compliance audit package does not satisfy one or more criteria within the compliance ruleset, the computer-implemented method further includes determining a resolution action to resolve noncompliance of the content collection package.

In some aspects, the techniques described herein relate to a computer-implemented method, wherein the output includes an identity of the resolution action.

In some aspects, the techniques described herein relate to a computer-implemented method, wherein the first set of machine learning models includes a computer vision machine learning model.

In some aspects, the techniques described herein relate to a computer-implemented method, further including chunking the content collection package into a plurality of portions that satisfy a size threshold, wherein the plurality of portions includes the first portion of the content collection package.

In some aspects, the techniques described herein relate to a compliance testing system configured to test compliance of a content item, the compliance testing system including: a memory configured to store computer-executable instructions; and one or more hardware processors configured to execute the computer-executable instructions to at least: receive a request to perform content compliance testing of a content item; access the content item; identify a type of the content item using a first machine learning model; extract target information from the content item, wherein the target information is useable to assess compliance of the content item with a compliance ruleset, wherein the target information is identified based at least in part on the type of the content item; access the compliance ruleset that specifies a set of criteria that evaluate compliance of content items with a set of constraints, and wherein the compliance ruleset includes configuration parameters for configuring a second machine learning model; execute a compliance checker implemented using the second machine learning model, wherein the second machine learning model is configured based on the configuration parameters, wherein the configuration parameters specify a set of instructions that instruct the second machine learning model on operations to perform with respect to the compliance ruleset and the content item, and wherein the set of instructions are configured to maintain accuracy of the compliance checker at or above an accuracy threshold; generate a prompt including the target information extracted from the content item and the compliance ruleset; process the prompt using the compliance checker, wherein the compliance checker uses the second machine learning model to verify compliance of the content item based at least in part on the compliance ruleset; receive a compliance determination dataset from the compliance checker that indicates whether the content item satisfies one or more criteria within the compliance ruleset; and generate an output for display on a user interface based at least in part on the compliance determination dataset.

In some aspects, the techniques described herein relate to a compliance testing system, wherein determining whether the content items satisfies one or more criteria within the compliance ruleset includes determining whether the target information satisfies the one or more criteria.

In some aspects, the techniques described herein relate to a compliance testing system, wherein the prompt further includes at least a portion of the content item In some aspects, the techniques described herein relate to a compliance testing system configured to test compliance of a content item, the compliance testing system including: a memory configured to store computer-executable instructions; and one or more hardware processors configured to execute the computer-executable instructions to at least: receive a request to perform content compliance testing of a content item; access the content item; identify a type of the content item using a first machine learning model; access the compliance ruleset that specifies a set of criteria that evaluate compliance of content items with a set of constraints, and wherein the compliance ruleset includes configuration parameters for configuring a second machine learning model, and wherein the compliance ruleset is selected based at least in part on the type of the content item; execute a compliance checker implemented using the second machine learning model, wherein the second machine learning model is configured based on the configuration parameters, wherein the configuration parameters specify a set of instructions that instruct the second machine learning model on operations to perform with respect to the compliance ruleset and the content item, and wherein the set of instructions are configured to maintain accuracy of the compliance checker at or above an accuracy threshold; generate a prompt including the compliance ruleset; process the prompt using the compliance checker, wherein the compliance checker uses the second machine learning model to verify compliance of the content item based at least in part on the compliance ruleset; receive a compliance determination dataset from the compliance checker that indicates whether the content item satisfies one or more criteria within the compliance ruleset; and generate an output for display on a user interface based at least in part on the compliance determination dataset.

In some aspects, the techniques described herein relate to a compliance testing system, wherein the prompt includes at least a portion of the content item.

In some aspects, the techniques described herein relate to a compliance testing system, wherein the one or more hardware processors are further configured to execute the computer-executable instructions to at least divide the content item into at least two overlapping sections, wherein generating the prompt comprises generating a prompt for each overlapping section of the content item.

In some aspects, the techniques described herein relate to a compliance testing system, wherein receiving a compliance determination dataset comprises receiving an indication of whether a output associated with each prompt for each of the overlapping sections of the content item are consistent.

In some aspects, the techniques described herein relate to a compliance testing system configured to test compliance of a content collection package having a plurality of heterogenous content items, the compliance testing system including: a memory configured to store computer-executable instructions; and one or more hardware processors configured to execute the computer-executable instructions to at least: receive a request to perform content compliance testing of the content collection package; access a first content item from the content collection package; divide the first content item into at least a first portion and a second portion, wherein the first portion and the second portion overlap in content by an overlap percentage; access a compliance rule for the first content item; generate a first compliance check prompt based at least in part on the compliance rule for the first content item and the first portion of the first content item; generate a second compliance check prompt based at least in part on the compliance rule for the first content item and the second portion of the first content item; provide the first compliance check prompt to a compliance check machine learning model to obtain a first output; provide the second compliance check prompt to the compliance check machine learning model to obtain a second output; and determine compliance of the first content item based at least in part on the first output and the second output.

In some aspects, the techniques described herein relate to a compliance testing system, wherein the first content item includes a plurality of pages, and wherein dividing the first content item into a first portion and a second portion includes dividing a first page of the first content item into a first subpage and a second subpage.

In some aspects, the techniques described herein relate to a compliance testing system, wherein the one or more hardware processors is further configured to execute the computer-executable instructions to at least normalize content items included in the content collection package.

In some aspects, the techniques described herein relate to a compliance testing system, wherein the one or more hardware processors is further configured to execute the computer-executable instructions to at least: determine a data input limit for the compliance check machine learning model; and determine a number of portions to divide the first content item based on the data input limit.

In some aspects, the techniques described herein relate to a compliance testing system, wherein the first content item is divided into the first portion and the second portion based at least in part on the number of portions determined based on the data input limit.

In some aspects, the techniques described herein relate to a compliance testing system, wherein the data input limit is determined based at least in part on a target accuracy threshold for the compliance check machine learning model.

In some aspects, the techniques described herein relate to a compliance testing system, wherein the target accuracy threshold is independent from a token limit for the compliance check machine learning model.

In some aspects, the techniques described herein relate to a compliance testing system, wherein the one or more hardware processors is further configured to execute the computer-executable instructions to at least classify the first content item by providing the first content item to a classification machine learning model, and wherein the compliance rule for the first content item is selected based at least in part on a classification for the first content item.

In some aspects, the techniques described herein relate to a compliance testing system, wherein determining compliance of the first content item includes comparing the first output and the second output to determine a degree of consistency between the first output and the second output.

In some aspects, the techniques described herein relate to a compliance testing system, wherein the one or more hardware processors is further configured to execute the computer-executable instructions to at least output an indicator of the determined compliance of the first content item.

In some aspects, the techniques described herein relate to a compliance testing system, wherein the overlap percentage is selected to obtain a threshold accuracy of the compliance check machine learning model while reducing an occurrence of hallucinations to a threshold minimum.

In some aspects, the techniques described herein relate to a computer-implemented method of testing compliance of a content collection package having a plurality of heterogenous content items, the computer-implemented method including: by a computing system including one or more hardware processors, receiving a request to perform content compliance testing of the content collection package; accessing a first content item from the content collection package; dividing the first content item into at least a first portion and a second portion, wherein the first portion and the second portion overlap in content by an overlap percentage; accessing a compliance rule for the first content item; generating a first compliance check prompt based at least in part on the compliance rule for the first content item and the first portion of the first content item; generating a second compliance check prompt based at least in part on the compliance rule for the first content item and the second portion of the first content item; providing the first compliance check prompt to a compliance check machine learning model to obtain a first output; providing the second compliance check prompt to the compliance check machine learning model to obtain a second output; and determining compliance of the first content item based at least in part on the first output and the second output.

In some aspects, the techniques described herein relate to a computer-implemented method, wherein the first content item includes a plurality of pages, and wherein dividing the first content item into a first portion and a second portion includes dividing a first page of the first content item into a first subpage and a second subpage.

In some aspects, the techniques described herein relate to a computer-implemented method, further including normalizing content items included in the content collection package.

In some aspects, the techniques described herein relate to a computer-implemented method, further including: determining a data input limit for the compliance check machine learning model; and determining a number of portions to divide the first content item based on the data input limit.

In some aspects, the techniques described herein relate to a computer-implemented method, wherein the first content item is divided into the first portion and the second portion based at least in part on the number of portions determined based on the data input limit.

In some aspects, the techniques described herein relate to a computer-implemented method, wherein the data input limit is determined based at least in part on a target accuracy threshold for the compliance check machine learning model.

In some aspects, the techniques described herein relate to a computer-implemented method, wherein the target accuracy threshold is independent from a token limit for the compliance check machine learning model.

In some aspects, the techniques described herein relate to a computer-implemented method, further including classifying the first content item by providing the first content item to a classification machine learning model, and wherein the compliance rule for the first content item is selected based at least in part on a classification for the first content item.

In some aspects, the techniques described herein relate to a computer-implemented method, wherein determining compliance of the first content item includes comparing the first output and the second output to determine a degree of consistency between the first output and the second output.

In some aspects, the techniques described herein relate to a computer-implemented method, further including outputting an indicator of the determined compliance of the first content item.

In some aspects, the techniques described herein relate to a computer-implemented method, wherein the overlap percentage is selected to obtain a threshold accuracy of the compliance check machine learning model while reducing an occurrence of hallucinations to a threshold minimum.

Additional Terminology

Conditional language used herein, such as, among others, "can," "could," "might," "may," "e.g.," and the like, unless specifically stated otherwise, or otherwise understood within the context as used, may be generally intended to convey that certain embodiments include, while other embodiments do not include, certain features, elements and/or states. Thus, such conditional language may be not generally intended to imply that features, elements and/or states may be in any way required for one or more embodiments or that one or more embodiments necessarily include these features, elements and/or states.

Conjunctive language such as the phrase "at least one of X, Y, and Z," unless specifically stated otherwise, may be otherwise understood with the context as used in general to convey that an item, term, etc. may be either X, Y, or Z. Thus, such conjunctive language may be not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Additionally, features described in connection with one embodiment can be incorporated into another of the disclosed embodiments, even if not expressly discussed herein, and embodiments may have the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it may be intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example may be to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps may be mutually exclusive. The protection may be not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

Moreover, while operations may be depicted in the drawings or described in the specification in a particular order, such operations need not be performed in the particular order shown or in sequential order, or that all operations be performed, to achieve desirable results. Other operations that may be not depicted or described can be incorporated in the example methods and processes. For example, one or more additional operations can be performed before, after, simultaneously, or between any of the described operations. Further, the operations may be rearranged or reordered in other implementations, including being performed at least partially in parallel. Those skilled in the art will appreciate that in some embodiments, the actual steps taken in the processes illustrated and/or disclosed may differ from those shown in the figures. Depending on the embodiment, certain of the steps described above may be removed, others may be added.

For purposes of this disclosure, certain aspects, advantages, and novel features may be described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that may be within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure may be not intended to be limited by the specific disclosures of preferred embodiments in this section or elsewhere in this specification, and may be defined by claims as presented in this section or elsewhere in this specification or as presented in the future. The language of the claims may be to be interpreted broadly based on the language employed in the claims and not limited to the examples described in the present specification or during the prosecution of the application, which examples may be to be construed as non-exclusive.

Unless the context clearly may require otherwise, throughout the description and the claims, the words "comprise", "comprising", and the like, may be construed in an inclusive sense as opposed to an exclusive or exhaustive sense, that may be to say, in the sense of "including, but not limited to".

What is claimed is:

1. A computer-implemented method of testing compliance of a content collection package having a plurality of heterogenous content items, the computer-implemented method comprising:

by a computing system comprising one or more hardware processors, receiving a request to perform content compliance testing of the content collection package;

accessing a first portion of the content collection package;

accessing a classification ruleset specifying a set of at least partially different criteria that describe identifying features associated with specific content items in the content collection package and types of data extractable from the specific content items, and wherein the classification ruleset comprises configuration parameters for configuring a first set of machine learning models;

executing, on the first portion of the content collection package, a content item classification and data extraction process implemented using the first set of machine learning models that are configured based on the configuration parameters, wherein the configuration parameters specify a set of instructions that instruct the first set of machine learning models on operations to perform with respect to the classification ruleset and the content collection package, and wherein the content item classification and data extraction process comprises:

classifying the specific content items in the content collection package;

determining that a first content item of the specific content items comprises first target information, wherein the first target information is usable to assess compliance of the content collection package with a compliance ruleset, and wherein the compliance ruleset specifies rules for determining whether the content collection package satisfies a set of compliance criteria; and in response to determining that the first content item comprises the first target information, extracting the first target information into a compliance audit package, wherein the compliance audit package comprises a subset of the content collection package having the first target information and at least second target information that, when processed using the compliance ruleset, is indicative of whether the content collection package satisfies the compliance ruleset, and wherein the compliance audit package omits a subset of the content collection package that, when processed using the compliance ruleset, is not indicative of whether the content collection package satisfies the compliance ruleset;

processing the compliance audit package using the compliance ruleset to obtain a compliance indication result, wherein processing the compliance audit package comprises:

generating a prompt based at least in part on the compliance audit package and the compliance ruleset; and processing the prompt using a second set of machine learning models that are configured based on second configuration parameters; and generating an output for display on a user interface based on the compliance indication result.

2. The computer-implemented method of claim 1, wherein processing the compliance audit package comprises assessing consistency between the first target information and the at least second target information.

3. The computer-implemented method of claim 1, wherein the second configuration parameters specify a second set of instructions that instruct the second set of machine learning models on operations to perform with respect to the compliance ruleset and the compliance audit package.

4. The computer-implemented method of claim 3, wherein the second set of instructions is configured to maintain accuracy of the second set of machine learning models at or above an accuracy threshold.

5. The computer-implemented method of claim 1, further comprising:

accessing a second portion of the content collection package; and executing the content item classification and data extraction process on the second portion of the content collection package.

6. The computer-implemented method of claim 5, wherein the second portion of the content collection package corresponds to a different content item than the first portion of the content collection package.

7. The computer-implemented method of claim 5, wherein the first portion of the content collection package and the second portion of the content collection package correspond to the same content item of the content collection package.

8. The computer-implemented method of claim 5, wherein the at least second target information is extracted from the second portion of the content collection package.

9. The computer-implemented method of claim 1, wherein, in response to determining that the compliance indication result indicates that the compliance audit package does not satisfy one or more criteria within the compliance ruleset, the computer-implemented method further comprises determining a resolution action to resolve noncompliance of the content collection package.

10. The computer-implemented method of claim 9, wherein the output comprises an identity of the resolution action.

11. The computer-implemented method of claim 1, wherein the first set of machine learning models comprises a computer vision machine learning model.

12. The computer-implemented method of claim 1, further comprising chunking the content collection package into a plurality of portions that satisfy a size threshold, wherein the plurality of portions includes the first portion of the content collection package.

13. A compliance testing system configured to test compliance of a content item, the compliance testing system comprising:

a memory configured to store computer-executable instructions; and one or more hardware processors configured to execute the computer-executable instructions to at least:

receive a request to perform content compliance testing of a content item;

access the content item;

identify a type of the content item using a first machine learning model;

extract target information from the content item, wherein the target information is useable to assess compliance of the content item with a compliance ruleset, wherein the target information is identified based at least in part on the type of the content item;

access the compliance ruleset that specifies a set of criteria that evaluate compliance of content items with a set of constraints, and wherein the compliance ruleset comprises configuration parameters for configuring a second machine learning model;

execute a compliance checker implemented using the second machine learning model, wherein the second machine learning model is configured based on the configuration parameters, wherein the configuration parameters specify a set of instructions that instruct the second machine learning model on operations to perform with respect to the compliance ruleset and the content item, and wherein the set of instructions are configured to maintain accuracy of the compliance checker at or above an accuracy threshold;

generate a prompt comprising the target information extracted from the content item and the compliance ruleset;

process the prompt using the compliance checker, wherein the compliance checker uses the second machine learning model to verify compliance of the content item based at least in part on the compliance ruleset;

receive a compliance determination dataset from the compliance checker that indicates whether the content item satisfies one or more criteria within the compliance ruleset; and generate an output for display on a user interface based at least in part on the compliance determination dataset.

14. The compliance testing system of claim 13, wherein determining whether the content items satisfies one or more criteria within the compliance ruleset comprises determining whether the target information satisfies the one or more criteria.

15. The compliance testing system of claim 13, wherein the prompt further comprises at least a portion of the content item.

16. A compliance testing system configured to test compliance of a content item, the compliance testing system comprising:

a memory configured to store computer-executable instructions; and one or more hardware processors configured to execute the computer-executable instructions to at least:

receive a request to perform content compliance testing of a content item;

access the content item;

identify a type of the content item using a first machine learning model;

access a compliance ruleset that specifies a set of criteria that evaluate compliance of content items with a set of constraints, and wherein the compliance ruleset comprises configuration parameters for configuring a second machine learning model, and wherein the compliance ruleset is selected based at least in part on the type of the content item;

execute a compliance checker implemented using the second machine learning model, wherein the second machine learning model is configured based on the configuration parameters, wherein the configuration parameters specify a set of instructions that instruct the second machine learning model on operations to perform with respect to the compliance ruleset and the content item, and wherein the set of instructions are configured to maintain accuracy of the compliance checker at or above an accuracy threshold;

generate a prompt comprising the compliance ruleset;

process the prompt using the compliance checker, wherein the compliance checker uses the second machine learning model to verify compliance of the content item based at least in part on the compliance ruleset;

receive a compliance determination dataset from the compliance checker that indicates whether the content item satisfies one or more criteria within the compliance ruleset; and generate an output for display on a user interface based at least in part on the compliance determination dataset.

17. The compliance testing system of claim 16, wherein the prompt comprises at least a portion of the content item.

18. The compliance testing system of claim 16, wherein the one or more hardware processors are further configured to execute the computer-executable instructions to at least divide the content item into at least two overlapping sections, wherein generating the prompt comprises generating a prompt for each overlapping section of the content item.

19. The compliance testing system of claim 18, wherein receiving a compliance determination dataset comprises receiving an indication of whether an output associated with each prompt for each of the overlapping sections of the content item are consistent.

\* \* \* \* \*